(12) United States Patent
Brown et al.

(10) Patent No.: US 12,406,232 B2
(45) Date of Patent: Sep. 2, 2025

(54) BUILDING MANAGEMENT SYSTEM WITH GENERATIVE AI-BASED AUTOMATED FLEXIBLE CUSTOMER REPORT GENERATION AND STANDARDIZATION

(71) Applicant: Tyco Fire & Security GmbH, Neuhausen am Rheinfall (CH)

(72) Inventors: Julie J. Brown, Yardley, PA (US); Young M. Lee, Old Westbury, NY (US); Rajiv Ramanasankaran, San Jose, CA (US); Sastry KM Malladi, Fremont, CA (US); Michael Tenbrock, Dachsen (CH); Levent Tinaz, Tampa Bay, FL (US); Samuel A. Girard, Kenosha, WI (US); David S. Elario, Hartland, WI (US); Juliet A. Pagliaro Herman, Waukesha, WI (US); Miguel Galvez, Westford, MA (US); Trent M. Swanson, Wellington, FL (US); John F. Kuchler, Muskego, WI (US); Deepak Budhiraja, Ashburn, VA (US); Daniela M. Natali, Kensington, MD (US); Josip Lazarevski, Zurich (CH); Scott Deering, Milwaukee, WI (US); Gary W. Gavin, Franklin, WI (US); Kristen Sheppard-Guzelaydin, West Chester, PA (US); James Young, Cork (IE); Prashanthi Sudhakar, San Francisco, CA (US); Kaleb Luedtke, West Bend, WI (US); Karl F. Reichenberger, Mequon, WI (US); Wenwen Zhao, Santa Clara, CA (US); Adam R. Grabowski, Brookfield, WI (US); Lauren C. Dern, Fox Point, WI (US); Nicole A. Madison, Milwaukee, WI (US); Dana S. Petersen, Milwaukee, WI (US); Nevin L. Forry, York, PA (US); Pedriant Pena, Groveland, MA (US); Ghassan R. Hamoudeh, San Marcos, CA (US); Ryan G. Danielson, Castle Rock, CO (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 27 days.

(21) Appl. No.: 18/633,049

(22) Filed: Apr. 11, 2024

(65) Prior Publication Data
US 2024/0346458 A1 Oct. 17, 2024

Related U.S. Application Data

(60) Provisional application No. 63/470,078, filed on May 31, 2023, provisional application No. 63/458,871, filed on Apr. 12, 2023.

(51) Int. Cl.
*G06Q 10/20* (2023.01)
*G06F 40/103* (2020.01)
*G06Q 50/163* (2024.01)

(52) U.S. Cl.
CPC .......... *G06Q 10/20* (2013.01); *G06F 40/103* (2020.01); *G06Q 50/163* (2013.01)

(58) Field of Classification Search
CPC .... G06Q 10/20; G06Q 50/163; G06F 40/103; G06F 40/186; G06F 40/56
(Continued)

(56) References Cited

U.S. PATENT DOCUMENTS 7,949,444 B2  5/2011  Mukherjee
8,600,556 B2  12/2013  Nesler et al.
(Continued)

FOREIGN PATENT DOCUMENTS

EP   3 997 390 A1   5/2022
EP   3 997 391 A1   5/2022
(Continued)

OTHER PUBLICATIONS

Ahmed et al., "Recommending Root-Cause and Mitigation Steps for Cloud Incidents using Large Language Models," International Conference on Software Engineering (ICSE-2023), 2023 (17 pages).
(Continued)

*Primary Examiner* — Tarek Elchanti
(74) *Attorney, Agent, or Firm* — Foley & Lardner LLP

(57) ABSTRACT

A method includes receiving, by one or more processors, an unstructured service report corresponding to a service request handled by one or more technicians for servicing building equipment. The unstructured service report may include unstructured data not conforming to a predetermined
(Continued)

format or conforming to a plurality of different predetermined formats. The method may include extracting, by the one or more processors, a set of standards from one or more technical documents associated with the building equipment. The method may include automatically generating, by the one or more processors using a generative AI model, a structured service report in the predetermined format for delivery to a customer associated with the building equipment. Generating the structured service report may include standardizing the structured service report to comply with the set of standards extracted from the one or more technical documents associated with the building equipment.

20 Claims, 32 Drawing Sheets

(58) Field of Classification Search
USPC .................................. 705/305; 455/41.1
See application file for complete search history.

(56) References Cited

U.S. PATENT DOCUMENTS

| | | |
|---|---|---|
| 8,713,025 B2 | 4/2014 | Eder |
| 8,731,724 B2 | 5/2014 | Drees et al. |
| 8,811,977 B2 | 8/2014 | Austin et al. |
| 8,832,200 B2 | 9/2014 | Brownholtz et al. |
| 9,244,964 B2 | 1/2016 | Bhatt et al. |
| 9,568,910 B2 | 2/2017 | Drees et al. |
| 9,606,520 B2 | 3/2017 | Noboa et al. |
| 9,696,073 B2 | 7/2017 | Noboa et al. |
| 9,753,455 B2 | 9/2017 | Drees |
| 9,778,639 B2 | 10/2017 | Boettcher et al. |
| 10,095,756 B2 | 10/2018 | Park et al. |
| 10,175,681 B2 | 1/2019 | Wenzel et al. |
| 10,235,452 B1 | 3/2019 | Savir et al. |
| 10,281,363 B2 | 5/2019 | Vitullo et al. |
| 10,372,146 B2 | 8/2019 | Vitullo |
| 10,417,245 B2 | 9/2019 | Park et al. |
| 10,528,020 B2 | 1/2020 | Drees |
| 10,700,942 B2 | 6/2020 | Hamilton et al. |
| 10,706,375 B2 | 7/2020 | Wenzel et al. |
| 10,742,739 B2 | 8/2020 | Evans et al. |
| 10,747,187 B2 | 8/2020 | Perez |
| 10,761,547 B2 | 9/2020 | Risbeck et al. |
| 10,969,775 B2 | 4/2021 | Khalate et al. |
| 10,997,294 B2 | 5/2021 | Kenyon et al. |
| 11,038,709 B2 | 6/2021 | Park et al. |
| 11,067,955 B2 | 7/2021 | Patel et al. |
| 11,092,954 B2 | 8/2021 | Vitullo et al. |
| 11,108,587 B2 | 8/2021 | Park et al. |
| 11,164,159 B2 | 11/2021 | Ma et al. |
| 11,188,411 B1 | 11/2021 | Shen et al. |
| 11,272,011 B1 | 3/2022 | Laughton et al. |
| 11,275,348 B2 | 3/2022 | Park et al. |
| 11,281,173 B2 | 3/2022 | Turney et al. |
| 11,416,796 B2 | 8/2022 | Przybylski et al. |
| 11,449,454 B2 | 9/2022 | Cayemberg et al. |
| 11,636,206 B2 | 4/2023 | Kenyon et al. |
| 11,704,311 B2 | 7/2023 | Ramanasankaran et al. |
| 11,714,930 B2 | 8/2023 | Ramanasankaran et al. |
| 11,720,571 B2 | 8/2023 | Evans et al. |
| 11,755,501 B2 | 9/2023 | Ray et al. |
| 11,769,066 B2 | 9/2023 | Ramanasankaran et al. |
| 11,847,420 B2 | 12/2023 | Galitsky |
| 11,894,944 B2 | 2/2024 | Ploegert et al. |
| 11,960,844 B2 | 4/2024 | Galitsky |
| 12,088,599 B1 | 9/2024 | Mccarson |
| 12,242,937 B1 | 3/2025 | Brown et al. |
| 12,339,895 B2 | 6/2025 | Manavi Tehrani et al. |
| 2005/0170842 A1 | 8/2005 | Chen |
| 2006/0041534 A1 | 2/2006 | Atwell |
| 2008/0015881 A1 | 1/2008 | Shankar |
| 2008/0209255 A1 | 8/2008 | Seguin et al. |
| 2009/0043818 A1 | 2/2009 | Raichelgauz et al. |
| 2010/0049590 A1 | 2/2010 | Anshul |
| 2010/0324962 A1 | 12/2010 | Nesler et al. |
| 2011/0093913 A1 | 4/2011 | Wohlert et al. |
| 2011/0153103 A1 | 6/2011 | Brown et al. |
| 2011/0161124 A1 | 6/2011 | Lappinga et al. |
| 2012/0022700 A1 | 1/2012 | Drees et al. |
| 2012/0079100 A1 | 3/2012 | Mcintyre et al. |
| 2012/0259583 A1 | 10/2012 | Noboa et al. |
| 2012/0330971 A1 | 12/2012 | Thomas et al. |
| 2013/0311481 A1 | 11/2013 | Bhatt et al. |
| 2014/0179222 A1* | 6/2014 | Chaudhary .............. H04B 5/20 455/41.1 |
| 2014/0280313 A1 | 9/2014 | Kadam et al. |
| 2015/0046452 A1 | 2/2015 | Agrawal et al. |
| 2015/0316907 A1 | 11/2015 | Elbsat et al. |
| 2016/0063096 A1 | 3/2016 | Bostick et al. |
| 2016/0147870 A1 | 5/2016 | Agarwalla et al. |
| 2016/0239500 A1 | 8/2016 | Dave et al. |
| 2016/0377306 A1 | 12/2016 | Drees et al. |
| 2017/0102162 A1 | 4/2017 | Drees et al. |
| 2017/0103483 A1 | 4/2017 | Drees et al. |
| 2017/0153936 A1 | 6/2017 | Vorganti |
| 2017/0235735 A1 | 8/2017 | Ignatyev et al. |
| 2018/0046173 A1 | 2/2018 | Ahmed |
| 2018/0113931 A1 | 4/2018 | Carter |
| 2018/0341255 A1 | 11/2018 | Turney et al. |
| 2019/0028587 A1 | 1/2019 | Unitt et al. |
| 2019/0057450 A1 | 2/2019 | Mark et al. |
| 2019/0139004 A1 | 5/2019 | Vukovic et al. |
| 2019/0171714 A1 | 6/2019 | Gale et al. |
| 2019/0186766 A1 | 6/2019 | Maslekar et al. |
| 2019/0251109 A1 | 8/2019 | Ganjam et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0338974 A1 | 11/2019 | Turney et al. |
| 2019/0339661 A1 | 11/2019 | Pancholi et al. |
| 2019/0347622 A1 | 11/2019 | Elbsat et al. |
| 2019/0349321 A1 | 11/2019 | Cai et al. |
| 2020/0076835 A1 | 3/2020 | Ladnai et al. |
| 2020/0090289 A1 | 3/2020 | Elbsat et al. |
| 2020/0096985 A1 | 3/2020 | Wenzel et al. |
| 2020/0125954 A1 | 4/2020 | Truong et al. |
| 2020/0134680 A1 | 4/2020 | Tamura et al. |
| 2020/0142365 A1 | 5/2020 | Sharma et al. |
| 2020/0162280 A1 | 5/2020 | Drees et al. |
| 2020/0250774 A1 | 8/2020 | Agarwal et al. |
| 2020/0258057 A1 | 8/2020 | Farahat et al. |
| 2020/0301408 A1 | 9/2020 | Elbsat et al. |
| 2020/0302058 A1 | 9/2020 | Kenyon et al. |
| 2020/0320414 A1 | 10/2020 | Neumann |
| 2020/0348038 A1 | 11/2020 | Risbeck et al. |
| 2020/0355391 A1 | 11/2020 | Wenzel et al. |
| 2020/0356087 A1 | 11/2020 | Elbsat et al. |
| 2021/0010693 A1 | 1/2021 | Gamroth et al. |
| 2021/0010701 A1 | 1/2021 | Nesler et al. |
| 2021/0011443 A1 | 1/2021 | Mcnamara et al. |
| 2021/0011444 A1 | 1/2021 | Risbeck et al. |
| 2021/0018211 A1 | 1/2021 | Ellis et al. |
| 2021/0043208 A1 | 2/2021 | Luan et al. |
| 2021/0072709 A1 | 3/2021 | Oliver et al. |
| 2021/0072742 A1 | 3/2021 | Wu et al. |
| 2021/0073684 A1 | 3/2021 | Veshchikov et al. |
| 2021/0173366 A1 | 6/2021 | Turney et al. |
| 2021/0200164 A1 | 7/2021 | Ploegert et al. |
| 2021/0200173 A1 | 7/2021 | Ploegert et al. |
| 2021/0200807 A1 | 7/2021 | Ploegert et al. |
| 2021/0233008 A1 | 7/2021 | Gupta et al. |
| 2021/0256534 A1 | 8/2021 | An et al. |
| 2021/0286989 A1 | 9/2021 | Zhong et al. |
| 2021/0303481 A1 | 9/2021 | Ray et al. |
| 2021/0343406 A1 | 11/2021 | Mcmillan et al. |
| 2021/0364181 A1 | 11/2021 | Risbeck et al. |
| 2021/0373519 A1 | 12/2021 | Risbeck et al. |
| 2021/0390128 A1 | 12/2021 | Dasgupta et al. |
| 2021/0398650 A1 | 12/2021 | Baker et al. |
| 2022/0011731 A1 | 1/2022 | Risbeck et al. |

(56) References Cited

U.S. PATENT DOCUMENTS

| | | |
|---|---|---|
| 2022/0051276 A1 | 2/2022 | Zelocchi |
| 2022/0057099 A1 | 2/2022 | Clement et al. |
| 2022/0065479 A1 | 3/2022 | Douglas et al. |
| 2022/0067077 A1 | 3/2022 | Tupakula et al. |
| 2022/0092500 A1 | 3/2022 | Drees et al. |
| 2022/0113045 A1 | 4/2022 | Gamroth et al. |
| 2022/0137575 A1 | 5/2022 | Paulson et al. |
| 2022/0137580 A1 | 5/2022 | Burroughs et al. |
| 2022/0171347 A1 | 6/2022 | Oliver et al. |
| 2022/0237063 A1* | 7/2022 | Giddings ............... G06F 11/321 |
| 2022/0245641 A1 | 8/2022 | Wintle et al. |
| 2022/0284519 A1 | 9/2022 | Pancholi et al. |
| 2022/0308952 A1 | 9/2022 | Ni et al. |
| 2022/0327111 A1 | 10/2022 | Park et al. |
| 2022/0341609 A1 | 10/2022 | Mcnamara et al. |
| 2022/0368558 A1 | 11/2022 | Ploegert et al. |
| 2022/0376994 A1 | 11/2022 | Mishra |
| 2022/0381471 A1 | 12/2022 | Wenzel et al. |
| 2022/0390137 A1 | 12/2022 | Wenzel et al. |
| 2022/0414300 A1 | 12/2022 | Odisio et al. |
| 2023/0029218 A1 | 1/2023 | Bhamidipaty et al. |
| 2023/0042065 A1 | 2/2023 | Douglas et al. |
| 2023/0061096 A1 | 3/2023 | Mojtahedzadeh et al. |
| 2023/0085641 A1 | 3/2023 | Jones et al. |
| 2023/0115475 A1 | 4/2023 | Alsumail et al. |
| 2023/0123399 A1 | 4/2023 | Kwatra et al. |
| 2023/0153490 A1 | 5/2023 | Lee et al. |
| 2023/0169220 A1 | 6/2023 | Ramanasankaran et al. |
| 2023/0169516 A1 | 6/2023 | Rapp et al. |
| 2023/0185983 A1 | 6/2023 | Ramanasankaran et al. |
| 2023/0206062 A1 | 6/2023 | Scherwitz |
| 2023/0213909 A1 | 7/2023 | Galvez et al. |
| 2023/0259821 A1 | 8/2023 | Travalini et al. |
| 2023/0273576 A1 | 8/2023 | Douglas et al. |
| 2023/0298371 A1 | 9/2023 | Rezaeian et al. |
| 2023/0324069 A1 | 10/2023 | Drees et al. |
| 2023/0342392 A1 | 10/2023 | Mccarson |
| 2023/0358429 A1 | 11/2023 | Ramanasankaran et al. |
| 2023/0367668 A1 | 11/2023 | Oglesby et al. |
| 2023/0394537 A1 | 12/2023 | Ghorbani |
| 2023/0417439 A1 | 12/2023 | Reichl |
| 2023/0418281 A1 | 12/2023 | Lee et al. |
| 2023/0418524 A1 | 12/2023 | Darji et al. |
| 2024/0012767 A1 | 1/2024 | Ray et al. |
| 2024/0012846 A1 | 1/2024 | Truong et al. |
| 2024/0036537 A1 | 2/2024 | Gupta et al. |
| 2024/0104692 A1 | 3/2024 | Pottorff et al. |
| 2024/0121254 A1 | 4/2024 | Gu |
| 2024/0126227 A1 | 4/2024 | Kammela et al. |
| 2024/0143646 A1 | 5/2024 | Manavi Tehrani et al. |
| 2024/0176319 A1 | 5/2024 | Risbeck et al. |
| 2024/0196178 A1 | 6/2024 | Ying et al. |
| 2024/0205781 A1 | 6/2024 | Li et al. |
| 2024/0256598 A1 | 8/2024 | Mccarson |
| 2024/0265047 A1 | 8/2024 | Mccarson |
| 2024/0291806 A1 | 8/2024 | Sethi et al. |
| 2024/0291835 A1 | 8/2024 | Sethi et al. |
| 2024/0312230 A1 | 9/2024 | Kumar et al. |
| 2024/0333623 A1 | 10/2024 | Chou et al. |
| 2024/0345551 A1 | 10/2024 | Ramanasankaran et al. |
| 2024/0345554 A1 | 10/2024 | Brown et al. |
| 2024/0345560 A1 | 10/2024 | Brown et al. |
| 2024/0345573 A1 | 10/2024 | Goyal et al. |
| 2024/0345914 A1 | 10/2024 | Selvaraj et al. |
| 2024/0346036 A1 | 10/2024 | Brown et al. |
| 2024/0346060 A1 | 10/2024 | Brown et al. |
| 2024/0346311 A1 | 10/2024 | Brown et al. |
| 2024/0346458 A1 | 10/2024 | Brown et al. |
| 2024/0346459 A1 | 10/2024 | Brown et al. |
| 2024/0346611 A1 | 10/2024 | Brown et al. |
| 2024/0377792 A1 | 11/2024 | Brown et al. |

FOREIGN PATENT DOCUMENTS

| | | |
|---|---|---|
| WO | WO-2021/011449 A1 | 1/2021 |
| WO | WO-2021/011464 A1 | 1/2021 |
| WO | WO-2021/011497 A1 | 1/2021 |
| WO | WO-2022/266509 A1 | 12/2022 |

OTHER PUBLICATIONS

Giacaglia, G., "How Transformers Work," Towards Data Science, Mar. 10, 2019 (29 pages).
International Search Report and Written Opinion on PCT Appl. No. PCT/US2024/024055 dated Aug. 5, 2024 (21 pages).
Lawton, G., "Generative AI vs. Predictive AI: Understanding the differences," TechTarget, URL: https://www.techtarget.com/searchenterpriseai/tip/Generative-AI-vs-predictive-AI-Understanding-the-differences#:~:text=Predictive%20AI%20forecasts%20future%20events,form%20of%20text%20and%20images, Jul. 12, 2024 (10 pages).
U.S. Appl. No. 17/971,342, filed Oct. 21, 2022, Lee et al.
U.S. Appl. No. 18/116,974, filed Mar. 3, 2023, Lee et al.
U.S. Appl. No. 18/419,442, filed Jan. 22, 2024, Brown et al.
U.S. Appl. No. 18/419,449, filed Jan. 22, 2024, Brown et al.
U.S. Appl. No. 18/419,456, filed Jan. 22, 2024, Brown et al.
U.S. Appl. No. 18/419,464, filed Jan. 22, 2024, Ramanasankaran et al.
U.S. Appl. No. 18/438,195, filed Feb. 9, 2024, Lu et al.
U.S. Appl. No. 18/631,678, filed Apr. 10, 2024, Selvaraj et al.
U.S. Appl. No. 18/633,024, filed Apr. 11, 2024, Brown et al.
U.S. Appl. No. 18/633,040, filed Apr. 11, 2024, Brown et al.
U.S. Appl. No. 18/633,049, filed Apr. 11, 2024, Brown et al.
U.S. Appl. No. 18/633,068, filed Apr. 11, 2024, Brown et al.
U.S. Appl. No. 18/633,086, filed Apr. 11, 2024, Brown et al.
U.S. Appl. No. 18/633,097, filed Apr. 11, 2024, Brown et al.
U.S. Appl. No. 18/661,045, filed May 10, 2024, Goyal et al.
U.S. Appl. No. 18/661,057, filed May 10, 2024, Brown et al.
Invitation to Pay Additional Fees on PCT Appl. No. PCT/US2024/024055 dated Jun. 13, 2024 (15 pages).

* cited by examiner

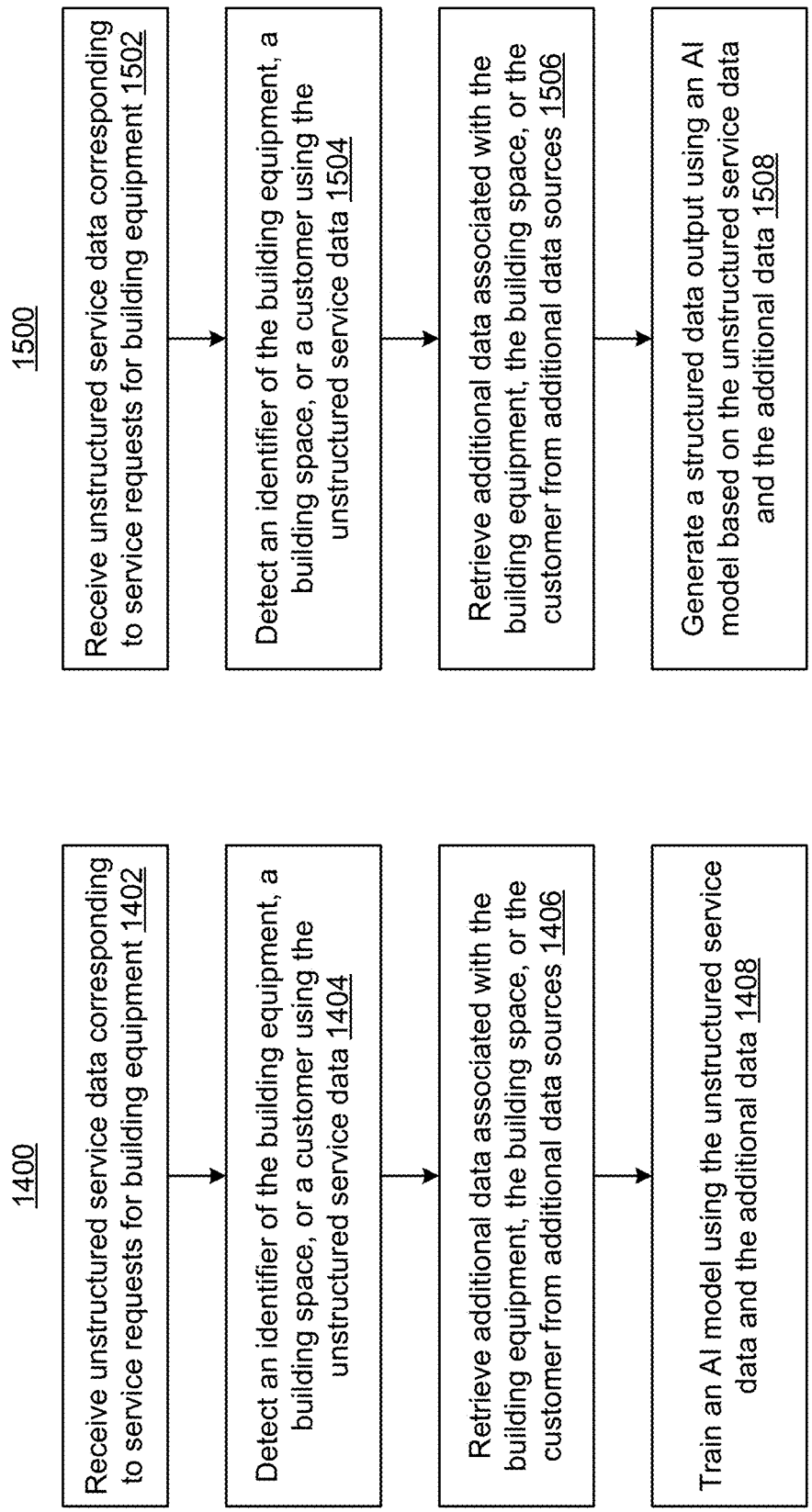

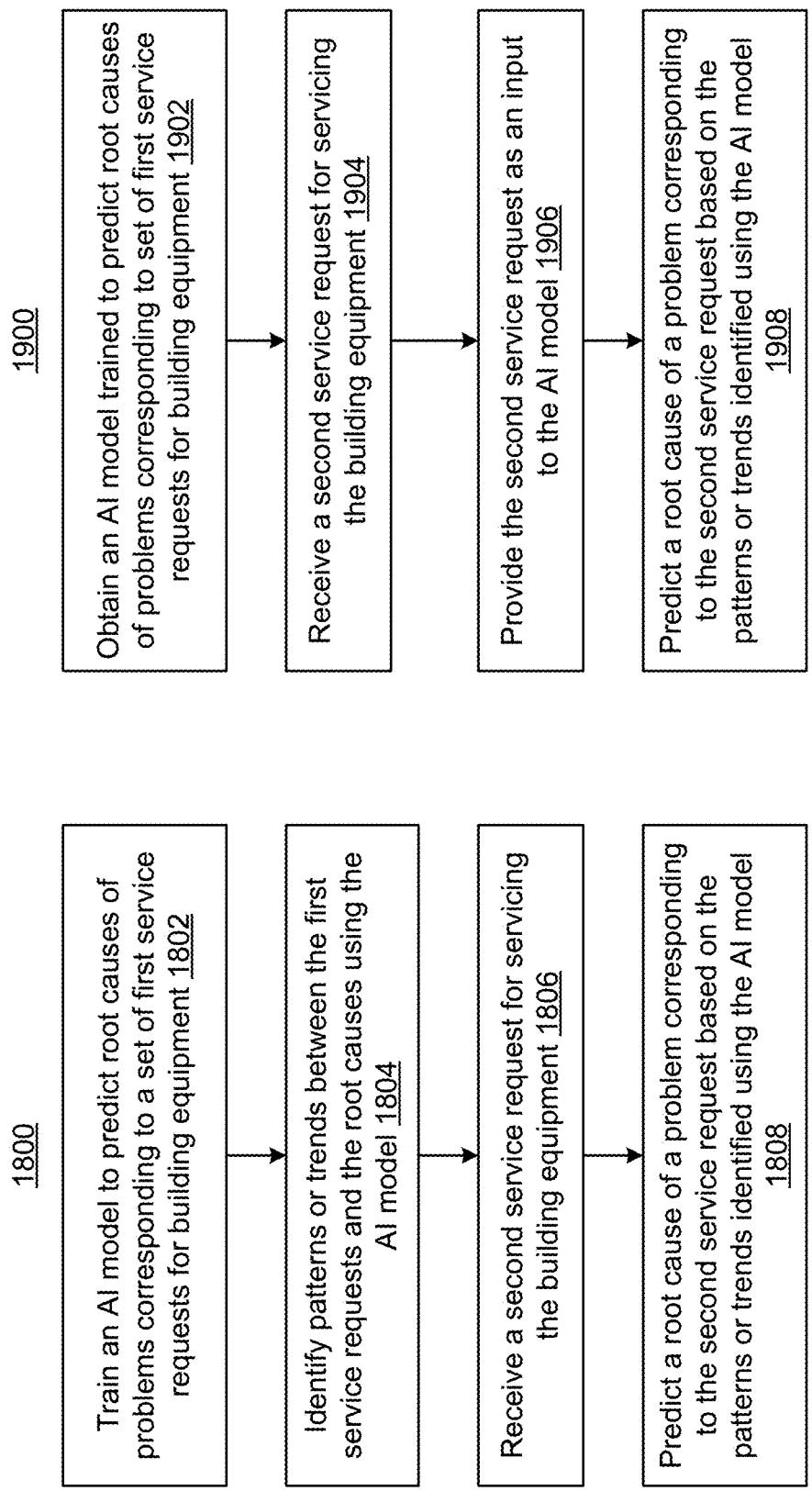

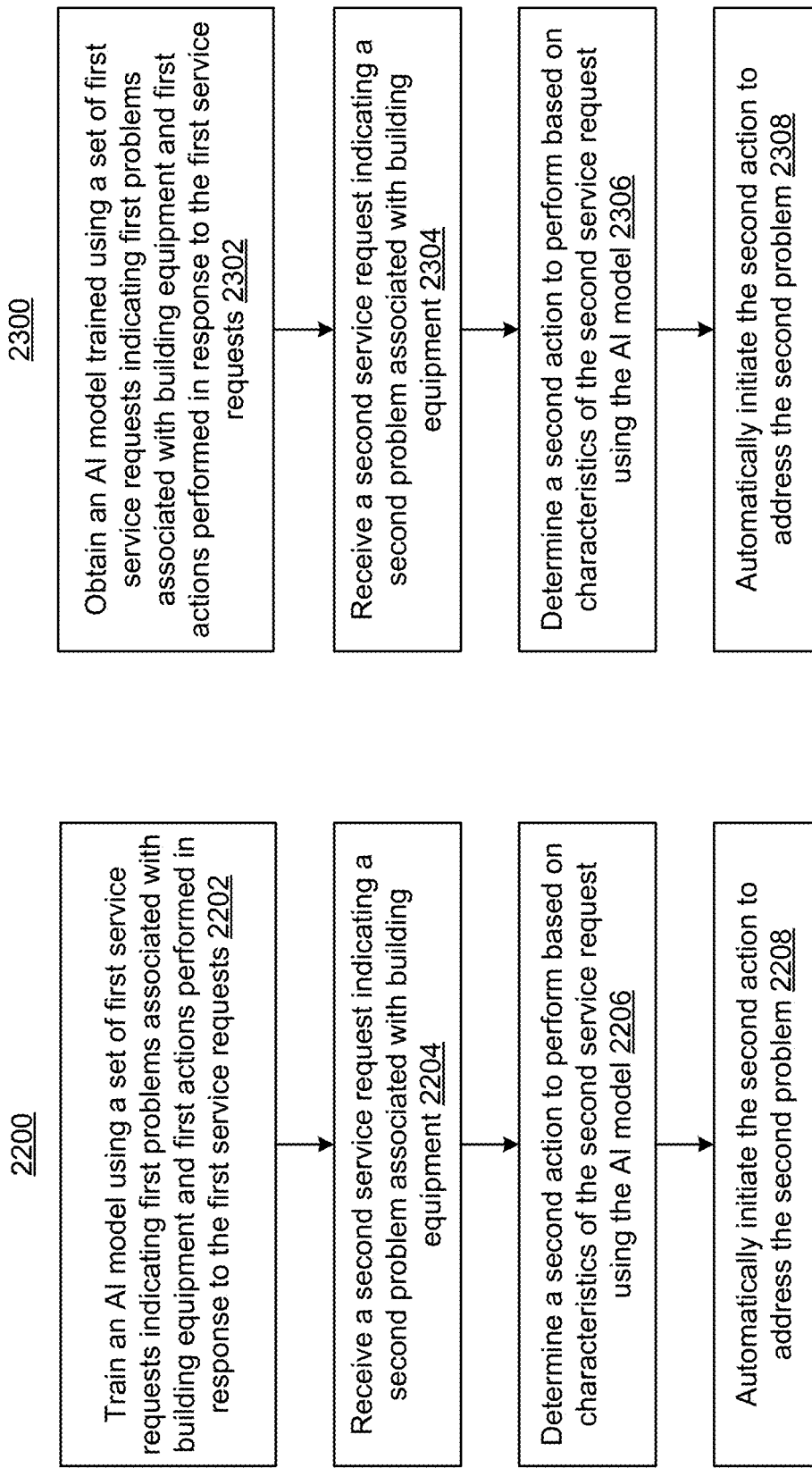

Executive Summary

Johnson Controls is pleased to submit to you the attached virtual inspection report for your chiller(s) installed at 123 1st Street - Houston, TX. This report is derived from your OpenBlue Connected Chiller services for the month of February 2023. Period of inspection to be included (not just inspection date). E.g., February 14, 2023 to March 13, 2023.

During this reporting period, we were able to observe the operations on the following 5 chillers.

| Chiller Name | Model # | Serial # | Capacity | Chiller Type | Lifetime Run Hrs | Lifetime Starts/Stops | Reporting Period Run Hrs | Reporting Period Starts/Stops |
|---|---|---|---|---|---|---|---|---|
| CH #1 | YKNBN4K1-CWGS | SLBM0807 | 20 | 900T | Water Cooled | 18,891 | | | |
| CH #2 | YKNBN4K1-CWGS | SLBM0809 | 30 | 900T | Water Cooled | 19,920 | | | |
| CH #3 | YKNBN4K1-CWGS | SLBM0811 | 30 | 900T | Water Cooled | 19,643 | | | |
| CH #4 | YKNBN4K1-CWGS | SLBM0813 | 30 | 900T | Water Cooled | 19,575 | | | |
| CH #5 | YKNBN4K1-CWGS | SLBM0815 | 30 | 900T | Water Cooled | 18,450 | | | |

We hope you find this report to be valuable and these Insights help you and your team make the most optimal maintenance decisions and thank you for your continued partnership with Johnson Controls!

Chiller Performance Index (CPI)

The Chiller Performance Index (CPI) represents the overall health and wellness of your chillers. It is a measure of overall performance to its designed specifications.

Average CPI for past 3 months

85

Our report indicates that Chiller #2 is at alert level & Chiller #1 CPI dropped from previous reporting period.

| Chiller Name | January | February | March | April | May | June | July | August | September | October | November | December |
|---|---|---|---|---|---|---|---|---|---|---|---|---|
| CH #1 | 100 | 87 | 100 | 100 | 100 | 100 | 100 | 100 | 100 | 100 | 100 | 100 |
| CH #2 | 86 | 75 | 60 | 60 | 60 | 60 | 60 | 60 | 60 | 60 | 60 | 60 |
| CH #3 | 90 | 97 | 100 | 100 | 100 | 100 | 100 | 100 | 100 | 100 | 100 | 100 |
| CH #4 | 90 | 98 | 100 | 100 | 100 | 100 | 100 | 100 | 100 | 100 | 100 | 100 |
| CH #5 | 90 | 90 | 90 | 90 | 90 | 90 | 90 | 90 | 90 | 90 | 90 | 90 |

⚠ ALARM   CPI SCORE: 0-50
Significant problems have been detected in the available data, and indicate that the chiller is not running as designed. An unexpected chiller failure is likely, leading to elevated maintenance and energy costs.

ⓘ ALERT   CPI SCORE: 51-75
Problems have been detected in the available data and indicate that the chiller may not be running as designed. Left uncorrected, this could lead to unexpected chiller failures, higher maintenance costs, and higher energy costs.

☑ ACCEPTABLE   CPI SCORE: 75-100
Minimal or no problems have been detected in the available data, and indicate that the chiller is running as designed. An unexpected chiller failure is unlikely.

FIG. 28

Chiller Alarms & Notifications

| Chiller Name | Cyclic Fault | Health Check Alarm | Health Check Alert | Safety Fault | Warning Fault |
|---|---|---|---|---|---|
| CH #1 | 2 | 1 | 2 | Cell text | 2 |
| CH #2 | 3 | 1 | Cell text | 1 | Cell text |
| CH #3 | 1 | 1 | Cell text | Cell text | Cell text |
| CH #4 | 1 | Cell text | Cell text | Cell text | 1 |
| CH #5 | 1 | Cell text | Cell text | Cell text | Cell text |

FIG. 29

Maintenance Report: Virtual Inspection

Over the course of this reporting period, your chiller(s) have been monitored 24/7. The data collected through your connected chillers has been used to help gather operational insights to better serve and inform you as to the condition and health of your equipment. This report further contains a detailed overview of each alarm, alert, or fault detected to your specific equipment within the window of this assessment, as well as its associated possible cause and impact.

The following observations have been prepared by our OpenBlue Services Expert team and shared with the local Johnson Controls branch team to enable further review in support of your site and equipment.

[Placeholder for textual summary automatically generated by AI models. Text here may provide a textual summary of root causes of any detected faults, recommended maintenance actions, automatic interventions implemented, or other key observations or summaries of information presented elsewhere in this report.]

Your next virtual inspection report is scheduled for:
March 23, 2023

Maintenance Report: Field Service Inspection

Should this virtual inspection be followed up with a field service inspection, your Johnson Controls mechanic will provide you with a separate service report (in attachment) detailing the actions and observations made while on site. We encourage you to review the service report in conjunction with this virtual inspection report for you to receive a holistic view of your equipment performance.

Should you have additional questions about this report or its findings, please contact your branch representative at the following coordinates:

Johnson Controls, Inc.
Contact person: John Johnson
Contact person: +1 555 123 4567

Enclosed:
1. Chiller log sheets
2. Maintenance Inspection - Field Service Report (if applicable)

FIG. 30

Health Chart Conditions

| Condition | Status |
|---|---|
| Low Condenser Refrigerant Level | ☒ ACCEPTABLE |
| High Entering Condenser Water Temperature | ☒ ACCEPTABLE |
| High Evaporator Approach Temperature | ☒ ACCEPTABLE |
| High Oil Temperature While Running | ☒ ACCEPTABLE |
| Low Condenser Refrigerant Level | ☒ ACCEPTABLE |
| High Entering Condenser Water Temperature | ☒ ACCEPTABLE |
| High Evaporator Approach Temperature | ☒ ACCEPTABLE |
| High Oil Temperature While Running | ☒ ACCEPTABLE |

Top 10 Event Occurrences

| Event | Count |
|---|---|
| High Evaporator Approach Temperature | 437091 |
| High Condenser Approach Temperature | 355789 |
| Leaving Chiller Liquid - Low Temperature | 342302 |
| High Condenser Refrigerant Level | 294081 |
| Condenser - Flow Switch Open | 294081 |
| Leaving Chiller Liquid - Flow Switch Open | 119036 |
| Low Suction Pressure in System 1 | 115144 |
| Low Suction Pressure in System 2 | 99932 |
| Low Entering Condenser Water Temperature | 90677 |
| Loss of Subcooler Liquid Seal | 437091 |

Comments

[Placeholder for automatically generated comments explaining the health chart conditions shown above and indicating how those conditions apply to the equipment evaluated in the report. Example: Evaporator approach is an indicator of how well the evaporator heat exchanger is performing. For this chiller, it has been above its design value for an extended time during this report period.]

[Placeholder for automatically generated comments explaining the event occurrences shown above and indicating how those events apply to the equipment evaluated in the report. Example: Evaporator approach is an indicator of how well the evaporator heat exchanger is performing. For this chiller, it has been above its design value for an extended time during this report period.]

☐ Alarms, Alerts, Faults Detected

① High Evaporator Approach Temperature
CHILLER 1, CHILLER 2, CHILLER 3

Evaporator approach is an indicator of how well the evaporator heat exchanger is performing. For this chiller, it has been well above its design value for an extended period of time during this report period.

Possible Causes

1. Insufficient charge
2. Tube fouling
3. Low chilled water flow
4. Oil in the refrigerant charge
5. Wrong type of refrigerant
6. Pass baffle gasket leakage
7. Condenser level control malfunction

Possible Impacts

1. Increased chiller energy consumption
2. Reduced chiller cooling capacity
3. Inability to meet chilled water set point
4. Unplanned downtime

FIG. 33

BUILDING MANAGEMENT SYSTEM WITH GENERATIVE AI-BASED AUTOMATED FLEXIBLE CUSTOMER REPORT GENERATION AND STANDARDIZATION

CROSS-REFERENCE TO RELATED PATENT APPLICATIONS

This application claims the benefit of and priority to U.S. Provisional Patent Application No. 63/458,871 filed Apr. 12, 2023, and U.S. Provisional Patent Application No. 63/470,078 filed May 31, 2023, both of which are incorporated by reference herein in their entireties.

BACKGROUND

The present disclosure relates generally to a building system of a building. The present disclosure relates more particularly to systems for managing and processing data of the building system.

Various interactions between building systems, components of building systems, users, technicians, and/or devices managed by users or technicians can rely on timely generation and presentation of data relating to the interactions, including for performing service operations. However, it can be difficult to generate the data elements to precisely identify proper response actions or sequences of response actions, as well as options for modified response actions, depending on various factors associated with items of equipment to be serviced, technical issues with the items of equipment, and the availability of timely, precise data to use for supporting the service operations.

SUMMARY

Implementations of the present disclosure relate to building management systems and methods that implement building equipment servicing. For example, a system can include at least one machine learning model configured using training data that includes at least one of unstructured data or structured data regarding items of equipment. The system can provide inputs, such as prompts, to the at least one machine learning model regarding an item of equipment, and generate, according to the inputs, responses regarding the item of equipment, such as responses for detecting a cause of an issue of the item of equipment, performing a service operation corresponding to the cause, or guiding a user through the service operation. The machine learning model can include various machine learning model architectures (e.g., networks, backbones, algorithms, etc.), including but not limited to language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

One implementation of the present disclosure is a method including receiving, by one or more processors, an unstructured service report corresponding to a service request handled by one or more technicians for servicing building equipment. The unstructured service report may include unstructured data not conforming to a predetermined format or conforming to a plurality of different predetermined formats. The method may include extracting, by the one or more processors, a set of standards from one or more technical documents associated with the building equipment. The method may include automatically generating, by the one or more processors using a generative AI model, a structured service report in the predetermined format for delivery to a customer associated with the building equipment. Generating the structured service report in the predetermined format may include standardizing the structured service report to comply with the set of standards extracted from the one or more technical documents associated with the building equipment.

In some embodiments, the technical documents include at least one of product manuals, user manuals, installation manuals, instruction manuals, or operating procedure guides for the building equipment. In some embodiments, the set of standards includes standard terminology used in the technical documents. In some embodiments, generating the structured service report in the predetermined format includes modifying one or more textual elements in the unstructured service report to comply with the standard terminology.

In some embodiments, the technical documents include at least one of product manuals, user manuals, installation manuals, instruction manuals, or operating procedure guides for the building equipment. In some embodiments, the set of standards includes standard styles used in the technical documents. In some embodiments, generating the structured service report in the predetermined format includes modifying one or more stylistic elements in the unstructured service report to comply with the standard styles.

In some embodiments, the technical documents include a standard terminology guide associated with at least one of product manuals, user manuals, installation manuals, instruction manuals, or operating procedure guides for the building equipment. In some embodiments, the set of standards includes standard terminology provided in the standard terminology guide. In some embodiments, generating the structured service report in the predetermined format includes modifying one or more textual elements in the unstructured service report to comply with the standard terminology.

In some embodiments, the technical documents include a style guide associated with at least one of product manuals, user manuals, installation manuals, instruction manuals, or operating procedure guides for the building equipment. In some embodiments, the set of standards includes a standard style provided in the standard style guide. In some embodiments, generating the structured service report in the predetermined format includes modifying one or more stylistic elements in the unstructured service report to comply with the standard style.

In some embodiments, generating the structured service report includes generating, using a first generative AI model, a first version of the structured service report that complies with a predetermined template and generating, using a second generative AI model, a second version of the structured service report by modifying the first version of the structured service report to comply with the set of standards.

In some embodiments, automatically generating the structured service report includes cross-referencing metadata associated with two or more unstructured data elements of the unstructured service report to determine whether the two or more unstructured data elements are related, generating two or more structured data elements of the structured service report based on the two or more unstructured data elements, and associating the two or more structured data elements with each other in the structured service report in response to determining that the two or more unstructured data elements are related.

In some embodiments, the metadata include timestamps indicating times at which the two or more unstructured data elements are generated. In some embodiments, determining that the two or more unstructured data elements are related includes comparing the timestamps.

In some embodiments, the metadata include location attributes indicating spatial locations in a building or campus at which the two or more unstructured data elements are generated. In some embodiments, determining that the two or more unstructured data elements are related includes comparing the location attributes.

In some embodiments, associating the two or more structured data elements with each other in the structured service report includes placing the two or more structured data elements in proximity to each other in the structured service report.

In some embodiments, associating the two or more structured data elements with each other in the structured service report includes adding a label to a first structured data element of the two or more structured data elements in the structured service report, the label referring to a second data element of the two or more structured data elements in the structured service report.

In some embodiments, the two or more unstructured data elements include at least two of text data, speech data, audio data, image data, video data, or freeform data.

In some embodiments, the unstructured data conform to the plurality of different predetermined formats including at least two of a text format, a speech format, an audio format, an image format, a video format, or a data file format.

In some embodiments, the predetermined format is a structured data format including one or more predetermined fields or locations and one or more predetermined labels or identifiers characterizing the one or more predetermined fields or locations. In some embodiments, the unstructured data include freeform data not conforming to the structured data format.

In some embodiments, the unstructured data include multi-modal data provided by a plurality of different sensory devices including at least two of an audio capture device, a video capture device, an image capture device, a text capture device, or a handwriting capture device.

In some embodiments, the method further includes training, by the one or more processors, the generative AI model using training data including a plurality of unstructured service reports corresponding to a plurality of service requests handled by technicians for servicing building equipment. The training data may not conform to the predetermined format or may conform to the plurality of different predetermined formats.

In some embodiments, the training data further include one or more structured service reports conforming to the predetermined format and including one or more predefined form sections or fields. In some embodiments, automatically generating the structured service report includes populating the one or more predefined form sections or fields with structured data elements generated from the unstructured data of the unstructured service report.

In some embodiments, automatically generating the structured service report includes identifying a customer, a building, or a type of the building equipment associated with the service request; selecting a predefined template for the structured service report from a set of multiple predefined templates based on the identified customer, building, or type of the building equipment; and generating the structured service report to conform to the predefined template.

In some embodiments, the method further includes receiving, by the one or more processors, additional data from one or more additional data sources separate from the unstructured service report. Automatically generating the structured service report may include using the additional data to generate the additional content not provided within the unstructured service report.

In some embodiments, the additional data include operational data generated during operation of the building equipment. Generating the additional content may include using the operational data to construct one or more charts, graphs, or graphical data elements in the structured service report.

In some embodiments, the additional data include at least one of engineering data indicating characteristics of the building equipment, operational data generated during operation of the building equipment, warranty data indicating a warranty and/or warranty status associated with the building equipment, parts data indicating parts usage associated with the building equipment, or outcome data indicating outcomes of one or more of service requests.

In some embodiments, the additional data include data generated by one or more other models separate from the generative AI model. The one or more other models may include at least one of a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, or an air quality model configured to predict air quality in one or more building spaces as a result of the operation of the building equipment.

In some embodiments, automatically generating the structured service report includes using the generative AI model to identify new correlations and/or patterns between (i) the unstructured data of the unstructured service report and (ii) the additional data from the one or more additional data sources.

In some embodiments, automatically generating the structured service report includes using the generative AI model to identify new correlations and/or patterns between two or more unstructured data elements of the unstructured service report.

In some embodiments, the method further includes receiving, by the one or more processors, feedback indicating a quality of the structured service report and configuring or updating, by the one or more processors, the generative AI model using the feedback.

In some embodiments, the feedback includes user input from one or more subject matter experts. The user input may include at least one of binary feedback associating the structured service report with a predetermined binary category, technical feedback indicating whether the structured service report satisfies technical accuracy or precision criteria, score feedback assigning a score to the structured service report on a predetermined scale, or freeform feedback from the one or more subject matter experts.

Another implementation of the present disclosure is a method including receiving, by one or more processors, training data including a plurality of first unstructured service reports corresponding to a plurality of first service requests handled by technicians for servicing building equipment. The plurality of first unstructured service reports may include unstructured data not conforming to a predetermined format or conforming to a plurality of different predetermined formats. The training data may further include one or more technical documents associated with the building equipment. The method may include training, by the one or more processors using the training data, a generative AI model to automatically generate a structured service report in the predetermined format for delivery to a customer associated with the building equipment. The structured service report may be generated by the generative AI model based on a second unstructured service report not conforming to the predetermined format or conforming to the plurality of different predetermined formats and generating the structured service report in the predetermined format may include standardizing the structured service report to comply with a set of standards extracted from the one or more technical documents associated with the building equipment.

In some embodiments, the technical documents include at least one of product manuals, user manuals, installation manuals, instruction manuals, or operating procedure guides for the building equipment. In some embodiments, the set of standards includes standard terminology used in the technical documents. In some embodiments, generating the structured service report in the predetermined format includes modifying one or more textual elements in the unstructured service report to comply with the standard terminology.

In some embodiments, the technical documents include at least one of product manuals, user manuals, installation manuals, instruction manuals, or operating procedure guides for the building equipment. In some embodiments, the set of standards includes standard styles used in the technical documents. In some embodiments, generating the structured service report in the predetermined format includes modifying one or more stylistic elements in the unstructured service report to comply with the standard styles.

In some embodiments, the technical documents include a standard terminology guide associated with at least one of product manuals, user manuals, installation manuals, instruction manuals, or operating procedure guides for the building equipment. In some embodiments, the set of standards includes standard terminology provided in the standard terminology guide. In some embodiments, generating the structured service report in the predetermined format includes modifying one or more textual elements in the unstructured service report to comply with the standard terminology.

In some embodiments, the technical documents include a style guide associated with at least one of product manuals, user manuals, installation manuals, instruction manuals, or operating procedure guides for the building equipment. In some embodiments, the set of standards includes a standard style provided in the standard style guide. In some embodiments, generating the structured service report in the predetermined format includes modifying one or more stylistic elements in the unstructured service report to comply with the standard style.

In some embodiments, generating the structured service report includes generating, using a first generative AI model, a first version of the structured service report that complies with a predetermined template and generating, using a second generative AI model, a second version of the structured service report by modifying the first version of the structured service report to comply with the set of standards.

In some embodiments, the training data further include one or more structured service reports conforming to the predetermined format and including one or more predefined form sections or fields. In some embodiments, automatically generating the structured service report includes populating the one or more predefined form sections or fields with structured data elements generated from unstructured data of the second unstructured service report.

In some embodiments, the unstructured data conform to the plurality of different predetermined formats including at least two of a text format, a speech format, an audio format, an image format, a video format, or a data file format.

In some embodiments, the predetermined format is a structured data format including one or more predetermined fields or locations and one or more predetermined labels or identifiers characterizing the one or more predetermined fields or locations. In some embodiments, the unstructured data include freeform data not conforming to the structured data format.

In some embodiments, the unstructured data include multi-modal data provided by a plurality of different sensory devices including at least two of an audio capture device, a video capture device, an image capture device, a text capture device, or a handwriting capture device.

In some embodiments, training the generative AI model includes identifying a customer, a building, or a type of the building equipment associated with each of a plurality of first unstructured service reports; selecting a predefined template for the structured service report from a set of multiple predefined templates based on the identified customer, building, or type of the building equipment; and training the generative AI model to generate the structured service report to conform to the predefined template.

In some embodiments, the training data further include additional data from one or more additional data sources separate from the plurality of first unstructured service reports. In some embodiments, training the generative AI model includes using the additional data in combination with the unstructured data of the plurality of first unstructured service reports to configure the generative AI model.

In some embodiments, the additional data include operational data generated during operation of the building equipment. In some embodiments, training the generative AI model includes configuring the generative AI model to generate the additional content using the operational data. The additional content may include one or more charts, graphs, or graphical data elements in the structured service report.

In some embodiments, the additional data include at least one of engineering data indicating characteristics of the building equipment, operational data generated during operation of the building equipment, warranty data indicating a warranty and/or warranty status associated with the building equipment, parts data indicating parts usage associated with the building equipment, or outcome data indicating outcomes of one or more of the plurality of first service requests.

In some embodiments, the additional data include data generated by one or more other models separate from the generative AI model. The one or more other models may include at least one of a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, or an air quality model configured to predict air quality in one or more building spaces as a result of the operation of the building equipment.

Another implementation of the present disclosure is a method including receiving, by one or more processors, an unstructured service report corresponding to a service request handled by one or more technicians for servicing building equipment. The unstructured service report may include unstructured data not conforming to a predetermined format or conforming to a plurality of different predetermined formats. The method may include extracting, by the one or more processors, a set of standards from one or more technical documents associated with the building equipment. The method may include automatically generating, by the one or more processors using a machine learning model, a structured service report in the predetermined format for delivery to a customer associated with the building equipment. Generating the structured service report in the predetermined format may include standardizing the structured service report to comply with the set of standards extracted from the one or more technical documents associated with the building equipment.

In some embodiments, the technical documents include at least one of product manuals, user manuals, installation manuals, instruction manuals, or operating procedure guides for the building equipment. In some embodiments, the set of standards includes standard terminology or standard styles used in the technical documents. In some embodiments, generating the structured service report in the predetermined format includes modifying one or more textual elements in the unstructured service report to comply with the standard terminology or modifying one or more stylistic elements in the unstructured service report to comply with the standard styles.

In some embodiments, automatically generating the structured service report includes cross-referencing metadata associated with two or more unstructured data elements of the unstructured service report to determine whether the two or more unstructured data elements are related, generating two or more structured data elements of the structured service report based on the two or more unstructured data elements, and associating the two or more structured data elements with each other in the structured service report in response to determining that the two or more unstructured data elements are related.

In some embodiments, the metadata include timestamps indicating times at which the two or more unstructured data elements are generated. In some embodiments, determining that the two or more unstructured data elements are related includes comparing the timestamps.

In some embodiments, the metadata include location attributes indicating spatial locations in a building or campus at which the two or more unstructured data elements are generated. In some embodiments, determining that the two or more unstructured data elements are related includes comparing the location attributes.

In some embodiments, associating the two or more structured data elements with each other in the structured service report includes placing the two or more structured data elements in proximity to each other in the structured service report.

In some embodiments, associating the two or more structured data elements with each other in the structured service report includes adding a label to a first structured data element of the two or more structured data elements in the structured service report, the label referring to a second data element of the two or more structured data elements in the structured service report.

In some embodiments, the two or more unstructured data elements include at least two of text data, speech data, audio data, image data, video data, or freeform data.

In some embodiments, the unstructured data conform to the plurality of different predetermined formats including at least two of a text format, a speech format, an audio format, an image format, a video format, or a data file format.

In some embodiments, the predetermined format is a structured data format including one or more predetermined fields or locations and one or more predetermined labels or identifiers characterizing the one or more predetermined fields or locations. In some embodiments, the unstructured data include freeform data not conforming to the structured data format.

In some embodiments, the unstructured data include multi-modal data provided by a plurality of different sensory devices including at least two of an audio capture device, a video capture device, an image capture device, a text capture device, or a handwriting capture device.

In some embodiments, the method further includes training, by the one or more processors, the machine learning model using training data including a plurality of unstructured service reports corresponding to a plurality of service requests handled by technicians for servicing building equipment. The training data may not conform to the predetermined format or may conform to the plurality of different predetermined formats.

In some embodiments, the training data further include one or more structured service reports conforming to the predetermined format and including one or more predefined form sections or fields. In some embodiments, automatically generating the structured service report includes populating the one or more predefined form sections or fields with structured data elements generated from the unstructured data of the unstructured service report.

In some embodiments, automatically generating the structured service report includes identifying a customer, a building, or a type of the building equipment associated with the service request; selecting a predefined template for the structured service report from a set of multiple predefined templates based on the identified customer, building, or type of the building equipment; and generating the structured service report to conform to the predefined template.

In some embodiments, the method further includes receiving, by the one or more processors, additional data from one or more additional data sources separate from the unstructured service report. Automatically generating the structured service report may include using the additional data to generate the additional content not provided within the unstructured service report.

In some embodiments, the additional data include operational data generated during operation of the building equipment. Generating the additional content may include using the operational data to construct one or more charts, graphs, or graphical data elements in the structured service report.

In some embodiments, the additional data include at least one of engineering data indicating characteristics of the building equipment, operational data generated during operation of the building equipment, warranty data indicating a warranty and/or warranty status associated with the building equipment, parts data indicating parts usage associated with the building equipment, or outcome data indicating outcomes of one or more of service requests.

In some embodiments, the additional data include data generated by one or more other models separate from the machine learning model. The one or more other models may include at least one of a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, or an air quality model configured to predict air quality in one or more building spaces as a result of the operation of the building equipment.

In some embodiments, automatically generating the structured service report includes using the machine learning model to identify new correlations and/or patterns between (i) the unstructured data of the unstructured service report and (ii) the additional data from the one or more additional data sources.

In some embodiments, automatically generating the structured service report includes using the machine learning model to identify new correlations and/or patterns between two or more unstructured data elements of the unstructured service report.

In some embodiments, the method further includes receiving, by the one or more processors, feedback indicating a quality of the structured service report and configuring or updating, by the one or more processors, the machine learning model using the feedback.

In some embodiments, the feedback includes user input from one or more subject matter experts. The user input may include at least one of binary feedback associating the structured service report with a predetermined binary category, technical feedback indicating whether the structured service report satisfies technical accuracy or precision criteria, score feedback assigning a score to the structured service report on a predetermined scale, or freeform feedback from the one or more subject matter experts.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 14 is a flow diagram of a process for training an AI model using data gathered from various data sources, according to some embodiments.

FIG. 15 is a flow diagram of a process for using an AI model to generate a structured data output using data gathered from various data sources, according to some embodiments.

FIG. 18 is a flow diagram of a process for training and using an AI model to perform root cause prediction, according to some embodiments.

FIG. 19 is a flow diagram of a process for using a trained AI model to predict root causes of problems, according to some embodiments.

FIG. 22 is a flow diagram of a process for training and using an AI model to automatically initiate actions or interventions to address problems with building equipment, according to some embodiments.

FIG. 23 is a flow diagram of a process for using an AI model to automatically initiate actions to address problems associated with building equipment, according to some embodiments.

FIG. 27 is a drawing of an executive summary section of a report which can be generated by the systems and methods of FIGS. 1-25, according to some embodiments.

FIG. 28 is a drawing of a chiller performance index (CPI) section of the report of FIG. 27 which can be generated by the systems and methods of FIGS. 1-25, according to some embodiments.

FIG. 29 is a drawing of a chiller alarms and notifications section of the report of FIG. 27 which can be generated by the systems and methods of FIGS. 1-25, according to some embodiments.

FIG. 30 is a drawing of a maintenance report section of the report of FIG. 27 which can be generated by the systems and methods of FIGS. 1-25, according to some embodiments.

FIG. 32 is a drawing of health chart conditions section and an event occurrence section of the report of FIG. 27 which can be generated by the systems and methods of FIGS. 1-25, according to some embodiments.

FIGS. 33-36 are drawings of an alarms, alerts, and faults detected section of the report of FIG. 27 which can be generated by the systems and methods of FIGS. 1-25, according to some embodiments.

DETAILED DESCRIPTION

Figure 1:
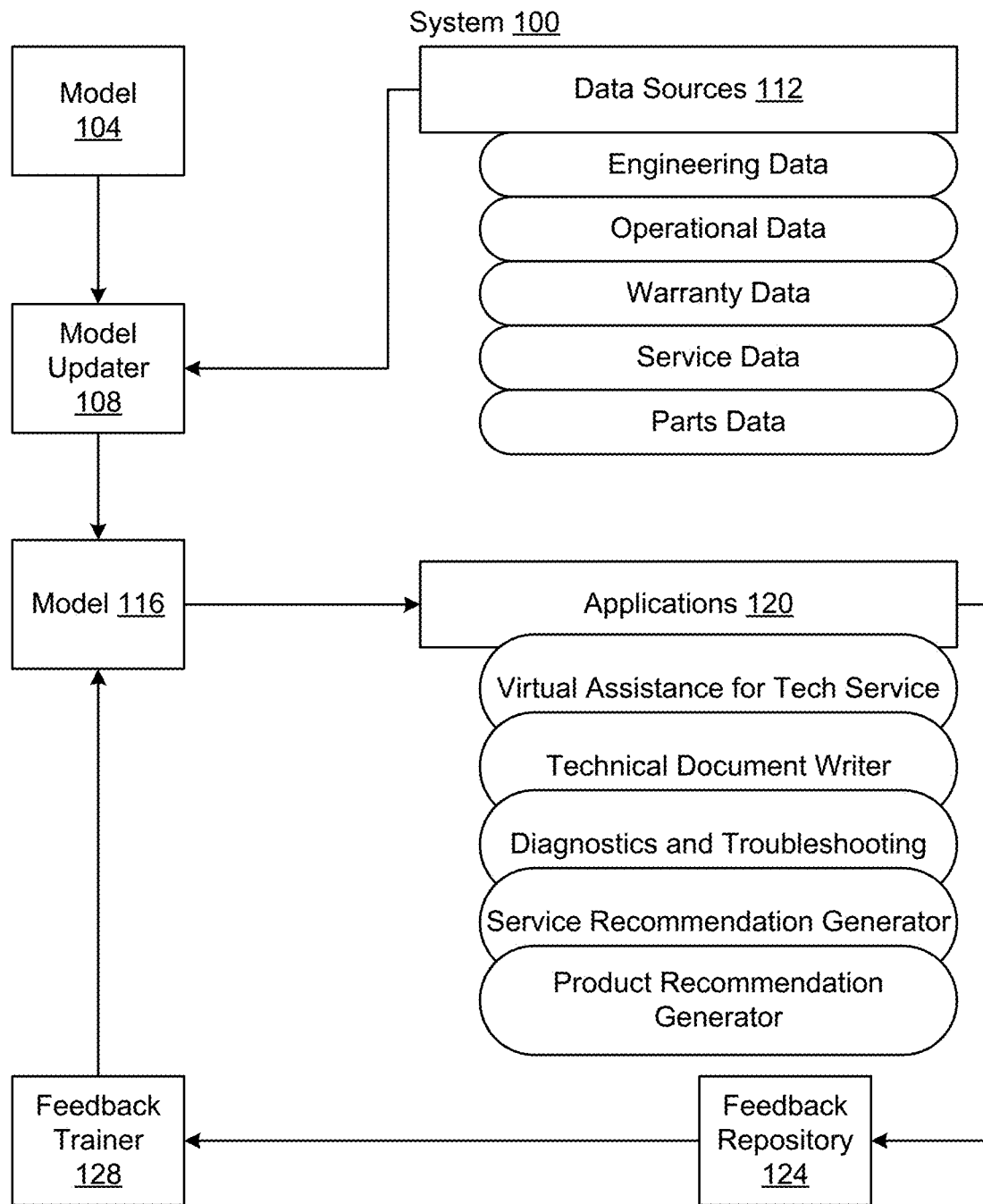
FIG. 1 is a block diagram of an example of a machine learning model-based system for equipment servicing applications, according to some embodiments.

Referring generally to the FIGURES, systems and methods in accordance with the present disclosure can implement various systems to precisely generate data relating to operations to be performed for managing building systems and components and/or items of equipment, including heating, ventilation, cooling, and/or refrigeration (HVAC-R) systems and components. For example, various systems described herein can be implemented to more precisely generate data for various applications including, for example and without limitation, virtual assistance for supporting technicians responding to service requests; generating technical reports corresponding to service requests; facilitating diagnostics and troubleshooting procedures; recommendations of services to be performed; and/or recommendations for products or tools to use or install as part of service operations. Various such applications can facilitate both asynchronous and real-time service operations, including by generating text data for such applications based on data from disparate data sources that may not have predefined database associations amongst the data sources, yet may be relevant at specific steps or points in time during service operations.

In some systems, service operations can be supported by text information, such as predefined text documents such as service, diagnostic, and/or troubleshooting guides. Various such text information may not be useful for specific service requests and/or technicians performing the service. For example, the text information may correspond to different items of equipment or versions of items of equipment to be serviced. The text information, being predefined, may not account for specific technical issues that may be present in the items of equipment to be serviced.

AI and/or machine learning (ML) systems, including but not limited to LLMs, can be used to generate text data and data of other modalities in a more responsive manner to real-time conditions, including generating strings of text data that may not be provided in the same manner in existing documents, yet may still meet criteria for useful text information, such as relevance, style, and coherence. For example, LLMs can predict text data based at least on inputted prompts and by being configured (e.g., trained, modified, updated, fine-tuned) according to training data representative of the text data to predict or otherwise generate.

However, various considerations may limit the ability of such systems to precisely generate appropriate data for specific conditions. For example, due to the predictive nature of the generated data, some LLMs may generate text data that is incorrect, imprecise, or not relevant to the specific conditions. Using the LLMs may require a user to manually vary the content and/or syntax of inputs provided to the LLMs (e.g., vary inputted prompts) until the output of the LLMs meets various objective or subjective criteria of the user. The LLMs can have token limits for sizes of inputted text during training and/or runtime/inference operations (and relaxing or increasing such limits may require increased computational processing, API calls to LLM services, and/or memory usage), limiting the ability of the LLMs to be effectively configured or operated using large amounts of raw data or otherwise unstructured data.

Systems and methods in accordance with the present disclosure can use machine learning models, including LLMs and other generative AI systems, to capture data, including but not limited to unstructured knowledge from various data sources, and process the data to accurately generate outputs, such as completions responsive to prompts, including in structured data formats for various applications and use cases. The system can implement various automated and/or expert-based thresholds and data quality management processes to improve the accuracy and quality of generated outputs and update training of the machine learning models accordingly. The system can enable real-time messaging and/or conversational interfaces for users to provide field data regarding equipment to the system (including presenting targeted queries to users that are expected to elicit relevant responses for efficiently receiving useful response information from users) and guide users, such as service technicians, through relevant service, diagnostic, troubleshooting, and/or repair processes.

This can include, for example, receiving data from technician service reports in various formats, including various modalities and/or multi-modal formats (e.g., text, speech, audio, image, and/or video). The system can facilitate automated, flexible customer report generation, such as by processing information received from service technicians and other users into a standardized format, which can reduce the constraints on how the user submits data while improving resulting reports. The system can couple unstructured service data to other input/output data sources and analytics, such as to relate unstructured data with outputs of timeseries data from equipment (e.g., sensor data; report logs) and/or outputs from models or algorithms of equipment operation, which can facilitate more accurate analytics, prediction services, diagnostics, and/or fault detection. The system can perform classification or other pattern recognition or trend detection operations to facilitate more timely assignment of technicians, scheduling of technicians based on expected times for jobs, and provisioning of trucks, tools, and/or parts. The system can perform root cause prediction by being trained using data that includes indications of root causes of faults or errors, where the indications are labels for or otherwise associated with (unstructured or structure) data such as service requests, service reports, service calls, etc. The system can receive, from a service technician in the field evaluating the issue with the equipment, feedback regarding the accuracy of the root cause predictions, as well as feedback regarding how the service technician evaluated information about the equipment (e.g., what data did they evaluate; what did they inspect; did the root cause prediction or instructions for finding the root cause accurately match the type of equipment, etc.), which can be used to update the root cause prediction model.

For example, the system can provide a platform for fault detection and servicing processes in which a machine learning model is configured based on connecting or relating unstructured data and/or semantic data, such as human feedback and written/spoken reports, with time-series product data regarding items of equipment, so that the machine learning model can more accurately detect causes of alarms or other events that may trigger service responses. For instance, responsive to an alarm for a chiller, the system can more accurately detect a cause of the alarm, and generate a prescription (e.g., for a service technician) for responding to the alarm; the system can request feedback from the service technician regarding the prescription, such as whether the prescription correctly identified the cause of the alarm and/or actions to perform to respond to the cause, as well as the information that the service technician used to evaluate the correctness or accuracy of the prescription; the system can use this feedback to modify the machine learning models, which can increase the accuracy of the machine learning models.

In some instances, significant computational resources (or human user resources) can be required to process data relating to equipment operation, such as time-series product data and/or sensor data, to detect or predict faults and/or causes of faults. In addition, it can be resource-intensive to label such data with identifiers of faults or causes of faults, which can make it difficult to generate machine learning training data from such data. Systems and methods in accordance with the present disclosure can leverage the efficiency of language models (e.g., GPT-based models or other pre-trained LLMs) in extracting semantic information (e.g., semantic information identifying faults, causes of faults, and other accurate expert knowledge regarding equipment servicing) from the unstructured data in order to use both the unstructured data and the data relating to equipment operation to generate more accurate outputs regarding equipment servicing. As such, by implementing language models using various operations and processes described herein, building management and equipment servicing systems can take advantage of the causal/semantic associations between the unstructured data and the data relating to equipment operation, and the language models can allow these systems to more efficiently extract these relationships in order to more accurately predict targeted, useful information for servicing applications at inference-time/runtime. While various implementations are described as being implemented using generative AI models such as transformers and/or GANs, in some embodiments, various features described herein can be implemented using non-generative AI models or even without using AI/machine learning, and all such modifications fall within the scope of the present disclosure.

The system can enable a generative AI-based interactive service tool interface. For example, the interface can include user interface and/or user experience features configured to provide a question/answer-based input/output format, such as a conversational interface, that directs users through providing targeted information for accurately generating predictions of root cause, presenting solutions, or presenting instructions for repairing or inspecting the equipment to identify information that the system can use to detect root causes or other issues. The system can use the interface to present information regarding parts and/or tools to service the equipment, as well as instructions for how to use the parts and/or tools to service the equipment. In some embodiments, the interface includes the functionality of a wizard (e.g., a series of guided prompts) where the prompts are generated dynamically in response to the user input via the interface. For example, the AI-based model may generate and present dynamic text, drawings, or other content in response to the user input via the interface facilitate conversational interaction with the user in a fluid and dynamic manner (e.g., without requiring pre-coded or static prompts).

In various implementations, the systems can include a plurality of machine learning models that may be configured using integrated or disparate data sources. This can facilitate more integrated user experiences or more specialized (and/or lower computational usage for) data processing and output generation. Outputs from one or more first systems, such as one or more first algorithms or machine learning models, can be provided at least as part of inputs to one or more second systems, such as one or more second algorithms or machine learning models. For example, a first language model can be configured to process unstructured inputs (e.g., text, speech, images, etc.) into a structure output format compatible for use by a second system, such as a root cause prediction algorithm or equipment configuration model.

The system can be used to automate interventions for equipment operation, servicing, fault detection and diagnostics (FDD), and alerting operations. For example, by being configured to perform operations such as root cause prediction, the system can monitor data regarding equipment to predict events associated with faults and trigger responses such as alerts, service scheduling, and initiating FDD or modifications to configuration of the equipment. The system can present to a technician or manager of the equipment a report regarding the intervention (e.g., action taken responsive to predicting a fault or root cause condition) and requesting feedback regarding the accuracy of the intervention, which can be used to update the machine learning models to more accurately generate interventions.

It should be understood that, throughout the present disclosure, where features or methods or portions thereof are described as being performed by or using generative AI models, in various implementations, such elements may be performed using non-generative models or algorithms, such as non-generative AI models (e.g., non-generative neural networks), alone or in combination with generative AI models, unless expressly indicated otherwise. All such implementations are contemplated within the scope of the present disclosure.

I. Machine Learning Models for Building Management and Equipment Servicing

FIG. 1 depicts an example of a system 100. The system 100 can implement various operations for configuring (e.g., training, updating, modifying, transfer learning, fine-tuning, etc.) and/or operating various AI and/or ML systems, such as neural networks of LLMs or other generative AI systems. The system 100 can be used to implement various generative AI-based building equipment servicing operations.

For example, the system 100 can be implemented for operations associated with any of a variety of building management systems (BMSs) or equipment or components thereof. A BMS can include a system of devices that can control, monitor, and manage equipment in or around a building or building area. The BMS can include, for example, a HVAC system, a security system, a lighting system, a fire alerting system, any other system that is capable of managing building functions or devices, or any combination thereof. The BMS can include or be coupled with items of equipment, for example and without limitation, such as heaters, chillers, boilers, air handling units, sensors, actuators, refrigeration systems, fans, blowers, heat exchangers, energy storage devices, condensers, valves, or various combinations thereof.

The items of equipment can operate in accordance with various qualitative and quantitative parameters, variables, setpoints, and/or thresholds or other criteria, for example. In some instances, the system 100 and/or the items of equipment can include or be coupled with one or more controllers for controlling parameters of the items of equipment, such as to receive control commands for controlling operation of the items of equipment via one or more wired, wireless, and/or user interfaces of controller.

Various components of the system 100 or portions thereof can be implemented by one or more processors coupled with or more memory devices (memory). The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors can be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources.

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

Machine Learning Models

The system 100 can include or be coupled with one or more first models 104. The first model 104 can include one or more neural networks, including neural networks configured as generative models. For example, the first model 104 can predict or generate new data (e.g., artificial data; synthetic data; data not explicitly represented in data used for configuring the first model 104). The first model 104 can generate any of a variety of modalities of data, such as text, speech, audio, images, and/or video data. The neural network can include a plurality of nodes, which may be arranged in layers for providing outputs of one or more nodes of one layer as inputs to one or more nodes of another layer. The neural network can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first model 104 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, the first model 104 can include at least one GPT model. The GPT model can receive an input sequence, and can parse the input sequence to determine a sequence of tokens (e.g., words or other semantic units of the input sequence, such as by using Byte Pair Encoding tokenization). The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the token tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer based operations or networks to the modified input sequence to identify relationships between tokens for detecting the next token to form the output sequence.

The first model 104 can include at least one diffusion model, which can be used to generate image and/or video data. For example, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first model 104 includes a plurality of generative models, such as GPT and diffusion models, that can be trained separately or jointly to facilitate generating multi-modal outputs, such as technical documents (e.g., service guides) that include both text and image/video information.

In some implementations, the first model 104 can be configured using various unsupervised and/or supervised training operations. The first model 104 can be configured using training data from various domain-agnostic and/or domain-specific data sources, including but not limited to various forms of text, speech, audio, image, and/or video data, or various combinations thereof. The training data can include a plurality of training data elements (e.g., training data instances). Each training data element can be arranged in structured or unstructured formats; for example, the training data element can include an example output mapped to an example input, such as a query representing a service request or one or more portions of a service request, and a response representing data provided responsive to the query. The training data can include data that is not separated into input and output subsets (e.g., for configuring the first model 104 to perform clustering, classification, or other unsupervised ML operations). The training data can include human-labeled information, including but not limited to feedback regarding outputs of the models 104, 116. This can allow the system 100 to generate more human-like outputs.

In some implementations, the training data includes data relating to building management systems. For example, the training data can include examples of HVAC-R data, such as operating manuals, technical data sheets, configuration settings, operating setpoints, diagnostic guides, troubleshooting guides, user reports, technician reports. In some implementations, the training data used to configure the first model 104 includes at least some publicly accessible data, such as data retrievable via the Internet.

Referring further to FIG. 1, the system 100 can configure the first model 104 to determine one or more second models 116. For example, the system 100 can include a model updater 108 that configures (e.g., trains, updates, modifies, fine-tunes, etc.) the first model 104 to determine the one or more second models 116. In some implementations, the second model 116 can be used to provide application-specific outputs, such as outputs having greater precision, accuracy, or other metrics, relative to the first model, for targeted applications.

The second model 116 can be similar to the first model 104. For example, the second model 116 can have a similar or identical backbone or neural network architecture as the first model 104. In some implementations, the first model 104 and the second model 116 each include generative AI machine learning models, such as LLMs (e.g., GPT-based LLMs) and/or diffusion models. The second model 116 can be configured using processes analogous to those described for configuring the first model 104.

In some implementations, the model updater 108 can perform operations on at least one of the first model 104 or the second model 116 via one or more interfaces, such as application programming interfaces (APIs). For example, the models 104, 116 can be operated and maintained by one or more systems separate from the system 100. The model updater 108 can provide training data to the first model 104, via the API, to determine the second model 116 based on the first model 104 and the training data. The model updater 108 can control various training parameters or hyperparameters (e.g., learning rates, etc.) by providing instructions via the API to manage configuring the second model 116 using the first model 104.

Data Sources

The model updater 108 can determine the second model 116 using data from one or more data sources 112. For example, the system 100 can determine the second model 116 by modifying the first model 104 using data from the one or more data sources 112. The data sources 112 can include or be coupled with any of a variety of integrated or disparate databases, data warehouses, digital twin data structures (e.g., digital twins of items of equipment or building management systems or portions thereof), data lakes, data repositories, documentation records, or various combinations thereof. In some implementations, the data sources 112 include HVAC-R data in any of text, speech, audio, image, or video data, or various combinations thereof, such as data associated with HVAC-R components and procedures including but not limited to installation, operation, configuration, repair, servicing, diagnostics, and/or troubleshooting of HVAC-R components and systems. Various data described below with reference to data sources 112 may be provided in the same or different data elements, and may be updated at various points. The data sources 112 can include or be coupled with items of equipment (e.g., where the items of equipment output data for the data sources 112, such as sensor data, etc.). The data sources 112 can include various online and/or social media sources, such as blog posts or data submitted to applications maintained by entities that manage the buildings. The system 100 can determine relations between data from different sources, such as by using timeseries information and identifiers of the sites or buildings at which items of equipment are present to detect relationships between various different data relating to the items of equipment (e.g., to train the models 104, 116 using both timeseries data (e.g., sensor data; outputs of algorithms or models, etc.) regarding a given item of equipment and freeform natural language reports regarding the given item of equipment).

The data sources 112 can include unstructured data or structured data. Unstructured data may include data that does not conform to a predetermined format or data that conforms to a plurality of different predetermined formats. For example, the unstructured data may include freeform data that does not conform to any particular format (e.g., freeform text or other freeform data) and/or data that conforms to a combination of different predetermined formats (e.g., a text format, a speech format, an audio format, an image format, a video format, a data file format, etc.). In some embodiments, the unstructured data includes multi-modal data provided by different types of sensory devices (e.g., an audio capture device, a video capture device, an image capture device, a text capture device, a handwriting capture device, etc.). Conversely, structured data may include data that conforms to a predetermined format. In some embodiments, structured data includes data that is labeled with or assigned to one or more predetermined fields or identifiers. For example, the structured data may conform to a structured data format including one or more predetermined fields or locations and one or more predetermined labels or identifiers characterizing the one or more predetermined fields or locations. Advantageously, using the first model 104 and/or second model 116 to process the data can allow the system 100 to extract useful information from data in a variety of formats, including unstructured/freeform formats, which can allow service technicians to input information in less burdensome formats. The data can be of any of a plurality of formats (e.g., text, speech, audio, image, video, etc.), including multi-modal formats. For example, the data may be received from service technicians in forms such as text (e.g., laptop/desktop or mobile application text entry), audio, and/or video (e.g., dictating findings while capturing video). Any of the various data sources 112 described herein can include any combination of structured or unstructured data in any format or combination of formats, or data that does not conform to any particular format.

The data sources 112 can include engineering data regarding one or more items of equipment. The engineering data can include manuals, such as user manuals, installation manuals, instruction manuals, or operating procedure guides. The engineering data can include specifications or other information regarding operation of items of equipment. The engineering data can include engineering drawings, process flow diagrams, refrigeration cycle parameters (e.g., temperatures, pressures), or various other information relating to structures and functions of items of equipment.

In some embodiments, the engineering data indicate various attributes or characteristics of the corresponding items of equipment such as their physical sizes or dimensions (e.g., height, width, depth, etc.), maximum or minimum capacities or operating limits (e.g., minimum or maximum heating capacity, cooling capacity, fluid storage capacity, energy storage capacity, flow rates, thresholds, limits, etc.), required connections to other items of equipment, types of resources produced or consumed by the items of equipment, equipment models that characterize the operating performance of the items of equipment, or any other information that describes or characterizes the items of equipment. For example, the equipment model for a chiller may indicate that the chiller consumes water and electricity as input resources and produces chilled water as an output resource, and may indicate a relationship or function (e.g., an equipment performance curve) between the input resources consumed and output resources produced. Several examples of equipment models for various types of equipment are described in detail in U.S. Pat. No. 10,706,375 granted Jul. 7, 2020, U.S. Pat. No. 11,449,454 granted Sep. 20, 2022, U.S. Pat. No. 9,778,639 granted Oct. 3, 2017, and U.S. Pat. No. 10,372,146 granted Aug. 6, 2019, the entire disclosures of which are incorporated by reference herein. The engineering data can include structured and/or unstructured data of any type or format.

In some embodiments, the data sources 112 include technical documentation such as product manuals, user manuals, installation manuals, instruction manuals, or operating procedure guides for various types of equipment. The data sources 112 may include style guides used by technical writers when creating such technical documentation. Style guides may include formatting guidelines (e.g., font guidelines, document formatting guidelines, numbering guidelines, paragraph formatting guidelines, text alignment guidelines, line spacing guidelines, etc.), standard terminology used by a given entity to refer to their products or services, writing guidelines, or other information or documentation used by technical writers to ensure that technical documentation has a consistent style. Style guides may be associated with a given equipment manufacturer, equipment supplier, service provider, or other entity to ensure that written communications and documentation produced by that entity have a consistent style. In some embodiments, the data sources 112 include a set of standard terminology for use in describing equipment service issues, faults, solutions, recommended actions, or other language or terms included in service reports. Such information can be used to ensure that a service report created by a service technician or automatically by the systems and methods described herein have a consistent or standard style across various service technicians, customers, products, documents, or other written materials produced by the entity.

In some implementations, the data sources 112 can include operational data regarding one or more items of equipment. The operational data can represent detected information regarding items of equipment, such as timeseries data, sensor data, logged data, user reports, or technician reports. The operational data can include, for example, service tickets generated responsive to requests for service, work orders, data from digital twin data structures maintained by an entity of the item of equipment, outputs or other information from equipment operation models (e.g., chiller vibration models), or various combinations thereof. Logged data, user reports, service tickets, billing records, time sheets, and various other such data can provide temporal information, such as how long service operations may take, or durations of time between service operations, which can allow the system 100 to predict resources to use for performing service as well as when to request service.

The operational data can include data generated during operation of the building equipment (e.g., measurements from sensors, control signals generated by building equipment, operating states or parameters of the building equipment, etc.) and/or data based on the raw data generated during operation of the building equipment. For example, the operational data can include various types of timeseries data (e.g., timestamped data samples of a given measurement, point, or other data item) such as raw timeseries data generated or observed during operation of the building equipment and/or derived timeseries data generated by processing one or more raw data timeseries. Derived timeseries data may include, for example, fault detection timeseries (e.g., a timeseries that indicates whether a fault is detected at each time step), analytic result timeseries (e.g., a timeseries that indicates the result of a given analytic or metric calculated at each time step), prediction timeseries (e.g., a timeseries of predicted values for future time steps), diagnostic timeseries (e.g., a timeseries of diagnostic results at various time steps), model output timeseries (e.g., a timeseries of values output by a model), or any other type of timeseries that can be created or derived from timeseries data or samples thereof. These and other examples of timeseries data are described in greater detail in U.S. Pat. No. 10,095,756 granted Oct. 9, 2018, the entire disclosure of which is incorporated by reference herein. In some embodiments, the operational data include eventseries data including series of events with corresponding start times and end times. Eventseries are described in greater detail in U.S. Pat. No. 10,417,245 granted Sep. 17, 2019, the entire disclosure of which is incorporated by reference herein.

In some embodiments, the operational data include text data, image data, video data, audio data, or other data that characterize the operation of building equipment. For example, the operational data may include a photograph, image, video, or audio sample of the building equipment taken by a user or technician during operation of the equipment or when performing service or generating a service request. The operational data may include freeform text data entered by a technician or user to record observations of the building equipment or describe problems associated with the building equipment. In some embodiments, the operational data are generated in response to a request for such data by the system 100 (e.g., as part of an automated diagnostic process to determine the root cause of a problem or fault, recorded by a user in response to a prompt for such data from the system 100, etc.). Alternatively or additionally, the operational data may be recorded automatically by one or more sensors (e.g., temperature sensors, optical sensors, vibration sensors, flow rate sensors, etc.) that are positioned to observe the operation of the building equipment or an effect of the building equipment on a variable state or condition in a building system (e.g., temperature or humidity within a building zone, fluid flow rate within a duct or pipe, vibration of a chiller compressor, air quality within a building zone, etc.). The operational data can include structured and/or unstructured data of any type or format.

The data sources 112 can include, for instance, warranty data. The warranty data can include warranty documents or agreements that indicate conditions under which various entities associated with items of equipment are to provide service, repair, or other actions corresponding to items of equipment, such as actions corresponding to service requests. In some embodiments, the warranty data indicate whether the items of equipment are under warranty, the time period during which the items of equipment are under warranty (e.g., start date, end date, etc.), the particular types of service, repair, or other actions which are covered by the warranty, a cost (if any) paid by the customer for the warranty, or any other attributes of the warranty. The warranty data can include warranty claims submitted by users or customers for various items of equipment and/or any actions performed by the equipment manufacturer or other entity (e.g., service providers) in response to the warranty claims. For example, the warranty data for a given device of building equipment can include a list of service actions performed by a service provider while the device was under warranty. In some embodiments, the warranty data include other service actions performed that were not covered by the warranty (e.g., actions performed after the warranty period expired or service actions outside the scope of the warranty) and indicate whether each service action was covered or not covered by the warranty.

In some embodiments, the warranty data include reliability data that indicate the failure rates, expected time until failure, or other reliability metrics of various types of building equipment (e.g., particular equipment models) or components thereof. The reliability data can be generated from a set of service actions performed by a manufacturer or service provider and/or warranty claims submitted by various customers across a large set of building equipment over time. In some embodiments, the warranty data include freeform text included in warranty claims, photographs or videos of failed equipment, service reports generated when performing service on equipment under warranty, or any other type of data associated with equipment under warranty. These and other examples of warranty data are described in greater detail in U.S. patent application Ser. No. 17/971,342 filed Oct. 21, 2022, U.S. patent application Ser. No. 18/116,974 filed Mar. 3, 2023, U.S. patent application Ser. No. 17/530,257 filed Nov. 18, 2021, and Singapore patent application Ser. No. 10/202,250321D filed Jun. 28, 2022, the entire disclosures of which are incorporated by reference herein. The warranty data can include structured and/or unstructured data of any type or format.

The data sources 112 can include service data. The service data can include data from any of various service providers, such as service reports. The service data can indicate service procedures performed, including associated service procedures with initial service requests and/or sensor data related conditions to trigger service and/or sensor data measured during service processes. For example, the service data can include service requests submitted by customers or users of the building equipment (e.g., phone calls, emails, electronic support tickets, etc.) when requesting service or support for building equipment. The service requests can include descriptions of one or more problems associated with the building equipment (e.g., equipment won't start, equipment makes noise when operating, equipment fails to achieve desired setpoint, etc.), photographs of the equipment, or any other type of service request data in any format or combination of formats. The service requests may include information describing the model or type of equipment, the identity of the customer, the location of the equipment, the operating history or service history of the equipment, or any other information that can be used by the system 100 to process the service request and determine an appropriate response.

In some embodiments, the service requests include data provided by a user or customer in response to a guided wizard, a series of prompts from the system 100, and/or an interface provided by an interactive service tool of the system 100. For example, the system 100 may generate and present a user interface that prompts the user to describe a problem associated with the building equipment, upload photos or videos of the building equipment, or otherwise characterize the building equipment or requested service. In some embodiments, the user interface includes a chat interface configured to facilitate conversational interaction with the user (e.g., a chat bot or generative AI interface). The system 100 can be configured to prompt the user for additional information about the building equipment or problem associated with the building equipment and provide dynamic responses to the user based on structured or unstructured data provided by the user via the user interface. The dynamic responses can include suggested resolutions to the problem, potential root causes of the problem, diagnostic steps to be performed to help diagnose the root cause of the problem, or any other type of information that can be provided to the user in response to the service requests.

The service data can include service reports generated by service technicians in connection with performing service on building equipment (e.g., before, during, or after performing service on the building equipment) and may include any observations or notes from the service technicians in any combination of formats. For example, the service data can include a combination of text data entered by a service technician when inspecting building equipment or performing service on the building equipment, photographs or videos recorded by the service technician illustrating the operation of the building equipment, audio/speech data provided by the service technician (e.g., dictating the service provider's observations or actions performed with respect to the building equipment). In some embodiments, the service data indicate one or more actions performed by the service technician when performing service on the building equipment and/or outcome data indicating whether the actions were successful in resolving the problem. The service data can include a portion of the operational data, warranty data, or any other type of data described herein which may be relevant to the service requests or service actions performed in response thereto. For example, the service data can include timeseries data recorded prior to a fault occurring in the building equipment, operational data characterizing the operation of the building equipment during testing or service, or operational data characterizing the operation of the building equipment after the service action is performed.

In some embodiments, the service data include metadata associated with the structured or unstructured data elements of the service data. The metadata can include, for example, timestamps indicating times at which various elements of the service data are generated or recorded, location attributes indicating spatial locations (e.g., GPS coordinates, a particular room or zone of a building or campus, etc.) of a service technician or user when the elements of the service data are generated or recorded, device attributes identifying a particular device that generates various elements of the service data, customer attributes identifying a particular customer associated with the service data, or any other type of attribute that can be used to characterize the service data. In some embodiments, the metadata are used by the system 100 to match or associate particular elements of the service data with each other (e.g., a photograph and audio data recorded at or around the same time or when the service technician is in the same location) for use in generating or identifying relationships between various elements of the service data.

In some implementations, the data sources 112 can include parts data, including but not limited to parts usage and sales data. The parts data can include a set of parts or components included in the building equipment (e.g., a particular type of compressor, expansion valve, evaporator, or condenser in a chiller), tools required to install, repair, or replace the parts, suppliers or manufacturers of the parts, service providers capable of installing, repairing, or replacing the parts, a cost of the parts, and/or physical sizes, dimensions, or other attributes of the parts. In some embodiments, the parts data includes warranty data indicating whether the parts are under warranty and/or reliability data indicating failure rates, expected time until failure, or other reliability metrics associated with the parts. The parts data may include engineering data or operational data associated with the parts, as described above. For example, the data sources 112 can indicate various parts associated with installation or repair of items of equipment. The data sources 112 can indicate tools for performing service and/or installing parts.

In addition to the specific examples of the data sources 112 shown in FIG. 1, it is contemplated that the data sources 112 can include any of a variety of additional data sources which can be used to provide additional input data to the system 100 and/or support the various operations performed by the system 100 as described herein. In some embodiments, the data sources 112 include one or more diagnostic models or processes that can be used by the system 100 to diagnose the root causes of problems associated with the building equipment. In some embodiments, the data sources 112 include one or more predictive models configured predict the impact of various operations performed by the building equipment on any of a variety of performance metrics (e.g., cost, energy consumption, carbon emissions, water consumption, air quality, occupant comfort, equipment reliability, etc.) and/or identify opportunities for improvement in the design or operation of the building equipment or systems thereof (e.g., new equipment that could be added and installed to improve efficiency, reduce energy consumption, detect or diagnose faults; new control strategies that could be used to improve equipment performance, avoid faulty operation, reduce energy consumption, etc.). Some examples of predictive models which can be used by the system 100 are described in greater detail in U.S. patent application Ser. No. 17/826,635 filed May 27, 2022, U.S. patent application Ser. No. 16/370,632 filed Mar. 29, 2019, and U.S. patent application Ser. No. 14/717,593 filed May 20, 2015. The entire disclosures of each of these patent applications are incorporated by reference herein. Additional examples of other models which can be used by the system 100 are described in greater detail below.

In some embodiments, the data sources 112 include fault detection and diagnostic (FDD) models or processes that can be used by the system 100 to detect faults or problems associated with the building equipment, predict the root causes of the faults or problems, and/or determine actions that are predicted to resolve the root causes of the faults or problems. In some embodiments, the FDD models or processes require additional information or data not included in the service requests or service reports. The system 100 can automatically gather the additional information or data needed by the FDD models or processes and provide the additional information as inputs to support the FDD activities. Several examples of FDD models and processes that can be used by the system 100 are described in detail in U.S. Pat. No. 10,969,775 granted Apr. 6, 2021, U.S. Pat. No. 10,700,942 granted Jun. 30, 2020, U.S. Pat. No. 9,568,910 granted Feb. 14, 2017, U.S. Pat. No. 10,281,363 granted May 7, 2019, U.S. U.S. Pat. No. 10,747,187 granted Aug. 18, 2020, U.S. Pat. No. 9,753,455 granted Sep. 5, 2017, and U.S. Pat. No. 8,731,724 granted May 20, 2014. The entire disclosures of each of these patents are incorporated by reference herein. The system 100 can use these or other FDD models or processes to help diagnose the root causes of problems associated with the building equipment and identify the particular actions that can be taken by the system 100 or by service providers (e.g., performing service on building equipment, repairing or replacing building equipment, switching to a new control strategy, automatically updating device software or firmware, etc.) to improve the performance of the building equipment and resolve the problems associated with the service requests and/or service reports for the building equipment.

In some embodiments, the data sources 112 include one or more digital twins, ontological models, relational models, graph data structures, causal relationship models, and/or other types of models that define relationships between various entities in a building system. For example, the data sources 112 may include a digital twin or graph data structure of the building system which includes a plurality of nodes and a plurality of edges. The plurality of nodes may represent various entities in the building system such as systems or devices of building equipment (e.g., chillers, AHUs, security equipment, temperature sensors, a chiller subplant, an airside system, dampers, ducts, etc.), spaces of the building system (e.g., rooms, floors, building zones, parking lots, outdoor areas, etc.), persons in the building system or associated with the building system (e.g., building occupants, building employees, security or maintenance personnel, service providers for building equipment, etc.), data storage devices, computing devices, data generated by various entities, or any other entity that can be defined in the building system. The plurality of edges may connect the plurality of nodes and define relationships between the entities represented by the plurality of nodes. For example, a first entity in the graph data structure may be a node representing a particular building space (e.g., "zone A") whereas a second entity in the graph data structure may be a node representing an air handling unit (e.g., "AHU B") that serves the building space. The nodes representing the first and second entities may be connected by an edge indicating a relationship between the entities. For example, the zone A entity may be connected to the "AHU B" entity via a "served by" relationship indicating that zone A is served by AHU B.

Several examples of digital twins, ontological models, relational models, graph data structures, causal relationship models, and/or other types of models that define relationships between various entities in a building system are described in detail in U.S. Pat. No. 11,108,587 granted Aug. 31, 2021, U.S. Pat. No. 11,164,159 granted Nov. 2, 2021, U.S. Pat. No. 11,275,348 granted Mar. 15, 2022, U.S. patent application Ser. No. 16/673,738 filed Nov. 4, 2019, U.S. patent application Ser. No. 16/685,834 filed Nov. 15, 2019, U.S. patent application Ser. No. 17/728,047 filed Apr. 25, 2022, U.S. patent application Ser. No. 17/134,661 filed Dec. 28, 2020, and U.S. patent application Ser. No. 17/170,533 filed Feb. 8, 2021. The entire disclosures of each of these patents and patent applications are incorporated by reference herein. The system 100 can use these and other types of relational models to determine which equipment have an impact on other equipment or particular building spaces, perform diagnostics to identify potential root causes of problems (e.g., by identifying upstream equipment which could be contributing to the problem or causing the problem), predict the impact of changes to a given item of building equipment on the other equipment or spaces served by the given item of equipment (e.g., by identifying downstream equipment or spaces impacted by a given item of building equipment), or otherwise derive insights that can be used by the system 100 to recommend various actions to perform (e.g., equipment service recommendations, diagnostic processes to run, etc.) and/or predict the consequences of various courses of action on the related equipment and spaces.

In some embodiments, the data sources 112 may include a predictive cost model configured to predict various types of cost associated with operation of the building equipment. For example, the predictive cost model can be used by system 100 to predict operating cost, maintenance cost, equipment purchase or replacement cost (e.g., capital cost), equipment degradation cost, cost of purchasing carbon offset credits, rate of return (e.g., on an investment in energy-efficient equipment), payback period, and/or any of the other sources of monetary cost or cost-related metrics described in U.S. patent application Ser. No. 15/895,836 filed Feb. 13, 2018, U.S. patent application Ser. No. 16/418,686 filed May 21, 2019, U.S. patent application Ser. No. 16/438,961 filed Jun. 12, 2019, U.S. patent application Ser. No. 16/449,198 filed Jun. 21, 2019, U.S. patent application Ser. No. 16/457,314 filed Jun. 28, 2019, U.S. patent application Ser. No. 16/697,099 filed Nov. 26, 2019, U.S. patent application Ser. No. 16/687,571 filed Nov. 18, 2019, U.S. patent application Ser. No. 16/518,548 filed Jul. 22, 2019, U.S. patent application Ser. No. 16/899,220 filed Jun. 11, 2020, U.S. patent application Ser. No. 16/943,781 filed Jul. 30, 2020, and/or U.S. patent application Ser. No. 17/017,028 filed Sep. 10, 2020. The entire disclosures of each of these patent applications are incorporated by reference herein. The system 100 can use the predictive cost models to predict the cost that will result from various actions that could be performed by the system 100 or by service providers (e.g., purchasing and installing new equipment, performing maintenance on the building equipment, energy waste resulting from allowing a fault to remain unrepaired, switching to a new control strategy, etc.) to provide insight into the consequences of various courses of action that can be recommended by the system 100.

The data sources 112 may include one or more predictive models configured for optimizing participation in incentive-based demand response (IBDR) programs. For example, the predictive models can be configured to generate incentive predictions, estimated participation requirements, an estimated amount of revenue from participating in the estimated IBDR events, and/or any other attributes of the predicted IBDR events. System 100 may use the incentive predictions along with predicted loads (e.g., predicted electric loads of the building equipment, predicted demand for one or more resources produced by the building equipment, etc.) and utility rates (e.g., energy cost and/or demand cost from the electric utility) to determine an optimal set of control decisions for each time step within the optimization period. Several examples of how incentives such as those provided by IBDR programs and others that could be accounted for and used in the context of the system 100 are described in greater detail in U.S. patent application Ser. No. 16/449,198 filed Jun. 21, 2019, U.S. patent application Ser. No. 17/542,184 filed Dec. 3, 2021, U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosures of each of these patent applications are incorporated by reference herein. The system 100 can use the incentive models to predict the revenue that could be generated as a result of various actions that could be performed by the system 100 or by service providers (e.g., purchasing and installing new equipment that allows the system 100 to participate in an IBDR program, switching to a new control strategy, etc.) and provide the user with informed recommendations of how different courses of action would impact revenue generation.

The data sources 112 may include one or more thermodynamic models configured to predict one or more thermodynamic properties or states of a building space or fluid flow (e.g., temperature, humidity, pressure, enthalpy, etc.) as a result of operation of the building equipment. For example, the thermodynamic models can be configured to predict the temperature, humidity, or air quality of a building space that will occur if the building equipment are operated according to a given control strategy. The thermodynamic models can be configured to predict the temperature, enthalpy, pressure, or other thermodynamic state of a fluid (e.g., water, air, refrigerant) in a duct or pipe, received as an input to the building equipment, or provided as an output from the building equipment. Several examples of thermodynamic models that can be used to predict various thermodynamic properties or states of a building space or fluid flow are described in greater detail in U.S. Pat. No. 11,067,955 granted Jul. 20, 2021, U.S. Pat. No. 10,761,547 granted Sep. 1, 2020, and U.S. Pat. No. 9,696,073 granted Jul. 4, 2017, the entire disclosures of which are incorporated by reference herein. The system 100 can use the thermodynamic models to predict the temperature, humidity, or other thermodynamic states that will occur at various locations within the building as a result of different actions that could be performed by the system 100 or by service providers (e.g., purchasing and installing new equipment, performing maintenance on the building equipment, switching to a new control strategy, etc.) to confirm that the recommended set of actions or control strategies will result in comfortable building conditions and within operating limits or constraints for the building equipment or spaces of the building.

The data sources 112 may include one or more energy models or resource models configured to predict consumption or generation of one or more energy resources or other resources (e.g., hot water, cold water, heated air, chilled air, electricity, hot thermal energy, cold thermal energy, etc.) as a result of the operation of the building equipment. The energy/resource models can be configured to predict the energy use of a building or campus as a whole, as well as the equipment-specific or system-specific energy use of a given device or system of equipment (e.g., subplant energy use, airside energy use, waterside energy use, etc.). Other types of resource production and consumption that can be predicted include water consumption (e.g., from a water utility), electricity consumption (e.g., from an electric utility), natural gas consumption (e.g., from a natural gas utility), electricity production (e.g., from on-site electric generators), hot water production (e.g., from boilers or heaters), cold water production (e.g., from chillers), hot/cold air production (e.g., from air handling units, variable refrigerant flow units, etc.), pollutant production or removal, steam production/consumption, or any other type of resource that can be produced or consumed by the building equipment. Several examples of systems that produce and consume various types of resources and the energy/resource models used in such systems are described in greater detail in U.S. Pat. No. 10,706,375 granted Jul. 7, 2020, U.S. Pat. No. 11,281,173 granted Mar. 22, 2022, U.S. Pat. No. 10,175,681 granted Jan. 8, 2019, and U.S. Pat. No. 11,416,796 granted Aug. 16, 2022, the entire disclosures of which are incorporated by reference herein. The system 100 can use the energy models or resource models to predict the consumption or generation of various resources as a consequence of different control strategies, equipment configurations, maintenance actions, service plans, or other actions that can be recommended by the system 100.

The data sources 112 may include one or more sustainability models configured to predict one or more sustainability metrics (e.g., carbon emissions, green energy production/usage, carbon credits earned, etc.) as a result of the operation of the building equipment. The sustainability models can include models configured to predict or use marginal operating emissions rate (MOER) associated with various types of resources produced or consumed by the building equipment. Several examples of sustainability models that can be used in system 100 are described in greater detail in U.S. patent application Ser. No. 17/826,921 filed May 27, 2022, U.S. patent application Ser. No. 17/826,916 filed May 27, 2022, U.S. patent application Ser. No. 17/948,118 filed Sep. 19, 2022, and U.S. patent application Ser. No. 17/483,078 filed Sep. 23, 2021, the entire disclosures of which are incorporated by reference herein. The system 100 can use the sustainability models to predict the impact of various control strategies, equipment configurations, maintenance actions, service plans, or other actions that can be recommended by the system 100 on any of a variety of sustainability metrics.

The data sources 112 may include one or more occupant comfort models configured to predict occupant comfort as a result of the operation of the building equipment. Occupant comfort can be defined objectively based on the amount that a measured or predicted building condition (e.g., temperature, humidity, airflow, etc.) within the corresponding building zone deviates from a comfort setpoint or comfort range. If multiple different building conditions are considered, the occupant comfort can be defined as a summation or weighted combination of the deviations of the various building conditions relative to their corresponding setpoints or ranges. An exemplary method for predicting occupant comfort based on building conditions is described in U.S. patent application Ser. No. 16/943,955 filed Jul. 30, 2020, the entire disclosure of which is incorporated by reference herein. In some embodiments, occupant comfort can be quantified based on detected or predicted occupant overrides of temperature setpoints and/or based on predicted mean vote calculations. These and other methods for quantifying occupant comfort are described in U.S. patent application Ser. No. 16/405,724 filed May 7, 2019, U.S. patent application Ser. No. 16/703,514 filed Dec. 4, 2019, and U.S. patent application Ser. No. 16/516,076 filed Jul. 18, 2019, each of which is incorporated by reference herein in its entirety. The system 100 can use the occupant comfort models to predict whether building occupants will be comfortable as a result of various actions that can be recommended by the system 100 (e.g., different control strategies, equipment configurations, maintenance actions, service plans, etc.).

The data sources 112 may include one or more infection risk models configured to predict infection risk in one or more building spaces as a result of the operation of the building equipment. Infection risk can be predicted using a dynamic model that defines infection risk within a building zone as a function of control decisions for that zone (e.g., ventilation rate, air filtration actions, etc.) as well as other variables such as the number of infectious individuals within the building zone, the size of the building zone, the occupants' breathing rate, etc. For example, the Wells-Riley equation can be used to quantify the infection risk of airborne transmissible diseases. In some embodiments, the infection risk can be predicted as a function of a concentration of infectious quanta within the building zone, which can in turn be predicted using a dynamic infectious quanta model. Several examples of how infection risk and infectious quanta can be predicted as a function of control decisions for a zone are described in detail in U.S. Provisional Patent Application No. 62/873,631 filed Jul. 12, 2019, U.S. patent application Ser. No. 16/927,318 filed Jul. 13, 2020, U.S. patent application Ser. No. 16/927,759 filed Jul. 13, 2020, U.S. patent application Ser. No. 16/927,766 filed Jul. 13, 2020, U.S. patent application Ser. No. 17/459,963 filed Aug. 27, 2021, and U.S. patent application Ser. No. 17/393,138 filed Aug. 3, 2021. The entire disclosures of each of these patent applications are incorporated by reference herein. The system 100 can use the infection risk models to predict the impact of various control strategies, equipment configurations, maintenance actions, service plans, or other actions that can be recommended by the system 100 with respect to infection risk in one or more building spaces.

The data sources 112 may include one or more air quality models configured to predict air quality in one or more building spaces as a result of the operation of the building equipment. Air quality can be quantified in terms of any of a variety of air quality metrics such as particulate matter concentration (e.g., PM 2.5), volatile organic compounds, carbon dioxide levels, airborne pollutants, pollen levels, smoke levels, or any other measure of air quality. Several examples of how air quality can be quantified, measured, predicted, and controlled as a function of control decisions for building equipment are described in greater detail in U.S. patent application Ser. No. 17/409,493 filed Aug. 23, 2021, U.S. patent application Ser. No. 17/882,283 filed Aug. 5, 2022, U.S. patent application Ser. No. 18/114,129 filed Feb. 24, 2023, and U.S. patent application Ser. No. 18/132,200 filed Apr. 7, 2023. The entire disclosures of each of these patent applications are incorporated by reference herein. The system 100 can use the air quality models to predict air quality in various building spaces as a result of different actions that can be recommended by the system 100 (e.g., different control strategies, equipment configurations, maintenance actions, service plans, etc.).

The data sources 112 may include one or more reliability models configured to predict the reliability of the building equipment. The reliability of a given device can be modeled as a function of control decisions for the device, its degradation state, and/or an amount of time that has elapsed since the device was put into service or the most recent time at which maintenance was conducted on the device. Reliability can be quantified and/or predicted using any of a variety of reliability models. Several examples of models that can be used to quantify reliability and predict reliability values into the future are described in U.S. patent application Ser. No. 15/895,836 filed Feb. 13, 2018, U.S. patent application Ser. No. 16/418,686 filed May 21, 2019, U.S. patent application Ser. No. 16/438,961 filed Jun. 12, 2019, U.S. patent application Ser. No. 16/449,198 filed Jun. 21, 2019, U.S. patent application Ser. No. 16/457,314 filed Jun. 28, 2019, U.S. patent application Ser. No. 16/697,099 filed Nov. 26, 2019, U.S. patent application Ser. No. 16/687,571 filed Nov. 18, 2019, U.S. patent application Ser. No. 16/518,548 filed Jul. 22, 2019, U.S. patent application Ser. No. 16/899,220 filed Jun. 11, 2020, U.S. patent application Ser. No. 16/943,781 filed Jul. 30, 2020, and/or U.S. patent application Ser. No. 17/017,028 filed Sep. 10, 2020. The entire disclosures of each of these patent applications are incorporated by reference herein. The system 100 can use the reliability models to predict or estimate the reliability of various items of building equipment, components or parts of building equipment, as a function of the different control strategies, equipment configurations, maintenance actions, service plans, or other actions that can be taken or recommended by the system 100 to help evaluate whether the various actions would help improve equipment reliability.

In some embodiments, the various models described above can be used as data sources for the system 100 and/or as the destination for data generated by model 104 and/or model 116. For example, models 104, 116 can convert any of the various types of structured or unstructured data inputs described herein into a format capable of being provided as inputs to any of the models described throughout the present disclosure and/or the various patents or patent applications incorporated by reference herein. Models 104, 116 can also accept as inputs the output data generated by these models and convert the model outputs into a message, graphic, or other data element for presentation to a user via a user interface. Advantageously, this functionality may allow the system 100 to use the capabilities of these models to derive additional insights, make forward-looking predictions, provide recommendations, or otherwise make use of the functionality of these models without requiring a user to provide structured data inputs to these models or parse the model output. The user can provide structured or unstructured data in any format or modality and the system 100 can convert the data inputs into the proper syntax, format, or other arrangement for use as inputs to the predictive models. The model outputs can then be presented to the user in a user-friendly and comprehensible form.

The system 100 can include, with the data of the data sources 112, labels to facilitate cross-reference between items of data that may relate to common items of equipment, sites, service technicians, customers, or various combinations thereof. For example, data from disparate sources may be labeled with time data, which can allow the system 100 (e.g., by configuring the models 104, 116) to increase a likelihood of associating information from the disparate sources due to the information being detected or recorded (e.g., as service reports) at the same time or near in time.

For example, the data sources 112 can include data that can be particular to specific or similar items of equipment, buildings, equipment configurations, environmental states, or various combinations thereof. In some implementations, the data includes labels or identifiers of such information, such as to indicate locations, weather conditions, timing information, uses of the items of equipment or the buildings or sites at which the items of equipment are present, etc. This can enable the models 104, 116 to detect patterns of usage (e.g., spikes; troughs; seasonal or other temporal patterns) or other information that may be useful for determining causes of issues or causes of service requests, or predict future issues, such as to allow the models 104, 116 to be trained using information indicative of causes of issues across multiple items of equipment (which may have the same or similar causes even if the data regarding the items of equipment is not identical). For example, an item of equipment may be at a site that is a museum; by relating site usage or occupancy data with data regarding the item of equipment, such as sensor data and service reports, the system 100 can configure the models 104, 116 to determine a high likelihood of issues occurring before events associated with high usage (e.g., gala, major exhibit opening), and can generate recommendations to perform diagnostics or servicing prior to the events.

Model Configuration

Referring further to FIG. 1, the model updater 108 can perform various machine learning model configuration/training operations to determine the second models 116 using the data from the data sources 112. For example, the model updater 108 can perform various updating, optimization, retraining, reconfiguration, fine-tuning, or transfer learning operations, or various combinations thereof, to determine the second models 116. The model updater 108 can configure the second models 116, using the data sources 112, to generate outputs (e.g., completions) in response to receiving inputs (e.g., prompts), where the inputs and outputs can be analogous to data of the data sources 112.

For example, the model updater 108 can identify one or more parameters (e.g., weights and/or biases) of one or more layers of the first model 104, and maintain (e.g., freeze, maintain as the identified values while updating) the values of the one or more parameters of the one or more layers. In some implementations, the model updater 108 can modify the one or more layers, such as to add, remove, or change an output layer of the one or more layers, or to not maintain the values of the one or more parameters. The model updater 108 can select at least a subset of the identified one or parameters to maintain according to various criteria, such as user input or other instructions indicative of an extent to which the first model 104 is to be modified to determine the second model 116. In some implementations, the model updater 108 can modify the first model 104 so that an output layer of the first model 104 corresponds to output to be determined for applications 120.

Responsive to selecting the one or more parameters to maintain, the model updater 108 can apply, as input to the second model 116 (e.g., to a candidate second model 116, such as the modified first model 104, such as the first model 104 having the identified parameters maintained as the identified values), training data from the data sources 112. For example, the model updater 108 can apply the training data as input to the second model 116 to cause the second model 116 to generate one or more candidate outputs.

The model updater 108 can evaluate a convergence condition to modify the candidate second model 116 based at least on the one or more candidate outputs and the training data applied as input to the candidate second model 116. For example, the model updater 108 can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second model 116 correspond to the ground truth represented by the training data. The model updater 108 can use any of a variety of optimization algorithms (e.g., gradient descent, stochastic descent, Adam optimization, etc.) to modify one or more parameters (e.g., weights or biases of the layer(s) of the candidate second model 116 that are not frozen) of the candidate second model 116 according to the evaluation of the objective function. In some implementations, the model updater 108 can use various hyperparameters to evaluate the convergence condition and/or perform the configuration of the candidate second model 116 to determine the second model 116, including but not limited to hyperparameters such as learning rates, numbers of iterations or epochs of training, etc.

As described further herein with respect to applications 120, in some implementations, the model updater 108 can select the training data from the data of the data sources 112 to apply as the input based at least on a particular application of the plurality of applications 120 for which the second model 116 is to be used. For example, the model updater 108 can select data from the parts data source 112 for the product recommendation generator application 120, or select various combinations of data from the data sources 112 (e.g., engineering data, operational data, and service data) for the service recommendation generator application 120. The model updater 108 can apply various combinations of data from various data sources 112 to facilitate configuring the second model 116 for one or more applications 120.

In some implementations, the system 100 can perform at least one of conditioning, classifier-based guidance, or classifier-free guidance to configure the second model 116 using the data from the data sources 112. For example, the system 100 can use classifiers associated with the data, such as identifiers of the item of equipment, a type of the item of equipment, a type of entity operating the item of equipment, a site at which the item of equipment is provided, or a history of issues at the site, to condition the training of the second model 116. For example, the system 100 combine (e.g., concatenate) various such classifiers with the data for inputting to the second model 116 during training, for at least a subset of the data used to configure the second model 116, which can enable the second model 116 to be responsive to analogous information for runtime/inference time operations.

In some embodiments, the model updater 108 trains the second model using a plurality of unstructured service reports corresponding to a plurality of service requests handled by technicians for servicing building equipment. The unstructured service reports may include unstructured data which does not conform to a predetermined format or may conform to a plurality of different predetermined formats. The unstructured service reports can include any of the types of structured or unstructured data previously described (e.g., text data, speech data, audio data, image data, video data, freeform data, etc.).

In some embodiments, the model updater 108 can train the second model 116 using outcome data in combination with the unstructured service reports from service technicians. The unstructured service reports may indicate various actions performed by the service technicians when performing service on the building equipment, whereas the outcome data may indicate outcomes of the various actions. For example, the outcome data may indicate whether the problems associated with the building equipment were resolved after performing the various actions. The model updater 108 can use this combination of service report data and outcome data to identify patterns or correlations between the particular actions performed and their respective outcomes. Similarly, the model updater 108 can train the second model 116 to identify new correlations and/or patterns between the unstructured data of the unstructured service reports and the additional data from any of the additional data sources described herein. Accordingly, when a new service request or service report is provided as an input to the second model 116, the second model 116 can be used to identify new correlations and/or patterns between unstructured data of the new service report and the additional data from the additional data sources.

In some embodiments, the model updater 108 can train the second model 116 using both the unstructured data from the unstructured service reports and additional data gathered by the model updater 108. For example, the model updater 108 (or another component of the system 100) can identify particular entities of the building system indicated by the unstructured service reports (e.g., particular devices of building equipment, spaces of the building system, data entities, etc.) and retrieve additional data relevant to the identified entities. In some embodiments, the model updater 108 can traverse (e.g., use, evaluate, travel along, etc.) an ontological model of the building system to identify one or more other systems or devices of building equipment, spaces of the building system, or other entities of the building system related to the particular entities indicated in the unstructured service reports. The model updater 108 can train the second model 116 using additional data associated with the identified one or more other items of building equipment, spaces of the building system, or other entities of the building system in combination with the unstructured data of the unstructured service reports to configure the second model 116.

In some embodiments, the ontological model of the building system includes a digital twin of a building system. The digital twin may include a plurality of nodes representing the building equipment, the other systems or devices of building equipment, the spaces of the building system, or the other entities of the building system. The digital twin may also include a plurality of edges connecting the plurality of nodes and defining relationships between the building equipment, the other systems or devices of building equipment, the spaces of the building system, or the other entities of the building system represented by the nodes. The model updater 108 can use the relationships defined by the digital twin to determine other entities related to the entities identified in the unstructured service reports and gather additional data associated with the identified entities.

In some embodiments, the model updater 108 can train the second model 116 using training data associated with one or more similar items of building equipment, buildings, customers, or other entities based on the unstructured service reports. For example, the model updater 108 can use various characteristics of the buildings, customers, or other entities identified in the unstructured service reports to identify other buildings, customers, or other entities that have similar characteristics (e.g., same or similar model of a chiller, same or similar geographic location of a building, same or similar weather patterns, etc.). The model updater 108 can gather additional training data associated with the identified buildings, customers, or other entities to expand the set of training data used to train the second model 116.

In some embodiments, the model updater 108 can train the second model 116 using a set of structured reports. The structured reports can be generated from the unstructured service reports (e.g., using the second model 116) or otherwise provided as an input to the model updater 108. The structured reports can be service reports (i.e., structured service reports) or other types of reports (e.g., energy consumption reports, fault reports, equipment performance reports, etc.). The model updater 108 can use the structured reports in combination with the unstructured service reports to configure the second model 116.

In some embodiments, the model updater 108 trains the second model 116 using additional data generated by one or more other models separate from the second model 116. The other models may include, for example, a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, an air quality model configured to predict air quality in one or more building spaces as a result of the operation of the building equipment, and/or any of the other types of models described throughout the present disclosure or the patents and patent applications incorporated by reference herein.

In some embodiments, the model updater 108 uses train the additional data generated by the other models in combination with the unstructured data of the unstructured service reports to configure the trained second model 116. The additional data generated by the other models can also or alternatively be used by the applications 120 in combination with an output of the second model 116 to select an action to perform. For example, the output of the trained second model 116 (e.g., a recommended action to perform) can be provided as an input to the other models to predict a consequence of the recommended action on energy consumption, occupant comfort, air quality, sustainability, infection risk, or any other variable state or condition predicted or modeled by the other models. The output of the other models can then be used by the system 100 to evaluate the consequences of the recommended action (e.g., score the recommended action relative to other recommended actions based on the consequences) and/or provide a user interface that informs the user of the consequences when presenting the recommended actions for user consideration.

In some embodiments, the output of the trained second model 116 is provided as an input to the other models and used to generate additional training data as an output of the other models. The additional training data can then be used to further train or refine the second model 116. For example, the output of the other models may indicate expected consequences or outcomes of the actions recommended by the second model 116. The expected consequences or outcomes can then be used as feedback to the model updater 108 to adjust the second model 116 (e.g., by reinforcing actions that lead to positive consequences, punishing actions that lead to negative consequences, etc.).

In some embodiments, the model updater 108 trains the second model 116 to automatically generate a structured service report in a predetermined format for delivery to a customer associated with the building equipment. The model updater 108 may receive training data including a plurality of first unstructured service reports corresponding to a plurality of first service requests handled by technicians for servicing building equipment. The plurality of first unstructured service reports may include unstructured data not conforming to a predetermined format or conforming to a plurality of different predetermined formats. The model updater 108 may train the second model 116 using the plurality of unstructured service reports. When a new unstructured service report is received, the second model 116 can then be used to generate a new structured service report which includes additional content generated by the second model 116 and not provided within the new unstructured service report.

In some embodiments, the training data used by the model updater 108 to train the second model 116 includes one or more structured service reports conforming to a predetermined format (e.g., a structured data format, a template for a particular customer or type of equipment, etc.) and including one or more predefined form sections or fields. After the second model 116 is trained, the second model 116 can then be used (e.g., by the document writer application 120 described below) to automatically populate the one or more predefined form sections or fields with structured data elements generated from unstructured data of the unstructured service report.

Applications

Referring further to FIG. 1, the system 100 can use outputs of the one or more second models 116 to implement one or more applications 120. For example, the second models 116, having been configured using data from the data sources 112, can be capable of precisely generating outputs that represent useful, timely, and/or real-time information for the applications 120. In some implementations, each application 120 is coupled with a corresponding second model 116 that is specifically configured to generate outputs for use by the application 120. Various applications 120 can be coupled with one another, such as to provide outputs from a first application 120 as inputs or portions of inputs to a second application 120.

The applications 120 can include any of a variety of desktop, web-based/browser-based, or mobile applications. For example, the applications 120 can be implemented by enterprise management software systems, employee or other user applications (e.g., applications that relate to BMS functionality such as temperature control, user preferences, conference room scheduling, etc.), equipment portals that provide data regarding items of equipment, or various combinations thereof. The applications 120 can include user interfaces, wizards, checklists, conversational interfaces, chat bots, configuration tools, or various combinations thereof. The applications 120 can receive an input, such as a prompt (e.g., from a user), provide the prompt to the second model 116 to cause the second model 116 to generate an output, such as a completion in response to the prompt, and present an indication of the output. The applications 120 can receive inputs and/or present outputs in any of a variety of presentation modalities, such as text, speech, audio, image, and/or video modalities. For example, the applications 120 can receive unstructured or freeform inputs from a user, such as a service technician, and generate reports in a standardized format, such as a customer-specific format. This can allow, for example, technicians to automatically, and flexibly, generate customer-ready reports after service visits without requiring strict input by the technician or manually sitting down and writing reports; to receive inputs as dictations in order to generate reports; to receive inputs in any form or a variety of forms, and use the second model 116 (which can be trained to cross-reference metadata in different portions of inputs and relate together data elements) to generate output reports (e.g., the second model 116, having been configured with data that includes time information, can use timestamps of input from dictation and timestamps of when an image is taken, and place the image in the report in a target position or label based on time correlation).

In some embodiments, the applications 120 can be configured to couple or link the information provided in unstructured service reports or service request with other input or output data sources, such as any of the data sources 112 described herein. For example, the applications 120 can receive unstructured service data corresponding to one or more service requests handled by technicians for servicing building equipment. The unstructured service data can be included in unstructured service reports generated by the technicians and/or the corresponding service requests. The unstructured service data may include one or more unstructured data elements not conforming to a predetermined format or conforming to a plurality of different predetermined formats (e.g., a text format, a speech format, an audio format, an image format, a video format, a data file format, etc.). The applications 120 can use the unstructured service data and/or other attributes of the service reports or the service requests to identify a particular item of building equipment, a building space, or other entity associated with the unstructured service data (e.g., a particular device or space identified as requiring service). In various embodiments, the applications 120 can use the second model 116 or a different model, system, or device to process the unstructured service data and identify a particular system or device of the building equipment associated with the unstructured service data.

The applications 120 can automatically identify one or more additional data sources which are relevant to the identified item of building equipment, space, or other entity. For example, the applications 120 can use a relational model of the building system, output from a diagnostic model, or other information to identify related items of building equipment, spaces, data sources, or other entities of the building system. The applications 120 can then retrieve additional data associated with the building equipment, space, or other entity from one or more additional data sources separate from the unstructured service data. The applications 120 can use the unstructured service data and the additional data from the additional data sources to generate a structured data output using the second model 116. The structured data output may include one or more structured data elements based on the unstructured service data and the additional data from the one or more additional data sources.

The additional data sources which can be coupled or linked to the information in the unstructured service reports and/or service requests can include any of the data sources 112 described herein. For example, the additional data sources can include engineering data, operational data, sensor data, timeseries data, warranty data, parts data, outcome data, and/or model output data. The model output data can include data generated by any of a variety of models such as a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, and/or an air quality model configured to predict air quality in one or more building spaces as a result of the operation of the building equipment.

In some embodiments, the applications 120 can retrieve the additional data by traversing an ontological model of the building system to identify one or more other systems or devices of building equipment, spaces of the building system, or other entities of the building system related to the building equipment. The applications 120 can then retrieve the additional data associated with the identified one or more other systems or devices of building equipment, spaces of the building system, or other entities of the building system. In some embodiments, the ontological model of the building system includes a digital twin of a building system. The digital twin may include a plurality of nodes representing the building equipment, the other systems or devices of building equipment, the spaces of the building system, or the other entities of the building system. The digital twin may further include a plurality of edges connecting the plurality of nodes and defining relationships between the building equipment, the other systems or devices of building equipment, the spaces of the building system, or the other entities of the building system represented by the nodes.

In some embodiments, the applications 120 can retrieve the additional data by identifying one or more similar items of building equipment, buildings, customers, or other entities related to the building equipment. The applications can retrieve the additional data associated with the identified one or more similar items of building equipment, buildings, customers. In some embodiments, the additional data include internet data obtained from one or more internet data sources such as a website, a blog post, a social media source, or a calendar. In some embodiments, the additional data include application data obtained from one or more applications installed on one or more user devices. The application data may include user comfort feedback for one or more building spaces affected by operation of the building equipment. In various embodiments, the additional data can include additional unstructured data not conforming to a predetermined format or conforming to a plurality of different predetermined formats and/or structured data including one or more predetermined fields or locations and one or more predetermined labels or identifiers characterizing the one or more predetermined fields or locations.

In some embodiments, the applications 120 can retrieve the additional data by cross-referencing metadata associated with the unstructured service data and the additional data to determine whether the unstructured service data and the additional data are related. If the unstructured service data and the additional data are related, the applications 120 can retrieve the additional data from the corresponding additional data sources. In various embodiments, the metadata can include timestamps indicating times associated with the unstructured service data and the additional data and/or location attributes indicating spatial locations in a building or campus associated with the unstructured service data and the additional data. Determining that the two unstructured service data and the additional data are related may include comparing the timestamps and/or the location attributes.

In some implementations, the applications 120 include at least one virtual assistant (e.g., virtual assistance for technician services) application 120. The virtual assistant application can provide various services to support technician operations, such as presenting information from service requests, receiving queries regarding actions to perform to service items of equipment, and presenting responses indicating actions to perform to service items of equipment. The virtual assistant application 120 can receive information regarding an item of equipment to be serviced, such as sensor data, text descriptions, or camera images, and process the received information using the second model 116 to generate corresponding responses.

For example, the virtual assistant application 120 can be implemented in a UI/UX interactive service tool (e.g., wizard, dynamic interface, etc.), such as to provide a sequence of requests for information from the user (the sequence may include requests that are at least one of predetermined or dynamically generated responsive to inputs from the user for previous requests). For example, the virtual assistant application 120 can provide one or more requests for users such as service technicians, facility managers, or other occupants, and provide the received responses to at least one of the second model 116 or a root cause detection function (e.g., algorithm, model, data structure mapping inputs to candidate causes, etc.) to determine a prediction of a cause of the issue of the item of equipment and/or solutions. The virtual assistant application 120 can use requests for information such as for unstructured text by which the user describes characteristics of the item of equipment relating to the issue; answers expected to correspond to different scenarios indicative of the issue; and/or image and/or video input (e.g., images of problems, equipment, spaces, etc. that can provide more context around the issue and/or configurations). For example, responsive to receiving a response via the virtual assistant application 120 indicating that the problem is with temperature in the space, the system 100 can request, via the virtual assistant application 120, information regarding HVAC-R equipment associated with the space, such as pictures of the space, an air handling unit, a chiller, or various combinations thereof.

In some embodiments, the virtual assistant application 120 can provide a user interface to a user in response to receiving a service request for building equipment. The user interface may prompt the user to provide information about a problem leading to the service request. In some embodiments, the user interface prompts the user to provide unstructured data in a plurality of different formats comprising at least two of a text format, a speech format, an audio format, an image format, a video format, or a data file format. In some embodiments, the user interface prompts the user to provide the unstructured data as freeform data not conforming to a structured data format. In some embodiments, the user interface include an unstructured text box prompting the user to describe the problem using unstructured text. In some embodiments, the user interface prompts the user to upload one or more photos, video, or audio associated with the problem or the building equipment. The virtual assistant application 120 may receive, via the user interface, unstructured data not conforming to a predetermined format or conforming to a plurality of different predetermined formats in response to the prompts provided by the virtual assistant application 120.

The virtual assistant application 120 can use any or all of the unstructured or structured data provided via the user interface as inputs to the second model 116. In some embodiments, the virtual assistant application 120 uses the second model 116 to convert the unstructured data received via the user interface into structured data that conforms to a structured data format. The structured data format may include one or more predetermined fields or locations and one or more predetermined labels or identifiers characterizing the one or more predetermined fields or locations. The virtual assistant application 120 can convert the unstructured data into the structured data format by associating unstructured data elements of the unstructured data with the one or more predetermined fields or locations.

The virtual assistant application 120 can use the second model 116 to determine one or more potential actions to address the problem and can present the one or more potential actions to the user via the user interface. In some embodiments, the virtual assistant application 120 can provide the structured or unstructured data inputs received via the user interface as inputs to the second model 116 and can obtain the potential actions to address the problem as outputs from the second model. In some embodiments, the virtual assistant application 120 uses the second model 116 to determine one or more potential root causes of the problem based on the structured or unstructured data provided via the user interface. The virtual assistant application 120 can then use the second model 116 or another instance of the second model 116 to determine the one or more potential actions to address the problem based on the one or more potential root causes of the problem. The one or more potential actions may be actions that are predicted to address or resolve the one or more potential root causes.

In some embodiments, the user interface generated by the virtual assistant application 120 includes a chat interface configured to facilitate conversational interaction with the user. The virtual assistant application 120 can use the second model 116 to generate a dynamic response to the service request based on the structured or unstructured data and present the dynamic response to the user via the user interface. In some embodiments, after determining the potential root causes of the problem, the virtual assistant application 120 identifies additional information not yet provided by the user that, if provided, would allow the second model 116 to better diagnose the actual root cause of the problem (e.g., exclude or confirm one or more of the potential root causes as actual root causes of the problem). The virtual assistant application 120 can identify the additional information using the second model or a separate model such as a diagnostic model from an additional source. Upon identifying the additional information required to better diagnose the actual root cause of the problem, the virtual assistant application 120 can use the second model 116 to generate a request for the additional information and present the request for the additional information via the user interface.

In some embodiments, the virtual assistant application 120 can use the second model 116 to provide an interface between the user and one or more diagnostic models configured to predict one or more potential root causes of the problem based on a set of structured data inputs. For example, the virtual assistant application 120 can use the second model 116 to transform the unstructured data received via the user interface into the set of structured data inputs required as inputs to the one or more diagnostic models and provide the set of structured data inputs as inputs to the one or more diagnostic models. The diagnostic models can use the structured data inputs to predict one or more potential root causes of the problem, which may be provided as structured data outputs from the diagnostic models. In some embodiments, the virtual assistant application 120 can receive a set of structured data outputs from one or more diagnostic models, transform the structured data outputs into a natural language response to the service request, and present the natural language response via the user interface.

The virtual assistant application 120 can include a plurality of applications 120 (e.g., variations of interfaces or customizations of interfaces) for a plurality of respective user types. For example, the virtual assistant application 120 can include a first application 120 for a customer user, and a second application 120 for a service technician user. The virtual assistant applications 120 can allow for updating and other communications between the first and second applications 120 as well as the second model 116. Using one or more of the first application 120 and the second application 120, the system 100 can manage continuous/real-time conversations for one or more users, and evaluate the users' engagement with the information provided (e.g., did the user, customer, service technician, etc., follow the provided steps for responding to the issue or performing service, did the user discontinue providing inputs to the virtual assistant application 120, etc.), such as to enable the system 100 to update the information generated by the second model 116 for the virtual assistant application 120 according to the engagement. In some implementations, the system 100 can use the second model 116 to detect sentiment of the user of the virtual assistant application 120, and update the second model 116 according to the detected sentiment, such as to improve the experience provided by the virtual assistant application 120.

The applications 120 can include at least one document writer application 120, such as a technical document writer. The document writer application 120 can facilitate preparing structured (e.g. form-based) and/or unstructured documentation, such as documentation associated with service requests. For example, the document writer application 120 can present a user interface corresponding to a template document to be prepared that is associated with at least one of a service request or the item of equipment for which the service request is generated, such as to present one or more predefined form sections or fields. The document writer application 120 can use inputs, such as prompts received from the users and/or technical data provided by the user regarding the item of equipment, such as sensor data, text descriptions, or camera images, to generate information to include in the documentation. For example, the document writer application 120 can provide the inputs to the second model 116 to cause the second model 116 to generate completions for text information to include in the fields of the documentation.

In some embodiments, the document writer application 120 receives an unstructured service report corresponding to a service request handled by one or more technicians for servicing building equipment. The unstructured service report may include unstructured data not conforming to a predetermined format or conforming to a plurality of different predetermined formats. The document writer application 120 can use the second model 116 to automatically generate a structured service report in the predetermined format for delivery to a customer associated with the building equipment. In some embodiments, the document writer application 120 can provide the unstructured service report as an input to the trained second model 116 and receives the structured service report as an output of the trained second model 116. The structured service report may include additional content generated by the second model 116 which is not provided within the unstructured service report. For example, the structured service report may include additional data gathered from other data sources (e.g., other data repositories, systems or devices of equipment, user devices, etc.) based on the particular entities identified in the unstructured service report, as described above.

In some embodiments, the document writer application 120 and/or the second model 116 generates the structured service report by cross-referencing metadata associated with two or more unstructured data elements (e.g., elements the unstructured service report and/or additional data elements received from other data sources) to determine whether the two or more unstructured data elements are related. The document writer application 120 and/or the second model 116 can generate two or more structured data elements of the structured service report based on the two or more unstructured data elements and associating the two or more structured data elements with each other in the structured service report in response to determining that the two or more unstructured data elements are related.

In some embodiments, the unstructured data elements include at least two of text data, speech data, audio data, image data, video data, or freeform data. For example, the unstructured data elements can include multi-modal data provided by a plurality of different sensory devices comprising at least two of an audio capture device, a video capture device, an image capture device, a text capture device, or a handwriting capture device. In various embodiments, the metadata can include timestamps indicating times at which the two or more unstructured data elements are generated and/or spatial locations in a building or campus at which the two or more unstructured data elements are generated. Determining that the two or more unstructured data elements are related may include comparing the timestamps and/or the location attributes.

In some embodiments, associating the two or more structured data elements with each other in the structured service report includes placing the two or more structured data elements in proximity to each other in the structured service report. For example, a photograph of an item of building equipment can be placed proximate to automatically generated text describing the condition of the item of building equipment if the metadata indicate that the corresponding unstructured data elements are related. In some embodiments, associating the two or more structured data elements with each other in the structured service report includes adding a label to a first structured data element of the two or more structured data elements in the structured service report. The label may refer to a second data element of the two or more structured data elements in the structured service report In some embodiments, the document writer application 120 generates the structured service report by identifying a customer, a building, or a type of the building equipment associated with the service request and/or the unstructured service report. The document writer application 120 may select a predefined template for the structured service report from a set of multiple predefined templates based on the identified customer, building, or type of the building equipment. The document writer application 120 can then generate the structured service report to conform to the predefined template.

In some embodiments, the document writer application 120 receives additional data from one or more additional data sources separate from the unstructured service report (e.g., any of the additional models or other data sources described herein). The document writer application 120 can generate the structured service report using the additional data to generate the additional content not provided within the unstructured service report. In some embodiments, the additional data include operational data generated during operation of the building equipment. Generating the additional content may include using the operational data to construct one or more charts, graphs, or graphical data elements in the structured service report. In various embodiments, the additional data may include one or more of engineering data indicating characteristics of the building equipment, operational data generated during operation of the building equipment, warranty data indicating a warranty and/or warranty status associated with the building equipment, parts data indicating parts usage associated with the building equipment, and/or outcome data indicating outcomes of one or more of service requests.

In some embodiments, the additional data used by the document writer application 120 may include data generated by various models such as a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, and/or an air quality model configured to predict air quality in one or more building spaces as a result of the operation of the building equipment.

In some embodiments, the document writer application 120 uses the second model 116 to identify new correlations and/or patterns between the unstructured data of the unstructured service report and the additional data from the one or more additional data sources. In some embodiments, the document writer application uses the second model 116 to identify new correlations and/or patterns between two or more unstructured data elements of the unstructured service report.

In some embodiments, the training data used by the model updater 108 to train the second model 116 includes one or more structured service reports conforming to a predetermined format (e.g., a structured data format, a template for a particular customer or type of equipment, etc.) and including one or more predefined form sections or fields. The document writer application 120 can generate the structured service report by populating the one or more predefined form sections or fields with structured data elements generated from unstructured data of the unstructured service report.

The applications 120 can include, in some implementations, at least one diagnostics and troubleshooting application 120. The diagnostics and troubleshooting application 120 can receive inputs including at least one of a service request or information regarding the item of equipment to be serviced, such as information identified by a service technician. The diagnostics and troubleshooting application 120 can provide the inputs to a corresponding second model 116 to cause the second model 116 to generate outputs such as indications of potential items to be checked regarding the item of equipment, modifications or fixes to make to perform the service, or values or ranges of values of parameters of the item of equipment that may be indicative of specific issues to for the service technician to address or repair.

In some embodiments, the second model 116 is trained using a plurality of first service requests handled by technicians for servicing building equipment. The second model 116 can be trained to predict root causes of a plurality of first problems corresponding to the plurality of first service requests. In some embodiments, the second model 116 is trained to identify one or more patterns or trends between the plurality of first problems corresponding to the plurality of first service requests and outcome data indicating the outcomes of the plurality of first service requests (e.g., particular actions performed to address the plurality of first service requests and whether those actions were successful in resolving the problems). When a new service request is received, the diagnostics and troubleshooting application 120 can use the second model 116 to predict a root cause of a problem corresponding to the new service request based on characteristics of the new service request and one or more patterns or trends identified from the plurality of first service requests using the second model 116.

The diagnostics and troubleshooting application 120 can use information obtained from the new service request alone or in combination with additional data to predict the root cause of the problem. For example, the additional data can include engineering data indicating characteristics of the building equipment, operational data generated during operation of the building equipment or based on data generated during operation of the building equipment (e.g., sensor data, timeseries data, etc.), warranty data indicating a warranty and/or warranty status associated with the building equipment, parts data indicating parts usage associated with the building equipment, and/or any other type of additional data including any of the data from the additional data sources 112. The diagnostics and troubleshooting application 120 can use the additional data from any or all of these data sources to predict the root cause of the problem and/or determine one or more potential root causes of the problem associated with the new service request.

In some embodiments, the diagnostics and troubleshooting application 120 obtains one or more diagnostic models configured to predict one or more potential root causes of the second problem based on a set of structured data inputs. The diagnostic models can include any of the fault detection and diagnostic (FDD) models or processes described as additional data sources 112 above, or any other type of diagnostic model or process that can be used to predict the root causes of various faults or problems associated with the building equipment. In some embodiments, the diagnostics and troubleshooting application 120 can predict the root cause of the problem by using the second model 116 to transform unstructured data corresponding to the new service request into the set of structured data inputs for the diagnostic model. The diagnostics and troubleshooting application 120 can then provide the structured data inputs as inputs to the diagnostic model.

In some embodiments, the diagnostics and troubleshooting application 120 communicates with the feedback trainer 128 and/or the model updater 108 to retrain or refine the second model 116. For example, the diagnostics and troubleshooting application 120 can receive outcome data indicating whether the predicted root causes generated by the second model 116 were determined to be actual root causes of the problems after performing service on the building equipment to address the predicted root causes. The diagnostics and troubleshooting application 120 can retrain or update the second model 116 based on whether the predicted root causes were determined to be actual root causes (e.g., by positively reinforcing the second model 116) or determined to be not actual root causes (e.g., by negatively reinforcing the second model). In some embodiments, the diagnostics and troubleshooting application 120 communicates with the service recommendation generator application 120 to recommend or initiate various actions to address the predicted root causes, as described in greater detail below.

The applications 120 can at least one service recommendation generator application 120. The service recommendation generator application 120 can receive inputs such as a service request or information regarding the item of equipment to be serviced, and provide the inputs to the second model 116 to cause the second model 116 to generate outputs for presenting service recommendations, such as actions to perform to address the service request. In some embodiments, the second model 116 is trained using a plurality of first service requests handled by technicians for servicing building equipment and outcome data indicating outcomes of the plurality of first service requests. The second model 116 can be trained to identify patterns or trends between characteristics of the plurality of first service requests and the outcomes of the plurality of first service requests. When a new service request is received, the service recommendation generator application 120 can use the trained second model 116 to automatically determine one or more responses to the new service request. The responses may be based on characteristics of the new service request and the patterns or trends between the characteristics of the plurality of first service requests and the outcomes of the plurality of first service requests used to train the second model 116.

In some embodiments, the characteristics of the service requests may include any attribute, parameter, property, or other information which can be extracted from the service requests or associated with the service requests (e.g., by linking or coupling the service requests to additional data sources, as described above). For example, the characteristics of the service requests may include a type or model of the building equipment, a geographic location of the building equipment or a building associated with the building equipment, a customer associated with the building equipment, a service history of the building equipment, a problem or fault associated with the building equipment, warranty data associated with the building equipment, or any other characteristic of the service requests or the associated building equipment, spaces, customers, or other related entities.

The outcome data used to train the second model 116 may contribute to the responses (e.g., recommended actions, activities, etc.) or types of responses generated by the service recommendation generator application 120. For example, in some embodiments, the outcome data indicate one or more technicians assigned to the plurality of first service requests, and the responses to the new service request include assigning a technician to handle the second service request using the second model 116. In some embodiments, the outcome data indicate one or more types of service activities required to handle the plurality of first service requests, and the responses to the new service request include assigning a technician to handle the new service request using the second model 116 based on capabilities of one or more technicians with respect to the one or more types of service activities. In some embodiments, the outcome data indicate one or more amounts of time required to perform one or more service events for the building equipment responsive the plurality of first service requests, and the responses to the new service request include scheduling a service activity to handle the new service request using the second model 116 based on a predicted amount of time required to perform the service activity to handle the new service request.

In some embodiments, the outcome data indicate one or more service vehicles used to service the building equipment responsive to the plurality of first service requests, and the responses to the new service request include scheduling a service vehicle to handle the new service request using the second model 116. In some embodiments, the outcome data indicate one or more replacement parts of the building equipment used to service the building equipment responsive to the plurality of first service requests, and the responses to the new service request include provisioning one or more replacement parts to handle the new service request using the second model 116. In some embodiments, the outcome data indicate one or more tools used to service the building equipment responsive to the plurality of first service requests, and the responses to the new service request include provisioning one or more tools to handle the new service request using the second model 116. In some embodiments, the outcome data indicate whether a plurality of service activities performed in response to the plurality of first service requests were successful in resolving one or more problems or faults indicated by the plurality of first service requests, and the responses to the new service request include determining a service activity to perform in response to the new service request using the second model 116. The outcome data can include any combination of outcome data described herein, and the responses can include any combination of the responses described herein.

In some embodiments, the service recommendation generator application 120 can automatically determine the responses to the new service request by predicting a root cause of a problem indicated by the new service request and determining a service activity predicted to resolve the root cause of the problem. The service recommendation generator application 120 can communicate with or use the diagnostics and troubleshooting application 120 to predict the root causes as described above. The responses or recommended actions generated by the service recommendation generator application 120 are not limited to service actions that require a user or technician to perform maintenance or other service on the building equipment, but rather can include any of the responses discussed above and/or various other responses that can be initiated or performed automatically without requiring action from the user. Such responses may include, for example, automatically adjusting a control strategy, setpoint, operating parameter, or other data element used to monitor or control the equipment, updating the software or firmware of the equipment, shutting down the equipment, adjusting other equipment to compensate for a detected fault in the equipment, etc.

In some embodiments, the applications 120 can be configured to automatically initiate or perform one or more of the recommended responses or actions to address the problem with the building equipment. As described above, the applications 120 can use the second model 116 to predict a root cause of the problem and automatically determine one or more actions which are expected to resolve the predicted root cause. Such actions can include, for example, automatically creating a service ticket or work order including parameters of the service ticket or work order, automatically generating control signals and transmitting the control signals to the building equipment to adjust an operation of the building equipment, automatically generating control signals and transmitting the control signals to other building equipment to cause the other building equipment to compensate for the problem associated with the building equipment, automatically initiating a diagnostic test of the building equipment or other building equipment to test whether the predicted root cause is the actual root cause, or any other action or response which can be automatically initiated or performed by the applications 120 in an attempt to address, resolve, or better diagnose the problem associated with the building equipment or the predicted root cause thereof.

In some embodiments, the applications 120 generate and provide a user interface including an indication of the one or more actions automatically performed by the applications 120 to address the problem associated with the building equipment. The user interface may provide the user with an indication of the actions performed and the benefits provided by the actions (e.g., using 5% less energy by switching to a predictive control strategy instead of a reactive control strategy) and/or the problems avoided by the actions (e.g., extended compressor life by 20% by updating the firmware of the chillers).

In some embodiments, the applications 120 use the second model 116 and/or other generative or predictive models to automatically predict future problems likely to occur with the building equipment based on operating data from the building equipment. The future problems may include, for example, a fault associated with operation of the building equipment, a failure of the building equipment or one or more parts thereof, increased degradation of the building equipment, increased energy consumption of the building equipment, increased carbon emissions associated with operation of the building equipment, decreased efficiency of the building equipment, or any other type of future problem.

The applications 120 can then automatically initiate one or more actions to prevent the future problems from occurring or mitigate an effect of the future problems. For example, the second model 116 can be trained identify one or more patterns or trends between a first set of operating data from the building equipment and a set of first problems associated with the building equipment. Both the first set of operating data and the first set of problems can be used as training data for the second model 116. After the second model 116 is trained, the applications 120 can receive new operating data from equipment and use the new operating data as inputs to the second model 116. The second model 116 can predict one or more future problems likely to occur based on the new operating data.

In some embodiments, the applications 120 are configured to predict a root cause of the one or more future problems based on the new operating data from the building equipment using the second model 116 or another diagnostic or predictive model. The applications 120 can automatically initiate an action predicted to prevent the root cause of the one or more future problems from occurring using the second model 116. In some embodiments, the applications 120 can predict a plurality of potential root causes of the one or more future problems based on the new operating data from the building equipment using the second model 116. The applications 120 can then generate a recommendation for one or more additional sensors or other building equipment that, if added to the building equipment, would allow the second model 116 to exclude or confirm one or more of the potential root causes as actual root causes of the one or more future problems.

In some embodiments, the particular action or type of action automatically performed or initiated by the applications 120 depends on the type of future problem predicted. For example, in some embodiments, predicting the future problem includes predicting that a fault will occur in the building equipment at a future time, automatically initiating the one or more actions includes scheduling maintenance to be performed on the building equipment to prevent the fault from occurring. In some embodiments, predicting the future problem includes predicting that the building equipment or a part of the building equipment will fail at future time, and automatically initiating the one or more actions includes scheduling maintenance to be performed on the building equipment at or before the future time to prevent the building equipment or the part of the building equipment from failing. In some embodiments, predicting the future problem includes predicting that the building equipment will operate at decreased efficiency at a future time due to equipment degradation predicted to occur prior to the future time, and automatically initiating the one or more actions comprises scheduling maintenance to be performed on the building equipment at or before the future time to mitigate an effect of the equipment degradation or reset the building equipment to a lower degradation state at the future time.

In some embodiments, predicting the future problem includes predicting that a current control strategy for the building equipment will cause the one or more future problems to occur, and automatically initiating the one or more actions comprises automatically adjusting the control strategy for the building equipment to prevent the one or more future problems from occurring. In some embodiments, predicting the future problem includes predicting that a first set of currently installed building equipment will operate at decreased efficiency relative to a second set of the building equipment comprising at least one device of building equipment not currently installed, and automatically initiating the one or more actions comprises recommending that the at least one device of building equipment not currently installed be installed to cause the building equipment to operate at increased efficiency.

In some embodiments, the applications 120 are configured to generate various user interfaces indicating the benefits of the actions automatically performed or initiated by the applications 120. For example, the applications 120 can generate a user interface including a comparison between (i) a first performance metric of the building equipment predicted to occur at a future time if the one or more future problems occur and (ii) a second performance metric of the building equipment predicted to occur at the future time if the one or more actions are performed to prevent the one or more future problems from occurring or mitigate the effect of the one or more future problems. In some embodiments, the applications 120 can generate a user interface including a report of the one or more future problems prevented or mitigated by automatically initiating the one or more actions.

In some implementations, the applications 120 can include a product recommendation generator application 120. The product recommendation generator application 120 can process inputs such as information regarding the item of equipment or the service request, using one or more second models 116 (e.g., models trained using parts data from the data sources 112), to determine a recommendation of a part or product to replace or otherwise use for repairing the item of equipment.

Feedback Training

Referring further to FIG. 1, the system 100 can include at least one feedback trainer 128 coupled with at least one feedback repository 124. The system 100 can use the feedback trainer 128 to increase the precision and/or accuracy of the outputs generated by the second models 116 according to feedback provided by users of the system 100 and/or the applications 120.

The feedback repository 124 can include feedback received from users regarding output presented by the applications 120. For example, for at least a subset of outputs presented by the applications 120, the applications 120 can present one or more user input elements for receiving feedback regarding the outputs. The user input elements can include, for example, indications of binary feedback regarding the outputs (e.g., good/bad feedback; feedback indicating the outputs do or do not meet the user's criteria, such as criteria regarding technical accuracy or precision); indications of multiple levels of feedback (e.g., scoring the outputs on a predetermined scale, such as a 1-5 scale or 1-10 scale); freeform feedback (e.g., text or audio feedback); or various combinations thereof.

The system 100 can store and/or maintain feedback in the feedback repository 124. In some implementations, the system 100 stores the feedback with one or more data elements associated with the feedback, including but not limited to the outputs for which the feedback was received, the second model(s) 116 used to generate the outputs, and/or input information used by the second models 116 to generate the outputs (e.g., service request information; information captured by the user regarding the item of equipment).

The feedback trainer 128 can update the one or more second models 116 using the feedback. The feedback trainer 128 can be similar to the model updater 108. In some implementations, the feedback trainer 128 is implemented by the model updater 108; for example, the model updater 108 can include or be coupled with the feedback trainer 128. The feedback trainer 128 can perform various configuration operations (e.g., retraining, fine-tuning, transfer learning, etc.) on the second models 116 using the feedback from the feedback repository 124. In some implementations, the feedback trainer 128 identifies one or more first parameters of the second model 116 to maintain as having predetermined values (e.g., freeze the weights and/or biases of one or more first layers of the second model 116), and performs a training process, such as a fine tuning process, to configure parameters of one or more second parameters of the second model 116 using the feedback (e.g., one or more second layers of the second model 116, such as output layers or output heads of the second model 116).

In some implementations, the system 100 may not include and/or use the model updater 108 (or the feedback trainer 128) to determine the second models 116. For example, the system 100 can include or be coupled with an output processor (e.g., an output processor similar or identical to accuracy checker 316 described with reference to FIG. 3) that can evaluate and/or modify outputs from the first model 104 prior to operation of applications 120, including to perform any of various post-processing operations on the output from the first model 104. For example, the output processor can compare outputs of the first model 104 with data from data sources 112 to validate the outputs of the first model 104 and/or modify the outputs of the first model 104 (or output an error) responsive to the outputs not satisfying a validation condition.

In some embodiments, the feedback trainer 128 receives feedback indicating a quality of one or more outputs of the second model 116 and uses the feedback in combination with the set of unstructured service reports to configure or update the trained second model 116. The feedback can include, for example, binary feedback associating the one or more outputs of the second model 116 with a predetermined binary category (e.g., acceptable/unacceptable, good/bad, problem resolved/unresolved, etc.), technical feedback indicating whether the one or more outputs of the second model 116 satisfy technical accuracy or precision criteria (e.g., whether the outputs conform to a predetermined format, meet customer requirements, or are accurate to the technical characteristics of the building system or equipment), score feedback assigning a score to the one or more outputs of the second model 116 on a predetermined scale (e.g., a numerical score within a range of 1-10, a scale including three or more categories such as good, acceptable, bad, etc.), and/or freeform feedback from one or more subject matter experts (e.g., freeform text describing problems or errors with the outputs of the second model 116).

In some embodiments, the feedback indicates a quality of the structured service report generated by the document writer application 120. The feedback trainer 128 can receive the feedback indicating the quality of the structured service report and configure or update the second model 116 using the feedback.

Connected Machine Learning Models

Referring further to FIG. 1, the second model 116 can be coupled with one or more third models, functions, or algorithms for training/configuration and/or runtime operations. The third models can include, for example and without limitation, any of various models relating to items of equipment, such as energy usage models, sustainability models, carbon models, air quality models, or occupant comfort models. The third models can include any of the additional models described as additional data source or destinations herein. For example, the third models can include a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, an air quality model configured to predict air quality in one or more building spaces as a result of the operation of the building equipment, and/or any of the other types of models described throughout the present disclosure or the patents and patent applications incorporated by reference herein. In some embodiments, the second model 116 can be used to process unstructured information regarding items of equipment into predefined template formats compatible with various third models, such that outputs of the second model 116 can be provided as inputs to the third models; this can allow more accurate training of the third models, more training data to be generated for the third models, and/or more data available for use by the third models. The second model 116 can receive inputs from one or more third models, which can provide greater data to the second model 116 for processing.

Automated Service Scheduling and Provisioning

The system 100 can be used to automate operations for scheduling, provisioning, and deploying service technicians and resources for service technicians to perform service operations. For example, the system 100 can use at least one of the first model 104 or the second model 116 to determine, based on processing information regarding service operations for items of equipment relative to completion criteria for the service operation, particular characteristics of service operations such as experience parameters of scheduled service technicians, identifiers of parts provided for the service operations, geographical data, types of customers, types of problems, or information content provided to the service technicians to facilitate the service operation, where such characteristics correspond to the completion criteria being satisfied (e.g., where such characteristics correspond to an increase in likelihood of the completion criteria being satisfied relative to other characteristics for service technicians, parts, information content, etc.). For example, the system 100 can determine, for a given item of equipment, particular parts to include on a truck to be sent to the site of the item of equipment. As such, the system 100, responsive to processing inputs at runtime such as service requests, can automatically and more accurately identify service technicians and parts to direct to the item of equipment for the service operations. The system 100 can use timing information to perform batch scheduling for multiple service operations and/or multiple technicians for the same or multiple service operations. The system 100 can perform batch scheduling for multiple trucks for multiple items of equipment, such as to schedule a first one or more parts having a greater likelihood for satisfying the completion criteria for a first item of equipment on a first truck, and a second one or more parts having a greater likelihood for satisfying the completion criteria for a second item of equipment on a second truck. The automated service scheduling and provisioning operations performed by the system 100 can include any or all of the operations described above with reference to the applications 120.

Figure 2:
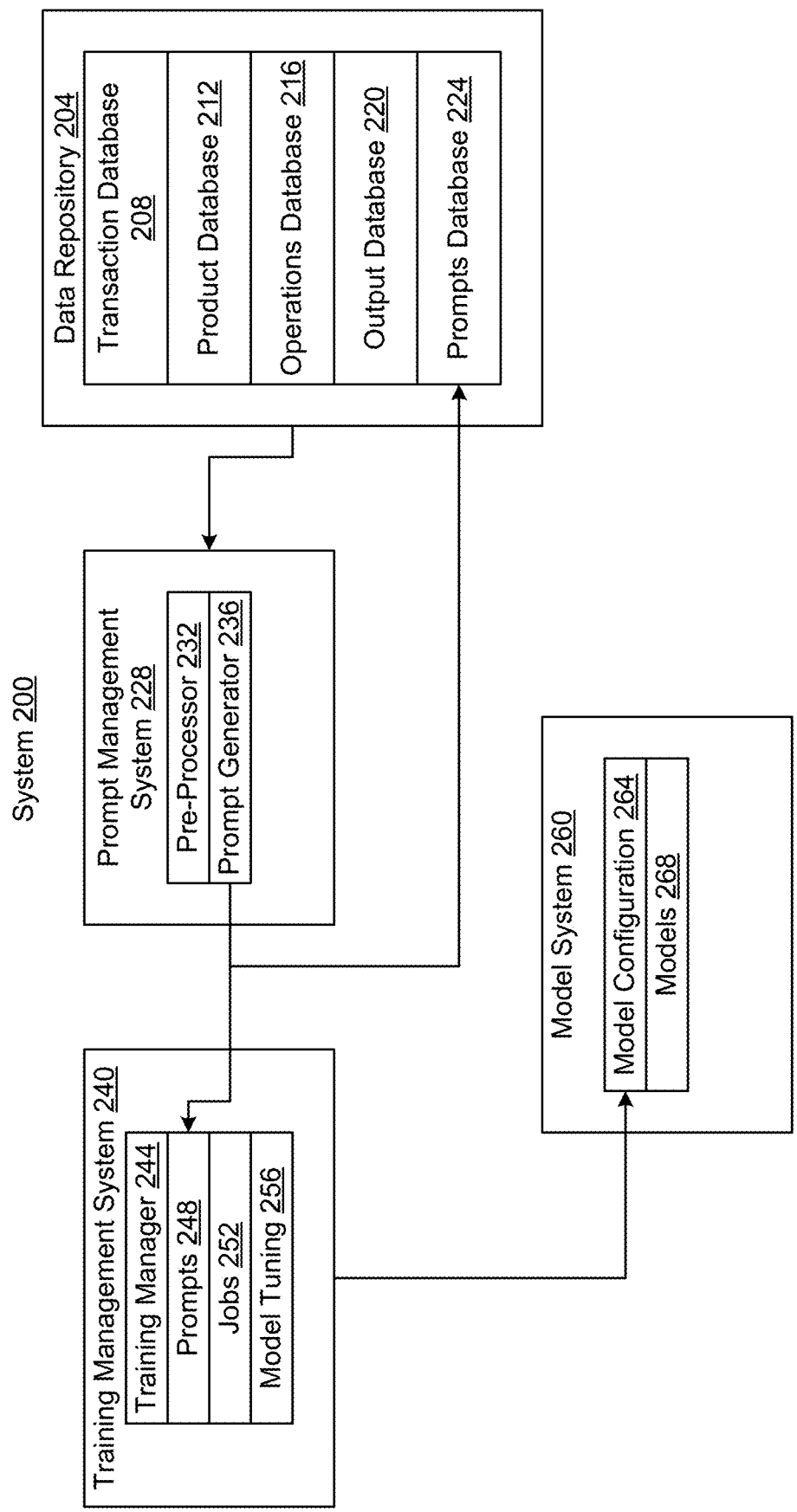
FIG. 2 is a block diagram of an example of a language model-based system for equipment servicing applications, according to some embodiments.

II. System Architectures for Generative AI Applications for Building Management System and Equipment Servicing FIG. 2 depicts an example of a system 200. The system 200 can include one or more components or features of the system 100, such as any one or more of the first model 104, data sources 112, second model 116, applications 120, feedback repository 124, and/or feedback trainer 128. The system 200 can perform specific operations to enable generative AI applications for building managements systems and equipment servicing, such as various manners of processing input data into training data (e.g., tokenizing input data; forming input data into prompts and/or completions), and managing training and other machine learning model configuration processes. Various components of the system 200 can be implemented using one or more computer systems, which may be provided on the same or different processors (e.g., processors communicatively coupled via wired and/or wireless connections).

The system 200 can include at least one data repository 204, which can be similar to the data sources 112 described with reference to FIG. 1. For example, the data repository 204 can include a transaction database 208, which can be similar or identical to one or more of warranty data or service data of data sources 112. For example, the transaction database 208 can include data such as parts used for service transactions; sales data indicating various service transactions or other transactions regarding items of equipment; warranty and/or claims data regarding items of equipment; and service data.

The data repository 204 can include a product database 212, which can be similar or identical to the parts data of the data sources 112. The product database 212 can include, for example, data regarding products available from various vendors, specifications or parameters regarding products, and indications of products used for various service operations. The products database 212 can include data such as events or alarms associated with products; logs of product operation; and/or time series data regarding product operation, such as longitudinal data values of operation of products and/or building equipment.

The data repository 204 can include an operations database 216, which can be similar or identical to the operations data of the data sources 112. For example, the operations database 216 can include data such as manuals regarding parts, products, and/or items of equipment; customer service data; and or reports, such as operation or service logs.

In some implementations, the data repository 204 can include an output database 220, which can include data of outputs that may be generated by various machine learning models and/or algorithms. For example, the output database 220 can include values of pre-calculated predictions and/or insights, such as parameters regarding operation items of equipment, such as setpoints, changes in setpoints, flow rates, control schemes, identifications of error conditions, or various combinations thereof.

As depicted in FIG. 2, the system 200 can include a prompt management system 228. The prompt management system 228 can include one or more rules, heuristics, logic, policies, algorithms, functions, machine learning models, neural networks, scripts, or various combinations thereof to perform operations including processing data from data repository 204 into training data for configuring various machine learning models. For example, the prompt management system 228 can retrieve and/or receive data from the data repository 228, and determine training data elements that include examples of input and outputs for generation by machine learning models, such as a training data element that includes a prompt and a completion corresponding to the prompt, based on the data from the data repository 228.

In some implementations, the prompt management system 228 includes a pre-processor 232. The pre-processor 232 can perform various operations to prepare the data from the data repository 204 for prompt generation. For example, the pre-processor 232 can perform any of various filtering, compression, tokenizing, or combining (e.g., combining data from various databases of the data repository 204) operations.

The prompt management system 228 can include a prompt generator 236. The prompt generator 236 can generate, from data of the data repository 204, one or more training data elements that include a prompt and a completion corresponding to the prompt. In some implementations, the prompt generator 236 receives user input indicative of prompt and completion portions of data. For example, the user input can indicate template portions representing prompts of structured data, such as predefined fields or forms of documents, and corresponding completions provided for the documents. The user input can assign prompts to unstructured data. In some implementations, the prompt generator 236 automatically determines prompts and completions from data of the data repository 204, such as by using any of various natural language processing algorithms to detect prompts and completions from data. In some implementations, the system 200 does not identify distinct prompts and completions from data of the data repository 204.

Referring further to FIG. 2, the system 200 can include a training management system 240. The training management system 240 can include one or more rules, heuristics, logic, policies, algorithms, functions, machine learning models, neural networks, scripts, or various combinations thereof to perform operations including controlling training of machine learning models, including performing fine tuning and/or transfer learning operations.

The training management system 240 can include a training manager 244. The training manager 244 can incorporate features of at least one of the model updater 108 or the feedback trainer 128 described with reference to FIG. 1. For example, the training manager 244 can provide training data including a plurality of training data elements (e.g., prompts and corresponding completions) to the model system 260 as described further herein to facilitate training machine learning models.

In some implementations, the training management system 240 includes a prompts database 248. For example, the training management system 240 can store one or more training data elements from the prompt management system 228, such as to facilitate asynchronous and/or batched training processes.

The training manager 244 can control the training of machine learning models using information or instructions maintained in a model tuning database 256. For example, the training manager 244 can store, in the model tuning database 256, various parameters or hyperparameters for models and/or model training.

In some implementations, the training manager 244 stores a record of training operations in a jobs database 252. For example, the training manager 244 can maintain data such as a queue of training jobs, parameters or hyperparameters to be used for training jobs, or information regarding performance of training.

Referring further to FIG. 2, the system 200 can include at least one model system 260 (e.g., one or more language model systems). The model system 260 can include one or more rules, heuristics, logic, policies, algorithms, functions, machine learning models, neural networks, scripts, or various combinations thereof to perform operations including configuring one or more machine learning models 268 based on instructions from the training management system 240. In some implementations, the training management system 240 implements the model system 260. In some implementations, the training management system 240 can access the model system 260 using one or more APIs, such as to provide training data and/or instructions for configuring machine learning models 268 via the one or more APIs. The model system 260 can operate as a service layer for configuring the machine learning models 268 responsive to instructions from the training management system 240. The machine learning models 268 can be or include the first model 104 and/or second model 116 described with reference to FIG. 1.

The model system 260 can include a model configuration processor 264. The model configuration processor 264 can incorporate features of the model updater 108 and/or the feedback trainer 128 described with reference to FIG. 1. For example, the model configuration processor 264 can apply training data (e.g., prompts 248 and corresponding completions) to the machine learning models 268 to configure (e.g., train, modify, update, fine-tune, etc.) the machine learning models 268. The training manager 244 can control training by the model configuration processor 264 based on model tuning parameters in the model tuning database 256, such as to control various hyperparameters for training. In various implementations, the system 200 can use the training management system 240 to configure the machine learning models 268 in a similar manner as described with reference to the second model 116 of FIG. 1, such as to train the machine learning models 268 using any of various data or combinations of data from the data repository 204.

Application Session Management

Figure 3:
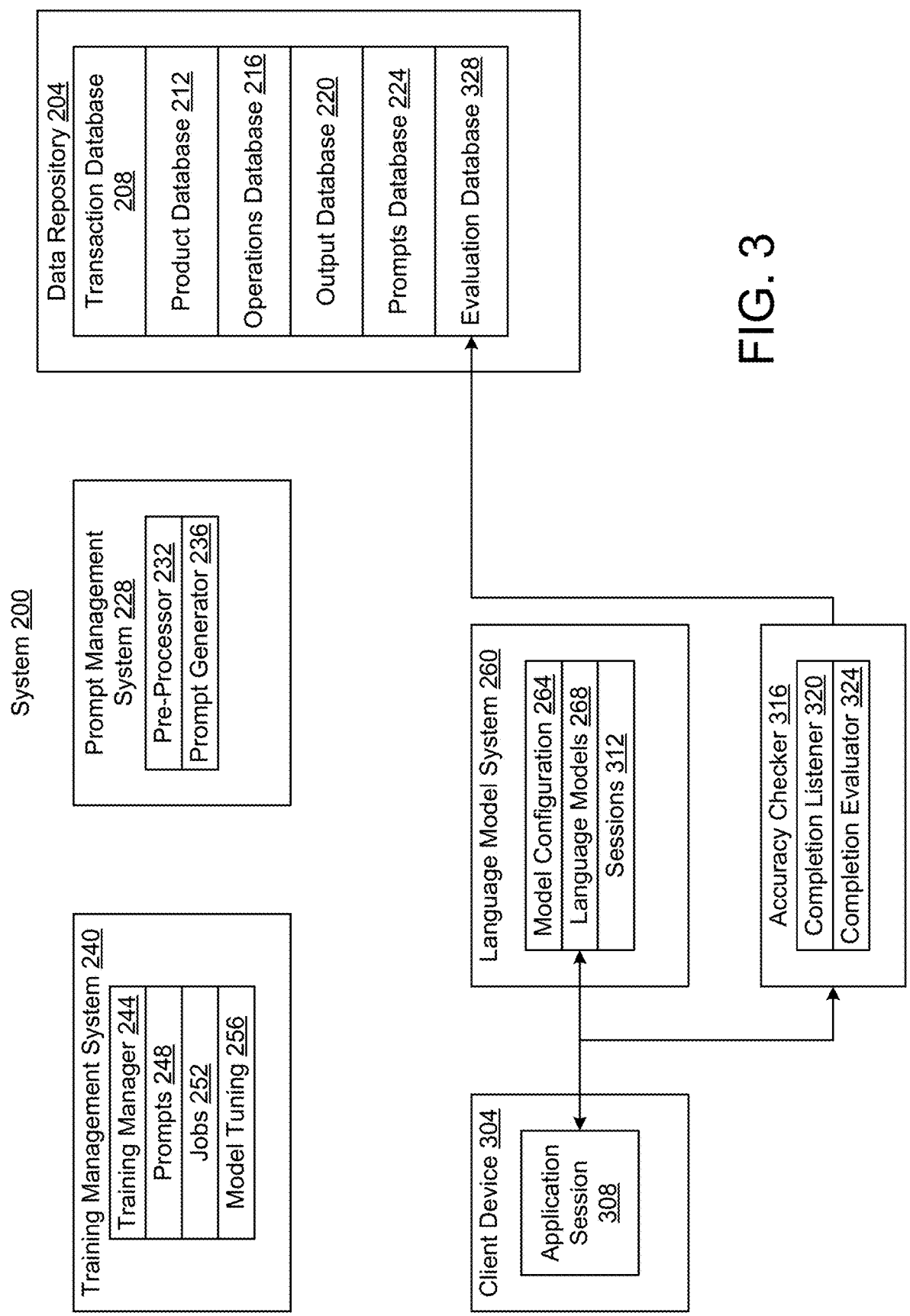
FIG. 3 is a block diagram of an example of the system of FIG. 2 including user application session components, according to some embodiments.

FIG. 3 depicts an example of the system 200, in which the system 200 can perform operations to implement at least one application session 308 for a client device 304. For example, responsive to configuring the machine learning models 268, the system 200 can generate data for presentation by the client device 304 (including generating data responsive to information received from the client device 304) using the at least one application session 308 and the one or more machine learning models 268.

The client device 304 can be a device of a user, such as a technician or building manager. The client device 304 can include any of various wireless or wired communication interfaces to communicate data with the model system 260, such as to provide requests to the model system 260 indicative of data for the machine learning models 268 to generate, and to receive outputs from the model system 260. The client device 304 can include various user input and output devices to facilitate receiving and presenting inputs and outputs.

In some implementations, the system 200 provides data to the client device 304 for the client device 304 to operate the at least one application session 308. The application session 308 can include a session corresponding to any of the applications 120 described with reference to FIG. 1. For example, the client device 304 can launch the application session 308 and provide an interface to request one or more prompts. Responsive to receiving the one or more prompts, the application session 308 can provide the one or more prompts as input to the machine learning model 268. The machine learning model 268 can process the input to generate a completion, and provide the completion to the application session 308 to present via the client device 304. In some implementations, the application session 308 can iteratively generate completions using the machine learning models 268. For example, the machine learning models 268 can receive a first prompt from the application session 308, determine a first completion based on the first prompt and provide the first completion to the application session 308, receive a second prompt from the application 308, determine a second completion based on the second prompt (which may include at least one of the first prompt or the first completion concatenated to the second prompt), and provide the second completion to the application session 308.

In some implementations, the model system 260 includes at least one sessions database 312. The sessions database 312 can maintain records of application session 308 implemented by client devices 304. For example, the sessions database 312 can include records of prompts provided to the machine learning models 268 and completions generated by the machine learning models 268. As described further with reference to FIG. 4, the system 200 can use the data in the sessions database 312 to fine-tune or otherwise update the machine learning models 268.

Completion Checking

In some implementations, the system 200 includes an accuracy checker 316. The accuracy checker 316 can include one or more rules, heuristics, logic, policies, algorithms, functions, machine learning models, neural networks, scripts, or various combinations thereof to perform operations including evaluating performance criteria regarding the completions determined by the model system 260. For example, the accuracy checker 316 can include at least one completion listener 320. The completion listener 320 can receive the completions determined by the model system 320 (e.g., responsive to the completions being generated by the machine learning model 268 and/or by retrieving the completions from the sessions database 312).

The accuracy checker 316 can include at least one completion evaluator 324. The completion evaluator 324 can evaluate the completions (e.g., as received or retrieved by the completion listener 320) according to various criteria. In some implementations, the completion evaluator 324 evaluates the completions by comparing the completions with corresponding data from the data repository 204. For example, the completion evaluator 324 can identify data of the data repository 204 having similar text as the prompts and/or completions (e.g., using any of various natural language processing algorithms), and determine whether the data of the completions is within a range of expected data represented by the data of the data repository 204.

In some implementations, the accuracy checker 316 can store an output from evaluating the completion (e.g., an indication of whether the completion satisfies the criteria) in an evaluation database 328. For example, the accuracy checker 316 can assign the output (which may indicate at least one of a binary indication of whether the completion satisfied the criteria or an indication of a portion of the completion that did not satisfy the criteria) to the completion for storage in the evaluation database 328, which can facilitate further training of the machine learning models 268 using the completions and output.

Feedback Training

Figure 4:
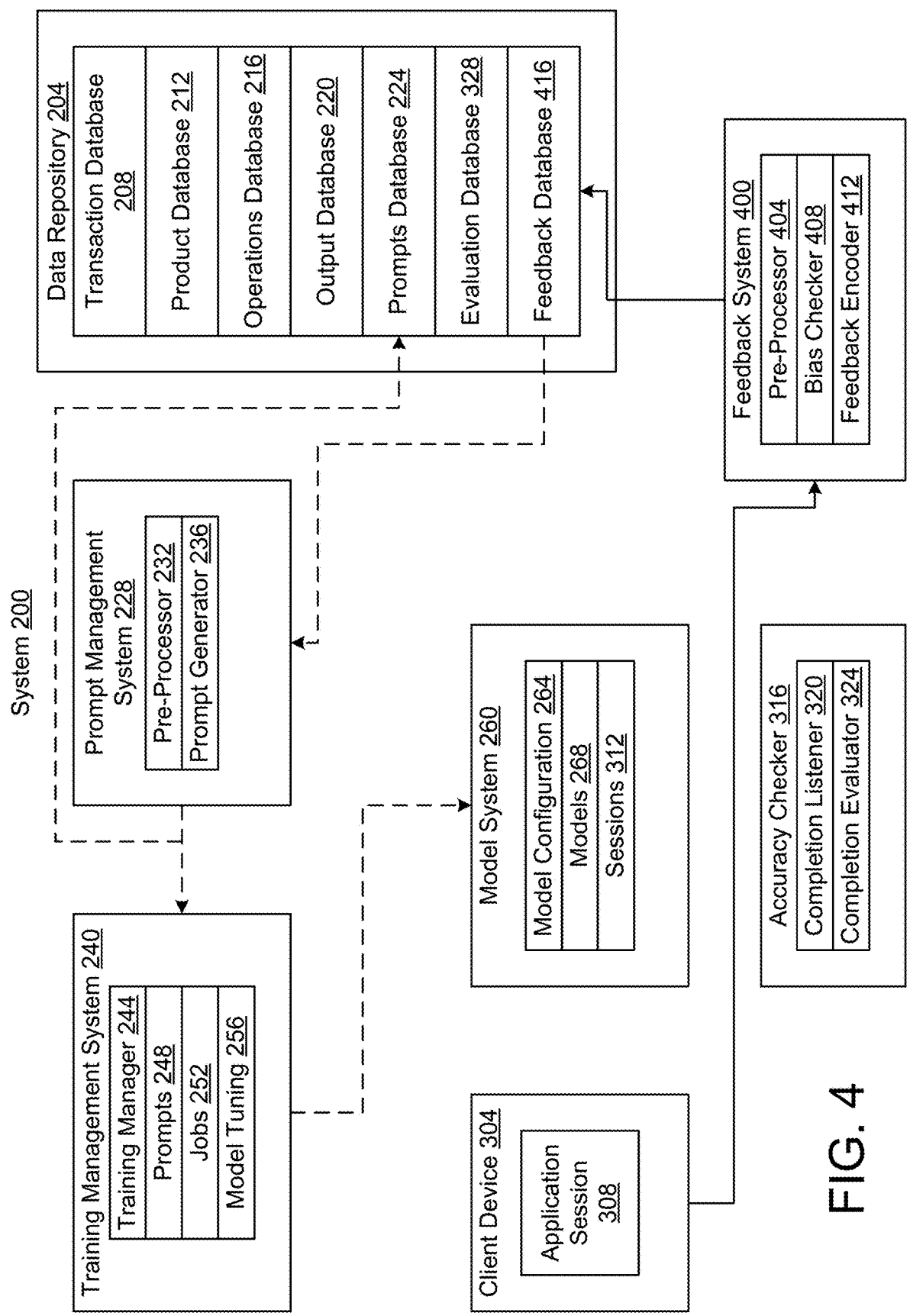
FIG. 4 is a block diagram of an example of the system of FIG. 2 including feedback training components, according to some embodiments.

FIG. 4 depicts an example of the system 200 that includes a feedback system 400, such as a feedback aggregator. The feedback system 400 can include one or more rules, heuristics, logic, policies, algorithms, functions, machine learning models, neural networks, scripts, or various combinations thereof to perform operations including preparing data for updating and/or updating the machine learning models 268 using feedback corresponding to the application sessions 308, such as feedback received as user input associated with outputs presented by the application sessions 308. The feedback system 400 can incorporate features of the feedback repository 124 and/or feedback trainer 128 described with reference to FIG. 1.

The feedback system 400 can receive feedback (e.g., from the client device 304) in various formats. For example, the feedback can include any of text, speech, audio, image, and/or video data. The feedback can be associated (e.g., in a data structure generated by the application session 308) with the outputs of the machine learning models 268 for which the feedback is provided. The feedback can be received or extracted from various forms of data, including external data sources such as manuals, service reports, or Wikipedia-type documentation.

In some implementations, the feedback system 400 includes a pre-processor 400. The pre-processor 400 can perform any of various operations to modify the feedback for further processing. For example, the pre-processor 400 can incorporate features of, or be implemented by, the pre-processor 232, such as to perform operations including filtering, compression, tokenizing, or translation operations (e.g., translation into a common language of the data of the data repository 204).

The feedback system 400 can include a bias checker 408. The bias checker 408 can evaluate the feedback using various bias criteria, and control inclusion of the feedback in a feedback database 416 (e.g., a feedback database 416 of the data repository 204 as depicted in FIG. 4) according to the evaluation. The bias criteria can include, for example and without limitation, criteria regarding qualitative and/or quantitative differences between a range or statistic measure of the feedback relative to actual, expected, or validated values.

The feedback system 400 can include a feedback encoder 412. The feedback encoder 412 can process the feedback (e.g., responsive to bias checking by the bias checker 408) for inclusion in the feedback database 416. For example, the feedback encoder 412 can encode the feedback as values corresponding to outputs scoring determined by the model system 260 while generating completions (e.g., where the feedback indicates that the completion presented via the application session 308 was acceptable, the feedback encoder 412 can encode the feedback by associating the feedback with the completion and assigning a relatively high score to the completion).

As indicated by the dashed arrows in FIG. 4, the feedback can be used by the prompt management system 228 and training management system 240 to further update one or more machine learning models 268. For example, the prompt management system 228 can retrieve at least one feedback (and corresponding prompt and completion data) from the feedback database 416, and process the at least one feedback to determine a feedback prompt and feedback completion to provide to the training management system 240 (e.g., using pre-processor 232 and/or prompt generator 236, and assigning a score corresponding to the feedback to the feedback completion). The training manager 244 can provide instructions to the model system 260 to update the machine learning models 268 using the feedback prompt and the feedback completion, such as to perform a fine-tuning process using the feedback prompt and the feedback completion. In some implementations, the training management system 240 performs a batch process of feedback-based fine tuning by using the prompt management system 228 to generate a plurality of feedback prompts and a plurality of feedback completion, and providing instructions to the model system 260 to perform the fine-tuning process using the plurality of feedback prompts and the plurality of feedback completions.

Data Filtering and Validation Systems

Figure 5:
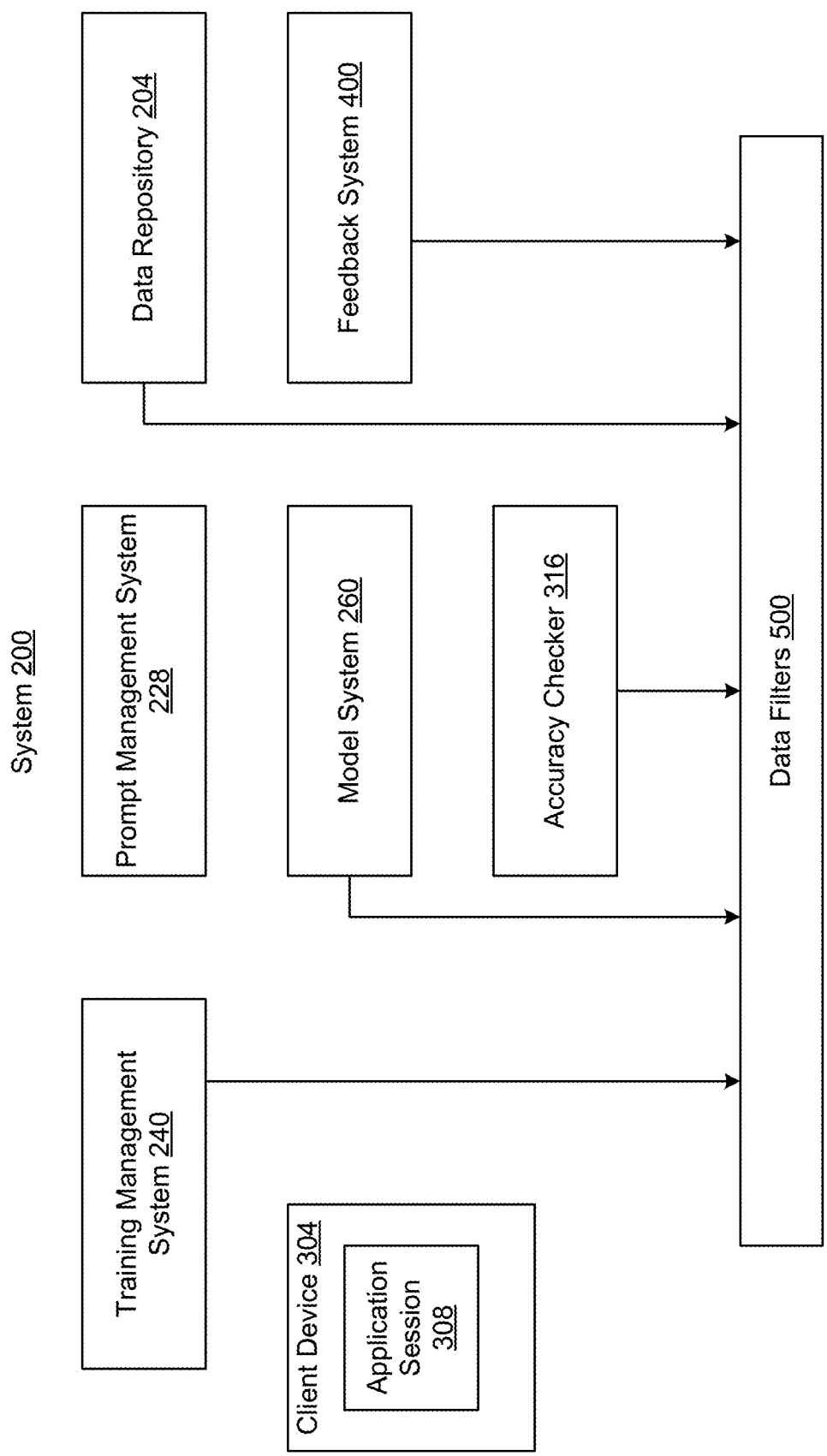
FIG. 5 is a block diagram of an example of the system of FIG. 2 including data filters, according to some embodiments.

FIG. 5 depicts an example of the system 200, where the system 200 can include one or more data filters 500 (e.g., data validators). The data filters 500 can include any one or more rules, heuristics, logic, policies, algorithms, functions, machine learning models, neural networks, scripts, or various combinations thereof to perform operations including modifying data processed by the system 200 and/or triggering alerts responsive to the data not satisfying corresponding criteria, such as thresholds for values of data. Various data filtering processes described with reference to FIG. 5 (as well as FIGS. 6 and 7) can enable the system 200 to implement timely operations for improving the precision and/or accuracy of completions or other information generated by the system 200 (e.g., including improving the accuracy of feedback data used for fine-tuning the machine learning models 268). The data filters 500 can allow for interactions between various algorithms, models, and computational processes.

For example, the data filters 500 can be used to evaluate data relative to thresholds relating to data including, for example and without limitation, acceptable data ranges, setpoints, temperatures, pressures, flow rates (e.g., mass flow rates), or vibration rates for an item of equipment. The threshold can include any of various thresholds, such as one or more of minimum, maximum, absolute, relative, fixed band, and/or floating band thresholds.

The data filters 500 can enable the system 200 to detect when data, such as prompts, completions, or other inputs and/or outputs of the system 200, collide with thresholds that represent realistic behavior or operation or other limits of items of equipment. For example, the thresholds of the data filters 500 can correspond to values of data that are within feasible or recommended operating ranges. In some implementations, the system 200 determines or receives the thresholds using models or simulations of items of equipment, such as plant or equipment simulators, chiller models, HVAC-R models, refrigeration cycle models, etc. The system 200 can receive the thresholds as user input (e.g., from experts, technicians, or other users). The thresholds of the data filters 500 can be based on information from various data sources. The thresholds can include, for example and without limitation, thresholds based on information such as equipment limitations, safety margins, physics, expert teaching, etc. For example, the data filters 500 can include thresholds determined from various models, functions, or data structures (e.g., tables) representing physical properties and processes, such as physics of psychometrics, thermodynamics, and/or fluid dynamics information.

The system 200 can determine the thresholds using the feedback system 400 and/or the client device 304, such as by providing a request for feedback that includes a request for a corresponding threshold associated with the completion and/or prompt presented by the application session 308. For example, the system 200 can use the feedback to identify realistic thresholds, such as by using feedback regarding data generated by the machine learning models 268 for ranges, setpoints, and/or start-up or operating sequences regarding items of equipment (and which can thus be validated by human experts). In some implementations, the system 200 selectively requests feedback indicative of thresholds based on an identifier of a user of the application session 308, such as to selectively request feedback from users having predetermined levels of expertise and/or assign weights to feedback according to criteria such as levels of expertise.

In some implementations, one or more data filters 500 correspond to a given setup. For example, the setup can represent a configuration of a corresponding item of equipment (e.g., configuration of a chiller, etc.). The data filters 500 can represent various thresholds or conditions with respect to values for the configuration, such as feasible or recommendation operating ranges for the values. In some implementations, one or more data filters 500 correspond to a given situation. For example, the situation can represent at least one of an operating mode or a condition of a corresponding item of equipment.

FIG. 5 depicts some examples of data (e.g., inputs, outputs, and/or data communicated between nodes of machine learning models 268) to which the data filters 500 can be applied to evaluate data processed by the system 200 including various inputs and outputs of the system 200 and components thereof. This can include, for example and without limitation, filtering data such as data communicated between one or more of the data repository 204, prompt management system 228, training management system 240, model system 260, client device 304, accuracy checker 316, and/or feedback system 400. For example, the data filters 500 (as well as validation system 600 described with reference to FIG. 6 and/or expert filter collision system 700 described with reference to FIG. 7) can receive data outputted from a source (e.g., source component) of the system 200 for receipt by a destination (e.g., destination component) of the system 200, and filter, modify, or otherwise process the outputted data prior to the system 200 providing the outputted data to the destination. The sources and destinations can include any of various combinations of components and systems of the system 200.

The system 200 can perform various actions responsive to the processing of data by the data filters 500. In some implementations, the system 200 can pass data to a destination without modifying the data (e.g., retaining a value of the data prior to evaluation by the data filter 500) responsive to the data satisfying the criteria of the respective data filter(s) 500. In some implementations, the system 200 can at least one of (i) modify the data or (ii) output an alert responsive to the data not satisfying the criteria of the respective data filter(s) 500. For example, the system 200 can modify the data by modifying one or more values of the data to be within the criteria of the data filters 500.

In some implementations, the system 200 modifies the data by causing the machine learning models 268 to regenerate the completion corresponding to the data (e.g., for up to a predetermined threshold number of regeneration attempts before triggering the alert). This can enable the data filters 500 and the system 200 selectively trigger alerts responsive to determining that the data (e.g., the collision between the data and the thresholds of the data filters 500) may not be repairable by the machine learning model 268 aspects of the system 200.

The system 200 can output the alert to the client device 304. The system 200 can assign a flag corresponding to the alert to at least one of the prompt (e.g., in prompts database 224) or the completion having the data that triggered the alert.

Figure 6:
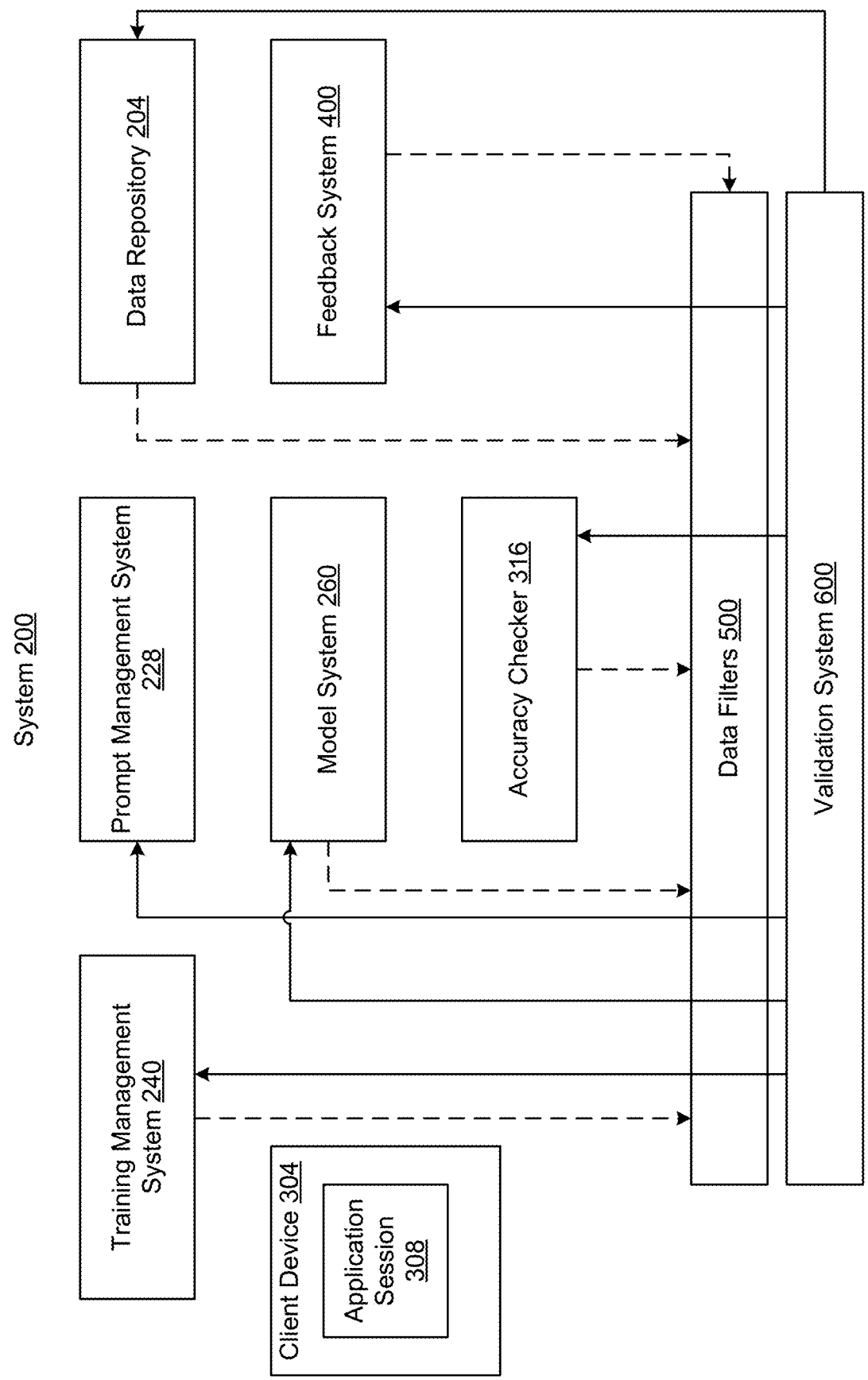
FIG. 6 is a block diagram of an example of the system of FIG. 2 including data validation components, according to some embodiments.

FIG. 6 depicts an example of the system 200, in which a validation system 600 is coupled with one or more components of the system 200, such as to process and/or modify data communicated between the components of the system 200. For example, the validation system 600 can provide a validation interface for human users (e.g., expert supervisors, checkers) and/or expert systems (e.g., data validation systems that can implement processes analogous to those described with reference to the data filters 500) to receive data of the system 200 and modify, validate, or otherwise process the data. For example, the validation system 600 can provide to human expert supervisors, human checkers, and/or expert systems various data of the system 200, receive responses to the provided data indicating requested modifications to the data or validations of the data, and modify (or validate) the provided data according to the responses.

For example, the validation system 600 can receive data such as data retrieved from the data repository 204, prompts outputted by the prompt management system 228, completions outputted by the model system 260, indications of accuracy outputted by the accuracy checker 316, etc., and provide the received data to at least one of an expert system or a user interface. In some implementations, the validation system 600 receives a given item of data prior to the given item of data being processed by the model system 260, such as to validate inputs to the machine learning models 268 prior to the inputs being processed by the machine learning models 268 to generate outputs, such as completions.

In some implementations, the validation system 600 validates data by at least one of (i) assigning a label (e.g., a flag, etc.) to the data indicating that the data is validated or (ii) passing the data to a destination without modifying the data. For example, responsive to receiving at least one of a user input (e.g., from a human validator/supervisor/expert) that the data is valid or an indication from an expert system that the data is valid, the validation system 600 can assign the label and/or provide the data to the destination.

The validation system 600 can selectively provide data from the system 200 to the validation interface responsive to operation of the data filters 500. This can enable the validation system 600 to trigger validation of the data responsive to collision of the data with the criteria of the data filters 500. For example, responsive to the data filters 500 determining that an item of data does not satisfy a corresponding criteria, the data filters 500 can provide the item of data to the validation system 600. The data filters 500 can assign various labels to the item of data, such as indications of the values of the thresholds that the data filters 500 used to determine that the item of data did not satisfy the thresholds. Responsive to receiving the item of data from the data filters 500, the validation system 600 can provide the item of data to the validation interface (e.g., to a user interface of client device 304 and/or application session 308; for comparison with a model, simulation, algorithm, or other operation of an expert system) for validation. In some implementations, the validation system 600 can receive an indication that the item of data is valid (e.g., even if the item of data did not satisfy the criteria of the data filters 500) and can provide the indication to the data filters 500 to cause the data filters 500 to at least partially modify the respective thresholds according to the indication.

In some implementations, the validation system 600 selectively retrieves data for validation where (i) the data is determined or outputted prior to use by the machine learning models 268, such as data from the data repository 204 or the prompt management system 228, or (ii) the data does not satisfy a respective data filter 500 that processes the data. This can enable the system 200, the data filters 500, and the validation system 600 to update the machine learning models 268 and other machine learning aspects (e.g., generative AI aspects) of the system 200 to more accurately generate data and completions (e.g., enabling the data filters 500 to generate alerts that are received by the human experts/expert systems that may be repairable by adjustments to one or more components of the system 200).

Figure 7:
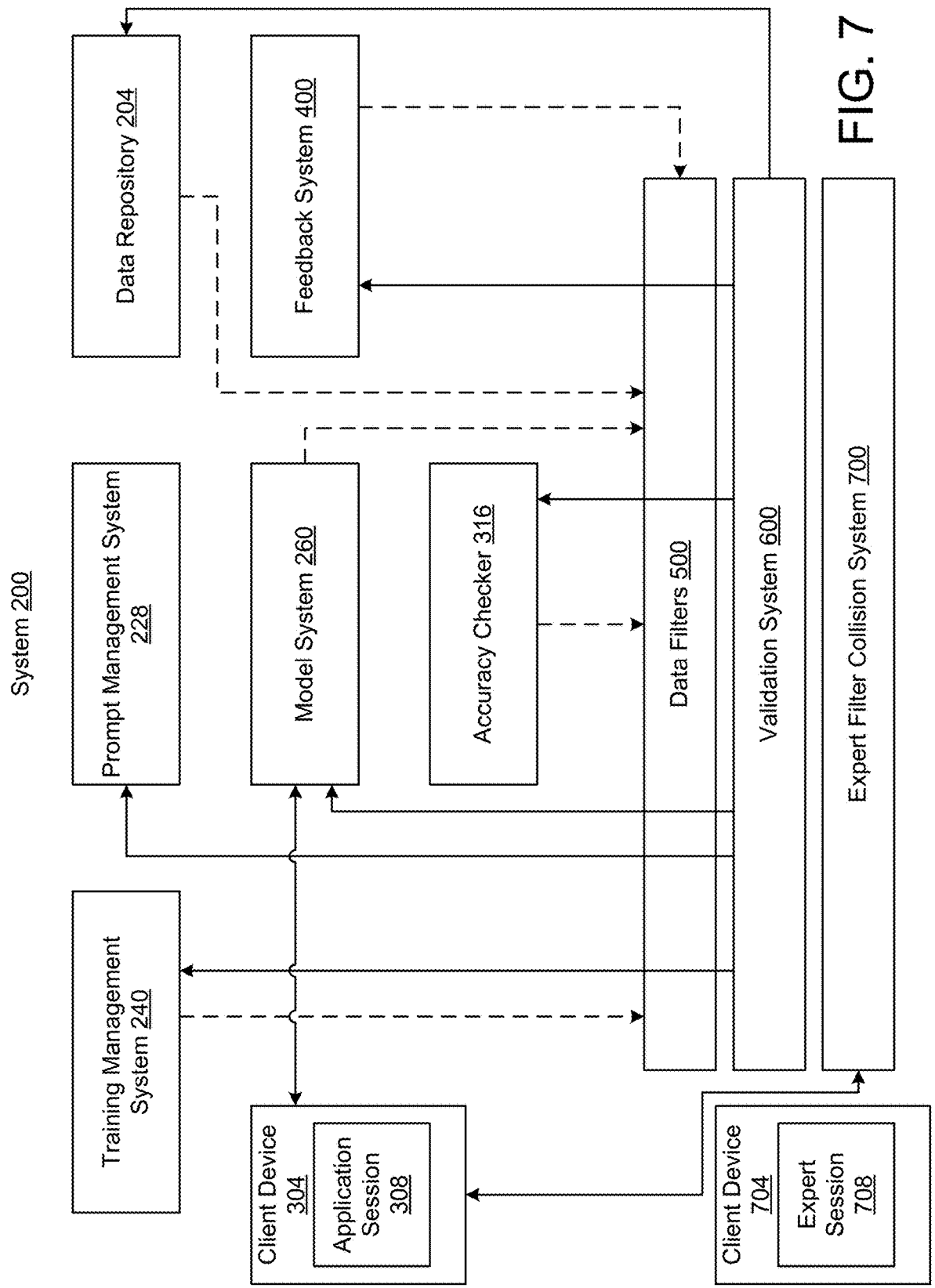
FIG. 7 is a block diagram of an example of the system of FIG. 2 including expert review and intervention components, according to some embodiments.

FIG. 7 depicts an example of the system 200, in which an expert filter collision system 700 ("expert system" 700) can facilitate providing feedback and providing more accurate and/or precise data and completions to a user via the application session 308. For example, the expert system 700 can interface with various points and/or data flows of the system 200, as depicted in FIG. 7, where the system 200 can provide data to the expert filter collision system 700, such as to transmit the data to a user interface and/or present the data via a user interface of the expert filter collision system 700 that can be accessed via an expert session 708 of a client device 704. For example, via the expert session 708, the expert session 700 can enable functions such as receiving inputs for a human expert to provide feedback to a user of the client device 304; a human expert to guide the user through the data (e.g., completions) provided to the client device 304, such as reports, insights, and action items; a human expert to review and/or provide feedback for revising insights, guidance, and recommendations before being presented by the application session 308; a human expert to adjust and/or validate insights or recommendations before they are viewed or used for actions by the user; or various combinations thereof. In some implementations, the expert system 700 can use feedback received via the expert session as inputs to update the machine learning models 268 (e.g., to perform fine-tuning).

In some implementations, the expert system 700 retrieves data to be provided to the application session 308, such as completions generated by the machine learning models 268. The expert system 700 can present the data via the expert session 708, such as to request feedback regarding the data from the client device 704. For example, the expert system 700 can receive feedback regarding the data for modifying or validating the data (e.g., editing or validating completions). In some implementations, the expert system 700 requests at least one of an identifier or a credential of a user of the client device 704 prior to providing the data to the client device 704 and/or requesting feedback regarding the data from the expert session 708. For example, the expert system 700 can request the feedback responsive to determining that the at least one of the identifier or the credential satisfies a target value for the data. This can allow the expert system 708 to selectively identify experts to use for monitoring and validating the data.

In some implementations, the expert system 700 facilitates a communication session regarding the data, between the application session 308 and the expert session 708. For example, the expert session 700, responsive to detecting presentation of the data via the application session 308, can request feedback regarding the data (e.g., user input via the application session 308 for feedback regarding the data), and provide the feedback to the client device 704 to present via the expert session 708. The expert session 708 can receive expert feedback regarding at least one of the data or the feedback from the user to provide to the application session 308. In some implementations, the expert system 700 can facilitate any of various real-time or asynchronous messaging protocols between the application session 308 and expert session 708 regarding the data, such as any of text, speech, audio, image, and/or video communications or combinations thereof. This can allow the expert system 700 to provide a platform for a user receiving the data (e.g., customer or field technician) to receive expert feedback from a user of the client device 704 (e.g., expert technician). In some implementations, the expert system 700 stores a record of one or more messages or other communications between the sessions 308, 708 in the data repository 204 to facilitate further configuration of the machine learning models 268 based on the interactions between the users of the sessions 308, 708.

Building Data Platforms and Digital Twin Architectures

Referring further to FIGS. 1-7, various systems and methods described herein can be executed by and/or communicate with building data platforms, including data platforms of building management systems. For example, the data repository 204 can include or be coupled with one or more building data platforms, such as to ingest data from building data platforms and/or digital twins. The client device 304 can communicate with the system 200 via the building data platform, and can feedback, reports, and other data to the building data platform. In some implementations, the data repository 204 maintains building data platform-specific databases, such as to enable the system 200 to configure the machine learning models 268 on a building data platform-specific basis (or on an entity-specific basis using data from one or more building data platforms maintained by the entity).

For example, in some implementations, various data discussed herein may be stored in, retrieved from, or processed in the context of building data platforms and/or digital twins; processed at (e.g., processed using models executed at) a cloud or other off-premises computing system/device or group of systems/devices, an edge or other on-premises system/device or group of systems/devices, or a hybrid thereof in which some processing occurs off-premises and some occurs on-premises; and/or implemented using one or more gateways for communication and data management amongst various such systems/devices. In some such implementations, the building data platforms and/or digital twins may be provided within an infrastructure such as those described in U.S. patent application Ser. No. 17/134,661 filed Dec. 28, 2020, Ser. No. 18/080,360, filed Dec. 13, 2022, Ser. No. 17/537,046 filed Nov. 29, 2021, and Ser. No. 18/096,965, filed Jan. 13, 2023, and Indian patent application Ser. No. 20/234,1008712, filed Feb. 10, 2023, the disclosures of which are incorporated herein by reference in their entireties.

III. Machine Learning/AI (e.g., Generative AI)—Based Systems and Methods for Equipment Servicing As described above, systems and methods in accordance with the present disclosure can use machine learning models, including, but not limited to, LLMs and other generative AI models, to ingest data regarding building management systems and equipment in various unstructured and structured formats, and generate completions and other outputs targeted to provide useful information to users. Various systems and methods described herein can use machine learning models to support applications for presenting data with high accuracy and relevance. While various implementations discuss utilizing generative AI models to implement and/or execute certain features, it should be understood that, in various implementations, one or more of the features may be implemented using non-generative AI models or other algorithms, alone or in combination with generative AI models, and all such implementations are contemplated in the context of the present disclosure.

Figure 8:
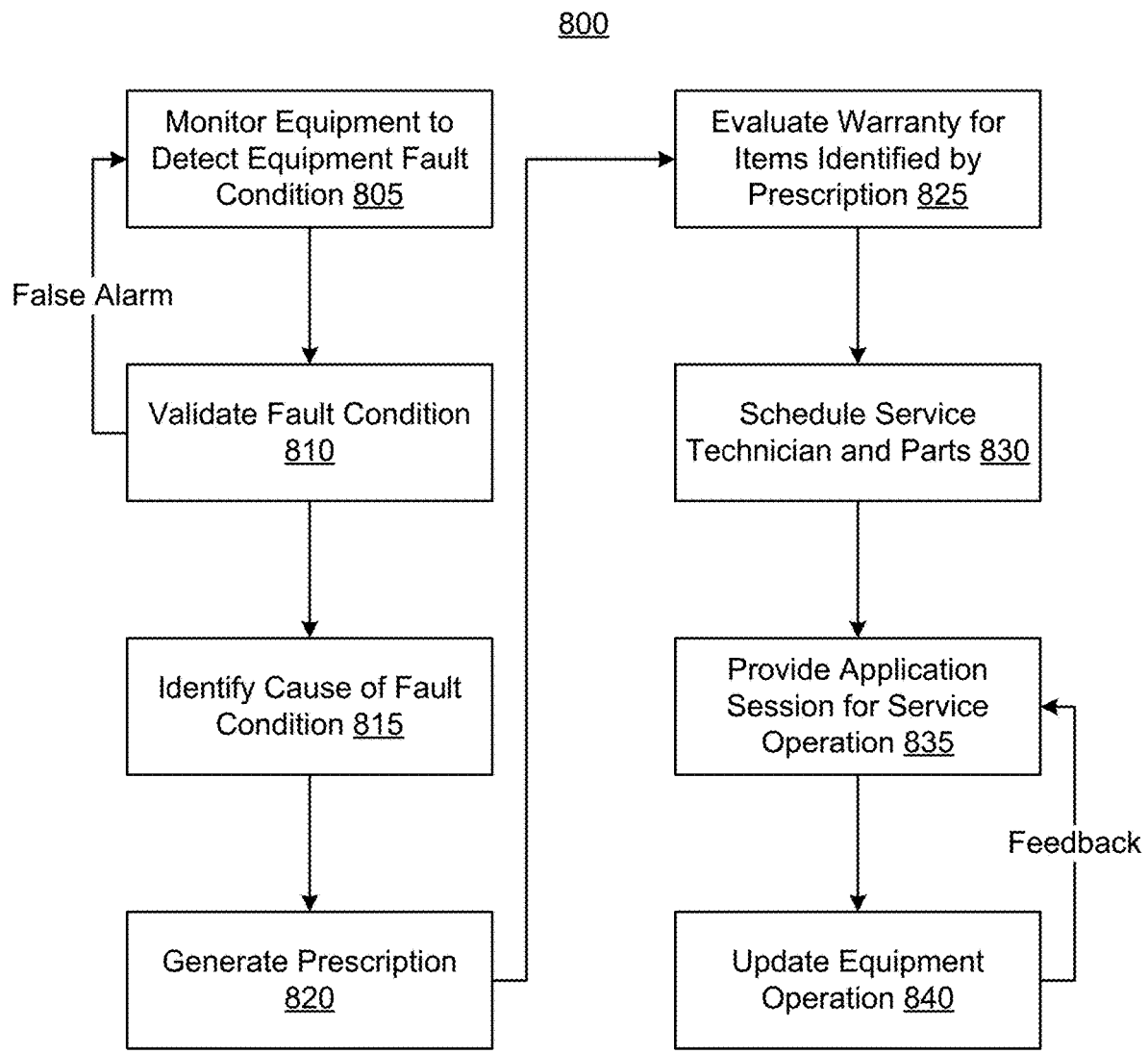
FIG. 8 is a flow diagram of a method of managing equipment servicing responsive to fault detection using machine learning models, according to some embodiments.

Equipment Service Management Responsive to Fault Detection Using Machine Learning Models FIG. 8 depicts an example of a method 800. The method 800 can be performed using various devices and systems described herein, including but not limited to the systems 100, 200 or one or more components thereof. Various aspects of the method 800 can be implemented using one or more devices or systems that are communicatively coupled with one another, including in client-server, cloud-based, or other networked architectures.

At 805, a fault condition of an item of equipment can be detected. The fault condition can be detected responsive to manual and/or automated monitoring of various data sources regarding the item of equipment. In some implementations, the fault condition is detected responsive to an alarm notification from an alarm of the equipment or coupled with the equipment. For example, sensor data of the equipment or from a sensor directed to the equipment can be monitored by the alarm, and evaluated according to one or more alarm conditions (e.g., threshold values) to trigger the alarm notification. The fault condition can be detected responsive to user input indicative of the fault condition, or images or other data received indicative of the fault condition.

At 810, the fault condition can be validated. For example, the fault condition can be validated to determine whether the alarm notification corresponds to a false alarm. In some implementations, the fault condition can be validated by verifying the data used to detect the fault condition at a second point in time (e.g., subsequent to a first point in time at which the fault condition was initially detected), such as by evaluating the one or more alarm conditions using data regarding the equipment at the second point in time; this may include using the same or different data than the data used to initially detect the fault condition to validate the fault condition. The fault condition can be validated by providing the alarm notification to a device of a user, and requesting a confirmation (or indication of false alarm) from the user via the device. Responsive to the fault condition being identified as a false alarm, the equipment can be continued to be monitored.

At 815, a cause of the fault condition can be identified, such as by performing a root cause analysis. In some implementations, the cause is detected using a function that includes one or more algorithms, tables, simulations, or machine learning models described herein. For example, at least one of an identifier of the equipment, the fault condition, user text or speech identifying the fault condition (e.g., notes from any of a variety of entities, such as a facility manager, on-site technician, etc.), or data regarding the equipment used to detect the fault condition can be applied as input to the function to enable the function to determine an indication of a cause of the fault condition. For example, the function can include a table mapping various such inputs to one or more causes of fault conditions. The function can include a machine learning model configured using various forms of data described herein. For example, the machine learning model can include one or more classifiers, language models, or combinations thereof that are trained using data that includes information indicative of fault conditions and associated causes of fault conditions.

At 820, a prescription is generated based on the cause of the fault condition. For example, one or more of the cause of the fault condition, the fault condition, and an identifier of the equipment can be provided to a language model to cause the language model to generate the prescription. The prescription can have a natural language format. The prescription can indicate one or more actions for a service technician to perform to verify, service, and/or repair the fault condition, such as instructions for tools and/or parts to use for the item of equipment. The language model can include any of various models described herein that are configured, using training data representative of prescriptions. The prescription can be generated for presentation using various output modalities, such as text, speech, audio, image, and/or video, including in real-time, conversational, or asynchronous formats.

In some implementations, generating the prescription includes conditioning or guiding the language model to generate the prescription based on a class of at least one of the service technician or the site at which the item of equipment is present. For example, the language model can have its configuration (e.g., training, etc.) modified according to labels of identifiers or classes of technicians, sites, types of equipment, or other characteristics relating to the item of equipment and/or the service technician, which can enable the prescription to be generated in a manner that is more accurate and/or relevant to the service to be performed.

At 825, a warranty is evaluated based on one or more items (e.g., the equipment, parts or tools for servicing the equipment) identified by the prescription. For example, the warranty can be retrieved from various sources, such as a contract database associated with the entity that maintains the site, according to an identifier of the type of equipment, from the service request, or various combinations thereof. The prescription (or the service request) can be parsed to identify one or more items, such as items of equipment, identified by the prescription. For example, the item of equipment for which the service request is generated can be identified from the prescription, and compared with the warranty (e.g., using natural language processing algorithms, etc.) to identify one or more warranty conditions assigned to the item of equipment. The warranty conditions can indicate, for example, timing criteria for authorizing and/or payment for servicing the item of equipment by a vendor or supplier of the item of equipment. Responsive to the warranty conditions being satisfied (e.g., a termination of the warranty not being met), various actions can be performed to trigger servicing of the item of equipment. In some implementations, one or more warranty conditions are evaluated prior to, during, and or subsequent to generation of the prescription, such as to allow the prescription to be generated to incorporate one or more outputs of the evaluation of the warranty (or avoid computational resources for generating the prescription responsive to the warranty conditions not being satisfied).

At 830, scheduling of deployment of at least one of a service technician or one or more parts identified by the prescription can be performed. In some implementations, the prescription can identify the service technician, such as to select the service technician from a plurality of candidate service technicians according to an expertise that the service technician is labeled with and which corresponds to the item of equipment. Scheduling deployment of the one or more parts can including identifying a provider of the one or more parts and assigning the one or more parts to a vehicle (e.g., trucks) for delivering the one or more parts to the site of the item of equipment. By using the language model to generate the prescription-which identifies the one or more parts—the one or more parts that are delivered to the site can be more accurately identified, which can reduce resource usage and/or wasted space or weight on the vehicle. In some implementations, scheduling deployment includes generating a service ticket indicative of the service to be performed, such as to identify the service technician, the parts, and/or the item of equipment.

Depending on the determined prescription, the scheduling can include automated servicing of the item of equipment, such as to provide commands to adjust parameters of the item of equipment to a controller of the item of equipment. The scheduling can include providing instructions for performing remote service, such as to provide instructions to a service technician to use on-site tools and/or parts, or manual adjustment of the item of equipment, to service the item of equipment (e.g., to avoid a truck deployment or truck roll to the site).

At 835, an application session for a service operation corresponding to the service request (and the prescription) can be provided. In some implementations, the application session is provided via a device of the service technician. For example, the device can provide one or more credentials to access the application session (e.g., credentials that uniquely identify the service technician). The application session can present information to the service technician in any of various conversational, messaging, graphical, real-time, and/or asynchronous formats. The application session can receive one or more prompts from the device (e.g., from a user input device of the device), and provide the one or more prompts to the language model to cause the language model to provide corresponding completions responsive to the one or more prompts. For example, the device can receive text or image data (among other formats) as inputs provided by actions of the user (e.g., via an input interface of the device; by the user controlling a camera of the device), and provide the inputs as prompts to the language model. The application session can present the completions via the device to facilitate guiding the service technician through the actions to perform to service the item of equipment. In some implementations, the application session automatically (e.g., responsive to detecting a condition for escalating the guidance to a human expert) or manually (e.g., responsive to user input requesting guidance from a human expert) can establish a communication session between the device and a device of a human expert to provide further guidance to the service technician; the language model can provide various information such as the service request, prescription, and/or communications between the user and the language model via the application session to the device of the human expert, and can label various portions of the communications as potential causes of the escalation. The application session can be implemented as a virtual assistant, such as to provide information such as instruction manuals or technical reports regarding the item of equipment, responsive to requests from the service technician inputted at the device of the service technician.

At 840, operation of the item of equipment can be updated responsive to one or more actions performed by the service technician. For example, various parameters of operation of the item of equipment, such as setpoints, can be updated according to the one or more actions.

In some implementations, information from the service request, prescription, and application session processes can be used to perform analytics regarding entities that maintain sites and items of equipment (e.g., to evaluate customer churn). For example, information including unstructured data (e.g., service reports) regarding items of equipment and entity engagement or disengagement (e.g., deals) can be correlated to identify patterns regarding ways that service can be performed to maintain or increase the likelihood of increasing performance of one or more items of equipment of the entity, completion of deals or of maintaining engagement with the entity.

AI-Based Unstructured Service Data Ingestion

Figure 9:
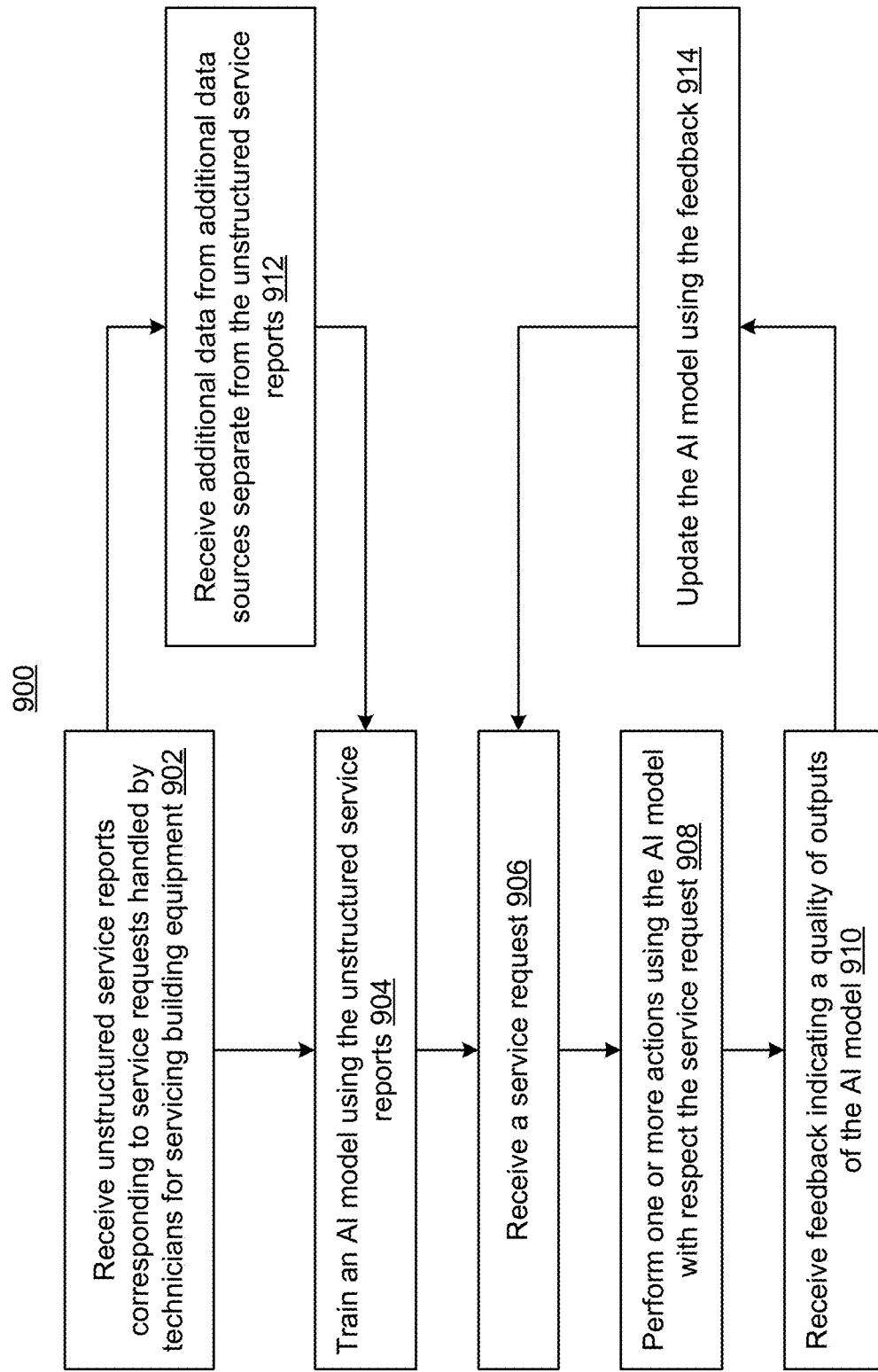
FIG. 9 is a flow diagram of a process for training and using an AI model to ingest unstructured service data, according to some embodiments.
Figure 10:
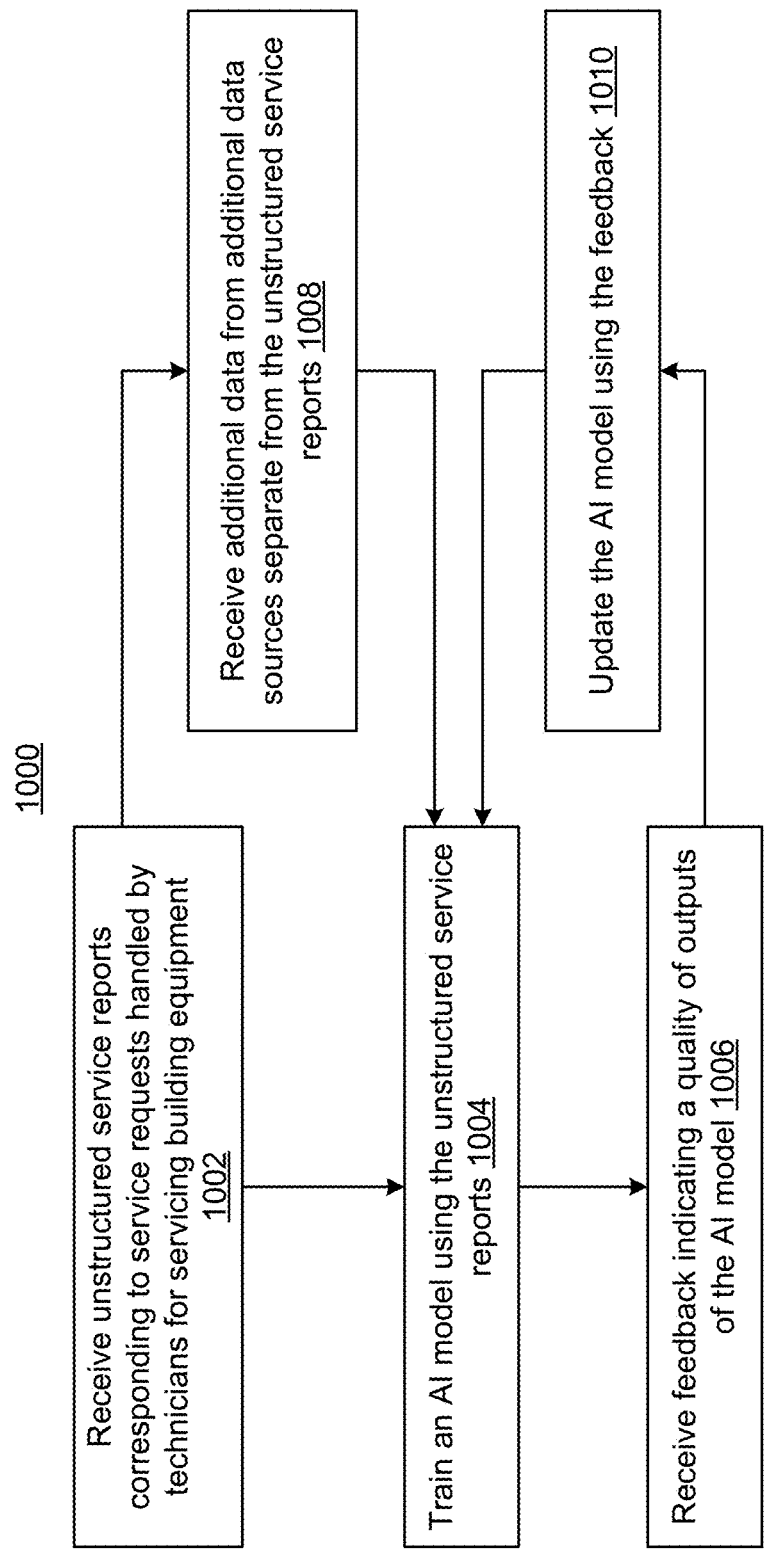
FIG. 10 is a flow diagram of a process for training an AI model using unstructured service reports, according to some embodiments.
Figure 11:
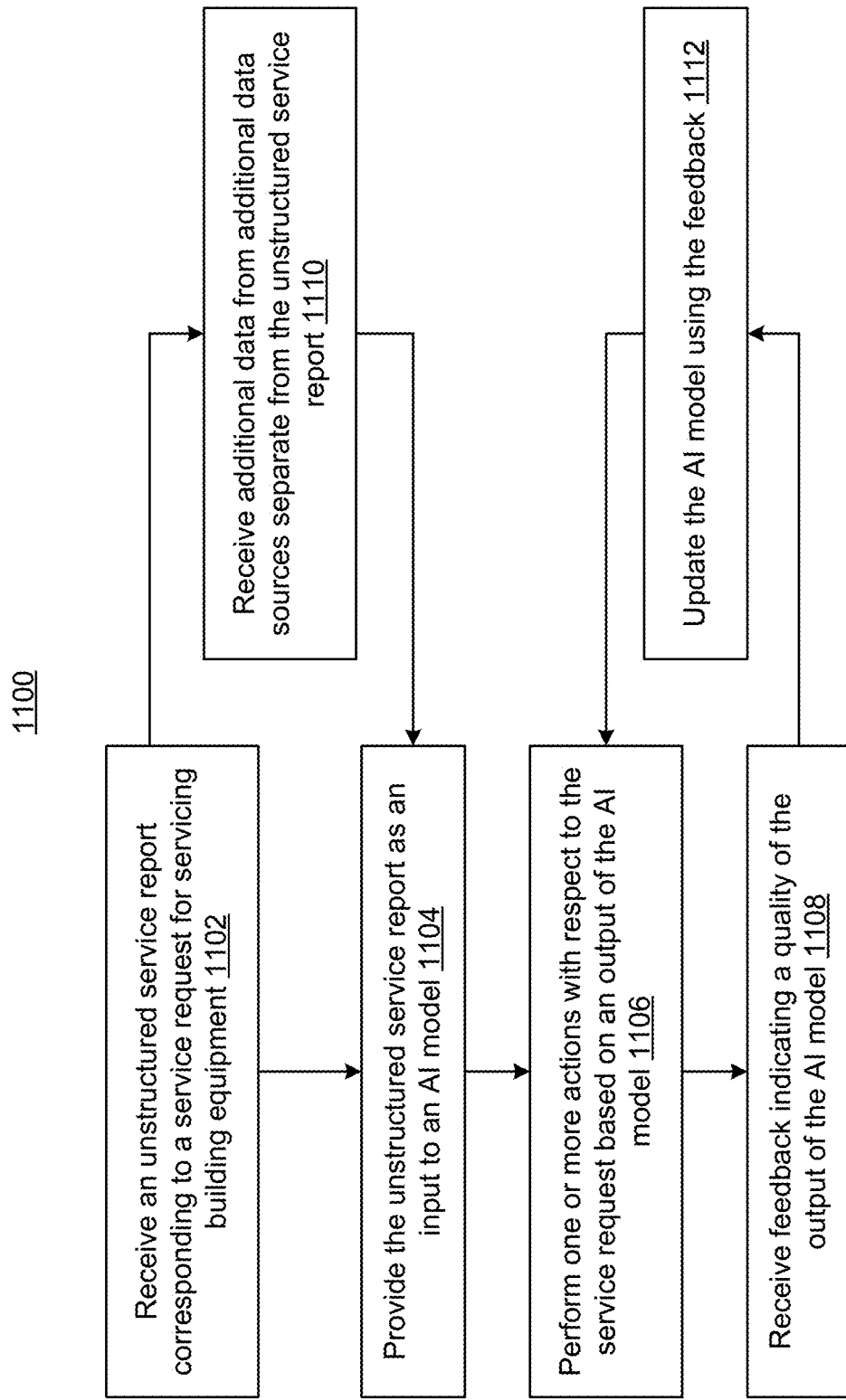
FIG. 11 is a flow diagram of a process for using an AI model to automatically perform one or more actions based on an unstructured service report, according to some embodiments.

Referring now to FIGS. 9-11, processes 900-1100 for performing AI-based unstructured service data ingestion are shown, according to exemplary embodiments. The processes 900-1100 can be performed using various devices and systems described herein, including but not limited to the systems 100, 200 or one or more components thereof. Various aspects of the processes 900-1100 can be implemented using one or more devices or systems that are communicatively coupled with one another, including in client-server, cloud-based, or other networked architectures. In some embodiments, the processes 900-1100 make use of (e.g., train, use, configure, update, etc.) one or more generative AI models to implement and/or execute certain features or steps of the processes. In other embodiments, one or more of the features or steps of the processes 900-1100 may be implemented and/or executed using non-generative AI models or other algorithms, alone or in combination with generative AI models. Accordingly, any references to an AI model in the description of the processes 900-1100 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 900-1100 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Referring specifically to FIG. 9, the process 900 for training and using an AI model to ingest unstructured service data is shown, according to an exemplary embodiment. The process 900 is shown to include receiving unstructured service reports corresponding to service requests handled by technicians for servicing building equipment (step 902). The unstructured service reports may include unstructured data not conforming to a predetermined format or conforming to a plurality of different predetermined formats. In some embodiments, the unstructured data conform to the plurality of different predetermined formats including at least two of a text format, a speech format, an audio format, an image format, a video format, or a data file format. In some embodiments, the predetermined format is a structured data format including one or more predetermined fields or locations and one or more predetermined labels or identifiers characterizing the one or more predetermined fields or locations, whereas the unstructured data may include free-form data not conforming to the structured data format. In some embodiments, the unstructured data include multi-modal data provided by a plurality of different sensory devices comprising at least two of an audio capture device, a video capture device, an image capture device, a text capture device, or a handwriting capture device.

The process 900 is shown to include training an AI model using the unstructured service reports (step 904). The AI model may be the same as or similar to any of the models 104, 116, 268, or any other model described with reference to FIGS. 1-8. The model training in step 904 may include one or more of the model training activities performed by the model updater 108, the feedback trainer 128, the applications 120, the training management system 240, the model system 260, the prompt management system 228, the accuracy checker 316, the feedback system 400, the validation system 600, the expert filter collision system 700, or any other system or component described with reference to FIG. 1-8.

The process 900 is shown to include receiving a service request (step 906). The service request may pertain to the building equipment associated with the unstructured service reports received in step 902 or different building equipment. The service request received in step 906 may be received before or after training the AI model in step 904. In various embodiments, the service request received in step 906 may include one or more of the service requests corresponding to the unstructured service reports received in step 902, or may be a different service request not corresponding to any of the unstructured service reports received in step 902. In some embodiments, step 906 includes receiving another unstructured service report corresponding to the service request received in step 906.

The process 900 is shown to include performing one or more actions using the AI model with respect to the service request received in step 906 (step 908). The actions performed in step 908 can include any of the actions performed by the model updater 108, the feedback trainer 128, the applications 120, the training management system 240, the model system 260, the prompt management system 228, the accuracy checker 316, the feedback system 400, the validation system 600, the expert filter collision system 700, or any other system or component described with reference to FIG. 1-8. The actions performed in step 908 may be performed subsequent to training the AI model in step 904.

In some embodiments, step 908 includes using the trained AI model to identify new correlations and/or patterns between (i) the unstructured data of the unstructured service reports received in step 902 and (ii) additional data from one or more additional data sources. The additional data sources can include any one or more (structured, semi-structured, or unstructured) data from a separate source, time, and/or location as the service reports. In some embodiments, step 908 incudes using the trained AI model to identify new correlations and/or patterns between (i) unstructured data of an unstructured service report corresponding to the service request received in step 906 and (ii) the additional data from the one or more additional data sources. The additional data sources may include any of the data sources 112 described with reference to FIG. 1 and/or any of the additional data sources described with reference to step 912 below. A new correlation and/or pattern can include an association between one or more data elements (e.g., tokens) of the unstructured data and one or more data elements of the additional data sources, where the association is not explicitly present (e.g., prior to the identification) in the unstructured data or the additional data source(s). For example, the AI model (having been trained or otherwise configured using examples of unstructured data elements having associations, such as correlations or patterns, with additional data source data elements), can detect the association between the one or more data elements of the unstructured data and the one or more data elements of the additional data sources, and assign the association to at least one of the associated data elements responsive to the detection. The AI model can detect the association according to any of various factors that may be present in the data elements (e.g., factors that the AI model has been trained to detect according to the examples of data elements having associations with each other), such as associations relating the same (or similar) item of equipment, items of equipment of the same make or model, items of equipment that communicate or operate with one another, items of equipment assigned to the same BMS, items of equipment in the same building, items of equipment that use the same software, firmware, or subcomponents, items of equipment that output analogous alarm codes, or various combinations thereof. The factors can include time-based factors; for example, data elements (from unstructured and additional data source(s)) can be detected to have associations responsive to the data elements being assigned, labeled with, or including the same or similar time stamps. The AI model, having been configured using examples of correlated data elements (and/or examples of data elements that are not correlated) as described herein, can be structured (e.g., have weights and/or biases for how nodes or layers of the AI model processes data) to determine whether data elements meet a threshold amount of similarity to be related in order for the AI model to detect the association between the data elements. In some implementations, responsive to the training, the AI model (e.g., a generative AI model) may be configured to generate or predict new associations between data elements that are not associations, or types of associations, that are previously defined in the underlying data (e.g., based on parameters or characteristics of the data elements having features/aspects that suggest a relationship between the elements, even if that relationship is previously undefined).

In some embodiments, step 908 includes using additional data generated by one or more other models in combination with an output of the trained AI model to select an action to perform. In some embodiments, step 908 includes using an output of the trained AI model as an input to the one or more other models. The one or more other models can be configured to generate additional data based on the output of the trained AI model. The additional data may include any of the data generated by the data sources 112 described with reference to FIG. 1 and/or any of the data generated by the additional data sources described with reference to step 912 below.

The process 900 is shown to include receiving feedback indicating a quality of outputs of the AI model (step 910). In some embodiments, the feedback includes user input from one or more subject matter experts. The user input may include at least one of binary feedback associating the outputs of the AI model with a predetermined binary category, technical feedback indicating whether the outputs of the AI model satisfy technical accuracy or precision criteria, score feedback assigning a score to the outputs of the AI model on a predetermined scale, freeform feedback from the subject matter experts, or any other type of feedback regarding the output of the AI model. In some embodiments, the feedback received in step 910 can be used to update the AI model in step 914. In some embodiments, training the AI model in step 904 includes using the feedback received in step 910 in combination with the unstructured service reports received in step 902 to configure or update the trained AI model.

In some embodiments, the process 900 includes receiving additional data from additional data sources separate from the unstructured service reports (step 912). The additional data from the additional data sources can be used in combination with the unstructured service reports to train the AI model in step 904 and/or update the AI model in step 914. The additional data from the additional data sources can also be used in combination with the outputs of the AI model. In some embodiments, the additional data are generated by one or more additional data sources that use the output of the AI model as an input. For example, the output of the AI model can be provided as an input to a predictive model which makes a prediction based on the output of the AI model. The output of the predictive model can then be fed back into the AI model, used to train the AI model, presented to a user, or used for any other purpose.

In some embodiments, the additional data received in step 912 include at least one of engineering data indicating characteristics of the building equipment, operational data generated during operation of the building equipment, warranty data indicating a warranty and/or warranty status associated with the building equipment, parts data indicating parts usage associated with the building equipment, outcome data indicating outcomes of the service requests, or any other data associated with the building equipment or the service requests. The engineering data may include one or more user manuals, operating guides, engineering drawings, process flow diagrams, or equipment specifications describing the building equipment or operation thereof. The operational data may include one or more of sensor data, logged data, user reports, technician reports, service tickets, work orders, billing records, time sheets, or event data associated with the building equipment. The sensor data may include measurements from one or more sensors configured to measure one or more variable states or conditions affected by the operation of the building equipment or characterizing the operation of the building equipment. The warranty data may include one or more warranty documents or agreements indicating conditions under which one or more entities associated with the building equipment are to repair, replace, or perform a warranted action for the building equipment. The parts data may indicate one or more of parts of the building equipment; tools required to install, repair, or replace the parts; suppliers of the parts; or service providers capable of installing, repairing, or replacing the parts. The outcome data may indicate outcome of the service requests. Training the AI model in step 904 or updating the AI model in step 914 may include using the additional data in combination with the unstructured service reports received in step 902 to configure the AI model and/or correlating one or more portions of the additional data received in step 912 with one or more corresponding portions of the unstructured service reports.

In some embodiments, the additional data include an additional unstructured service report corresponding to an additional service request. In some embodiments, the additional data include structured reports corresponding to the unstructured service reports. The structured reports can be generated using the AI model or by a separate system or device. In some embodiments, training the AI model in step 904 or updating the AI model in step 914 includes using the structured reports and/or the additional unstructured service report in combination with the unstructured service reports received in step 902 to configure or update the AI model.

In some embodiments, receiving the additional data in step 912 includes traversing an ontological model of a building system that includes the building equipment to identify one or more other systems or devices of building equipment, spaces of the building system, or other entities of the building system related to the building equipment. In some embodiments, the ontological model of the building system includes a digital twin of the building system including a plurality of nodes and a plurality of edges. The plurality of nodes may represent the building equipment, the other systems or devices of building equipment, the spaces of the building system, or the other entities of the building system. The plurality of edges may connect the plurality of nodes and may define relationships between the building equipment, the other systems or devices of building equipment, the spaces of the building system, or the other entities of the building system represented by the nodes. Training the AI model in step 904 or updating the AI model in step 914 may include using additional data associated with the identified one or more other items of building equipment, spaces of the building system, or other entities of the building system in combination with the unstructured data of the unstructured service reports to configure the trained AI model.

In some embodiments, step 912 includes identifying one or more similar items of building equipment, buildings, customers, or other entities based on the unstructured service reports. Training the AI model in step 904 or updating the AI model in step 914 may include using additional data associated with the identified one or more similar items of building equipment, buildings, customers, or other entities in combination with the unstructured data of the unstructured service reports to configure the AI model.

In some embodiments, step 912 includes receiving the additional data from one or more other models separate from the AI model. The one or more other models may include at least one of a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment, an air quality model configured to predict air quality in one or more building spaces as a result of the operation of the building equipment, and/or any of the other models or data source described with reference to FIGS. 1-8.

Referring now to FIG. 10, a process 1000 for training an AI model using unstructured service reports is shown, according to an exemplary embodiment. Many of the steps of the process 1000 may be the same as or similar to the steps of the process 900 described with reference to FIG. 9. For example, the process 1000 is shown to include receiving unstructured service reports corresponding to service requests handled by technicians for servicing building equipment (step 1002). Step 1002 may be the same as or similar to step 902 described with reference to FIG. 9. The process 1000 is shown to include training an AI model using the unstructured service reports (step 1004). Step 1004 may be the same as or similar to step 902 described with reference to FIG. 9. The process 1000 is shown to include receiving feedback indicating a quality of outputs of the AI model (step 1006). Step 1006 may be the same as or similar to step 910 described with reference to FIG. 9. The process 1000 is shown to include receiving additional data from additional data sources separate from the unstructured service reports (step 1008). Step 1008 may be the same as or similar to step 912 described with reference to FIG. 9. The process 1000 is shown to include updating the AI model using the feedback (step 1010). Step 1010 may be the same as or similar to step 904 described with reference to FIG. 9.

Referring now to FIG. 11, a process 1100 for using an AI model to automatically perform one or more actions based on an unstructured service report is shown, according to an exemplary embodiment. The process 1100 is shown to include receiving an unstructured service report corresponding to a service request for servicing building equipment (step 1102). In some embodiments, the unstructured service report includes unstructured data not conforming to a predetermined format or conforming to a plurality of different predetermined formats. In some embodiments, the unstructured service report may be the same as or similar to any of the unstructured service reports received in steps 902 and 1002 of the processes 900 and 1000, respectively.

The process 1100 is shown to include providing the unstructured service report as an input to an AI model (step 1104). The AI model used in step 1104 may be the same as or similar to any of the models 104, 116, 268, or any other model described with reference to FIGS. 1-8. In some embodiments, the AI model used in step 1104 is the same as or similar to the AI models trained in step 904 of the process 900 and/or step 1004 of the process 1000.

The process 1100 is shown to include performing one or more actions with respect to the service request based on an output of the AI model (step 1106), receiving feedback indicating a quality of the output of the AI model (step 1108), updating the AI model using the feedback (step 1112), and receiving additional data from additional data sources separate from the unstructured service report (step 1110). Steps 1106, 1108, 1112, and 1110 of the process 1100 may be the same as or similar to the steps 908, 910, 914, and 912 of the process 900, respectively, as described with reference to FIG. 9.

AI-Based Automated Flexible Customer Report Generation

Figure 12:
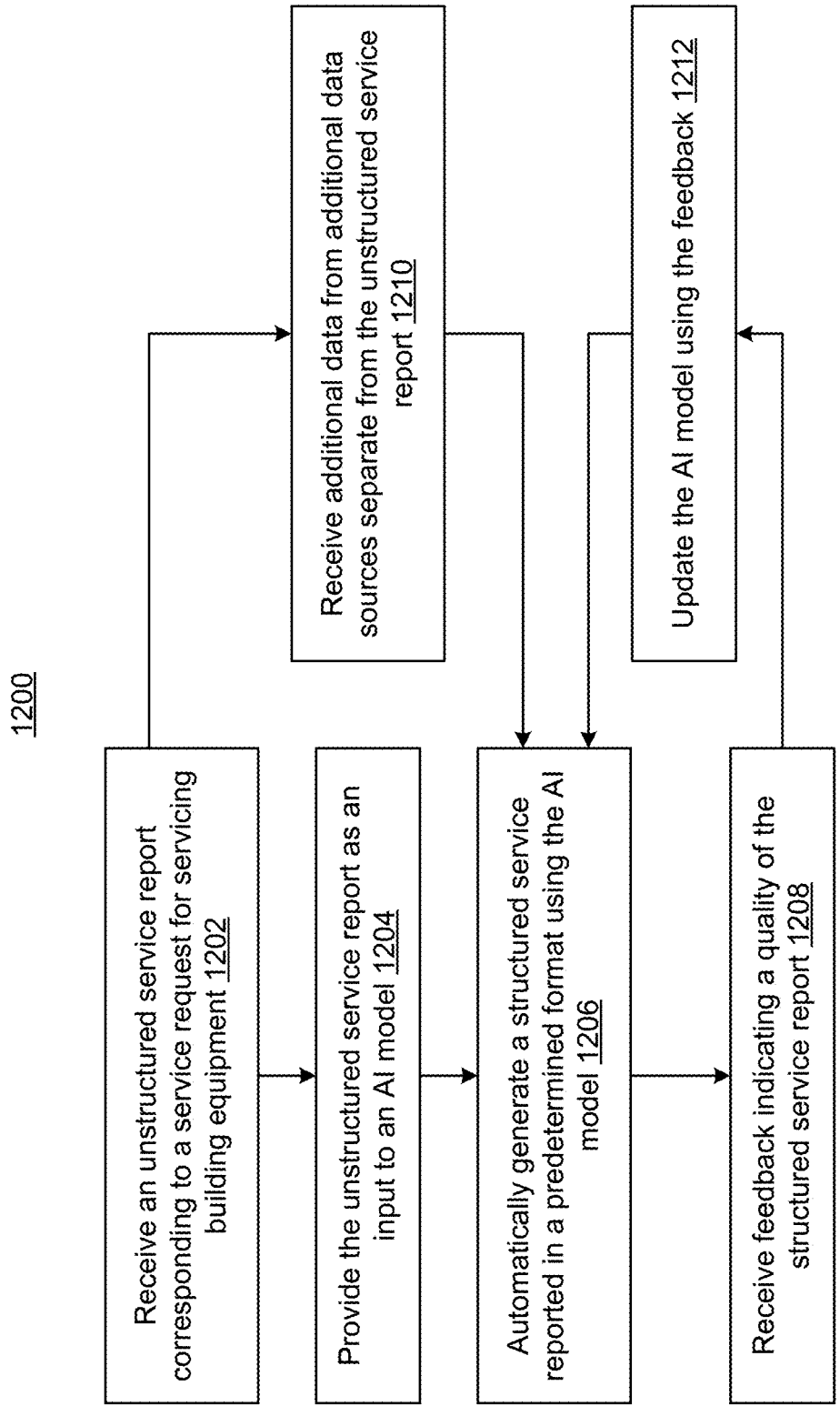
FIG. 12 is a flow diagram of a process for using an AI model to generate a structured service report from an unstructured service report, according to some embodiments.
Figure 13:
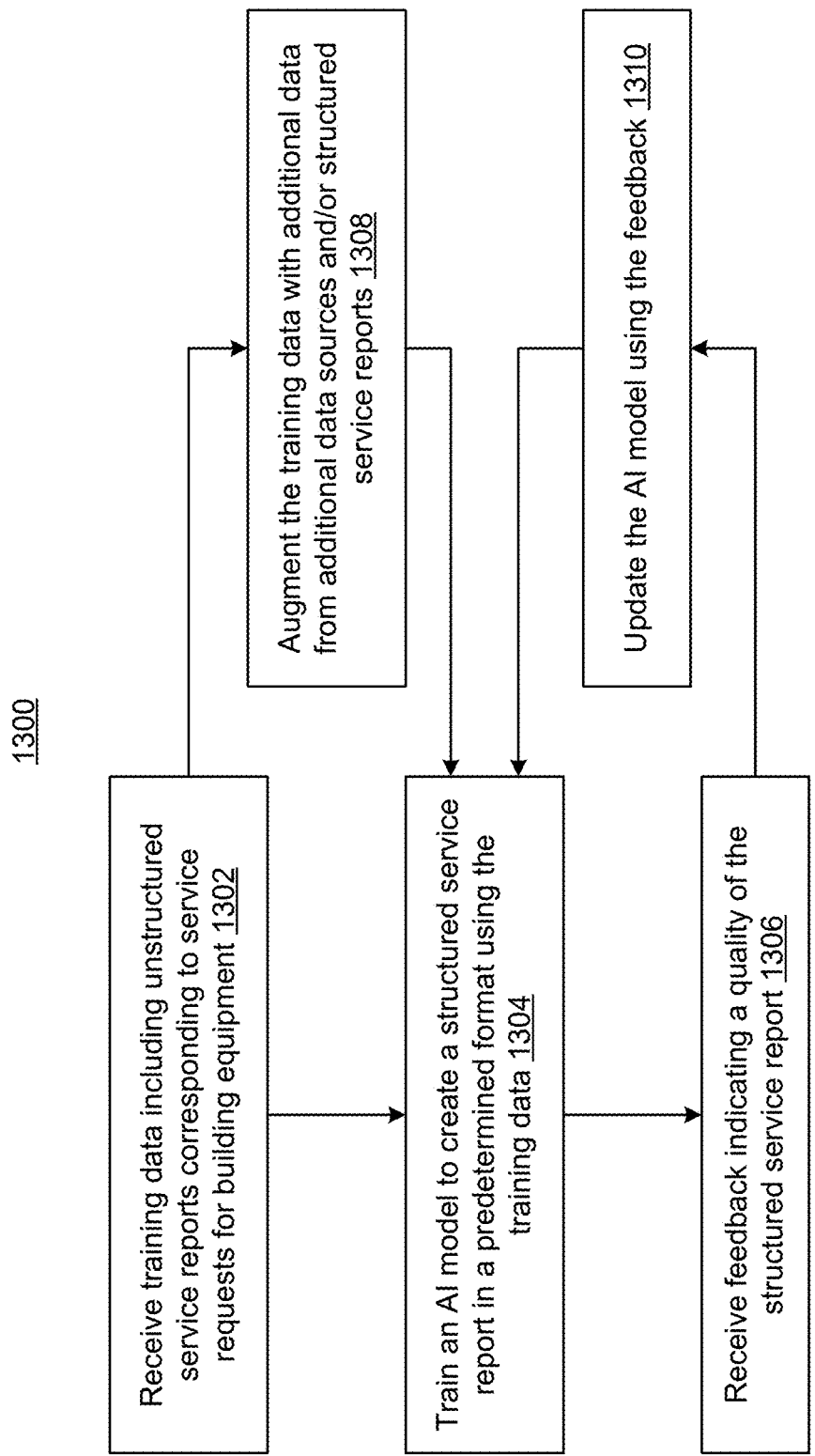
FIG. 13 is a flow diagram of a process for training an AI model to generate structured reports, according to some embodiments.

Referring now to FIGS. 12-13, processes 1200-1300 for performing automated flexible customer report generation are shown, according to exemplary embodiments. The processes 1200-1300 can be performed using various devices and systems described herein, including but not limited to the systems 100, 200 or one or more components thereof. Various aspects of the processes 1200-1300 can be implemented using one or more devices or systems that are communicatively coupled with one another, including in client-server, cloud-based, or other networked architectures. In some embodiments, the processes 1200-1300 make use of (e.g., train, use, configure, update, etc.) one or more generative AI models to implement and/or execute certain features or steps of the processes. In other embodiments, one or more of the features or steps of the processes 1200-1300 may be implemented and/or executed using non-generative AI models or other algorithms, alone or in combination with generative AI models. Accordingly, any references to an AI model in the description of the processes 1200-1300 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 1200-1300 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Referring specifically to FIG. 12, the process 1200 for using an AI model to generate a structured service report from an unstructured service report is shown, according to an exemplary embodiment. The process 1200 is shown to include receiving an unstructured service report corresponding to a service request handled for servicing building equipment (step 1202). In some embodiments, the unstructured service report includes unstructured data not conforming to a predetermined format or conforming to a plurality of different predetermined formats. In some embodiments, the unstructured data conform to a plurality of different predetermined formats including at least two of a text format, a speech format, an audio format, an image format, a video format, or a data file format. In some embodiments, the predetermined format is a structured data format including one or more predetermined fields or locations and one or more predetermined labels or identifiers characterizing the one or more predetermined fields or locations, whereas the unstructured data include freeform data not conforming to the structured data format. In some embodiments, the unstructured data include multi-modal data provided by a plurality of different sensory devices comprising at least two of an audio capture device, a video capture device, an image capture device, a text capture device, or a handwriting capture device. The unstructured service report may be the same as or similar to any of the unstructured service reports described with reference to processes 900, 1000, or 1000.

The process 1200 is shown to include providing the unstructured service report as an input to an AI model (step 1204). The AI model used in step 1204 may be the same as or similar to any of the models 104, 116, 268, or any other model described with reference to FIGS. 1-8. In some embodiments, the AI model used in step 1204 is the same as or similar to any of the AI models trained in step 904 of the process 900, step 1004 of the process 1000, or step 1304 of the process 1300 (described in greater detail below), and/or the AI model used in step 1104 of the process 1100. The AI model used in step 1204 can be trained to convert an unstructured service report into a structured service report, as described with reference to the document writer application 120.

In some embodiments, the process 1200 includes training the AI model using training data including unstructured service reports corresponding to a plurality of service requests handled by technicians for servicing the building equipment. The training data may include data which does not conform to the predetermined format or may conform to a plurality of different predetermined formats. In some embodiments, the training data include one or more structured service reports conforming to the predetermined format and including one or more predefined form sections or fields.

The process 1200 is shown to include automatically generating a structured service report in a predetermined format using the AI model (step 1206). In some embodiments, the structured report is generated for delivery to a customer associated with the building equipment. The structured service report may include additional content generated by the AI model which is not provided within the unstructured service report received in step 1202. In some embodiments, automatically generating the structured service report in step 1206 includes populating one or more predefined form sections or fields with structured data elements generated from the unstructured data of the unstructured service report.

In some embodiments, step 1206 includes cross-referencing metadata associated with two or more unstructured data elements of the unstructured service report to determine whether the two or more unstructured data elements are related. The two or more unstructured data elements may include, for example, at least two of text data, speech data, audio data, image data, video data, or freeform data. In some embodiments, the metadata include timestamps indicating times at which the two or more unstructured data elements are generated and/or location attributes indicating spatial locations in a building or campus at which the two or more unstructured data elements are generated. In some embodiments, determining that the two or more unstructured data elements are related comprises comparing the timestamps and/or the location attributes.

In some embodiments, step 1206 includes generating two or more structured data elements of the structured service report based on the two or more unstructured data element. Step 1206 may include associating the two or more structured data elements with each other in the structured service report in response to determining that the two or more unstructured data elements are related. In some embodiments, associating the two or more structured data elements with each other in the structured service report includes placing the two or more structured data elements in proximity to each other in the structured service report. In some embodiments, associating the two or more structured data elements with each other in the structured service report includes adding a label to a first structured data element of the two or more structured data elements in the structured service report. The label may refer to a second data element of the two or more structured data elements in the structured service report.

In some embodiments, step 1206 includes identifying a customer, a building, or a type of the building equipment associated with the service request. Step 1206 may include selecting a predefined template for the structured service report from a set of multiple predefined templates based on the identified customer, building, or type of the building equipment. Step 1206 may include generating the structured service report to conform to the predefined template. For example, the AI model can retrieve or generate (e.g., by being trained or otherwise configured using examples of reports associated with a given customer, building, and/or type of building equipment) the predefined template according to an identifier of at least one of the customer, the building, or the type of building equipment associated with the service request.

In some embodiments, step 1206 includes standardizing the structured service report to use consistent language, terminology, styles, formatting, or other attributes as other technical documentation associated with a given entity (e.g., equipment manufacturer, equipment supplier, service provider, etc.). The process of standardizing the structured service report is referred to herein as "report standardization." In some embodiments, report standardization is performed by the AI model when generating the initial version of the structured service report in step 1206. In other embodiments, a first version of the structured service report can be generated in step 1206 as previously described and provided as an input to the AI model or a separate AI model which standardizes the structured service report to generate a second version of the structured service report.

In some embodiments, report standardization in step 1206 includes retrieving from the data sources 112 technical documentation such as product manuals, user manuals, installation manuals, instruction manuals, or operating procedure guides for various types of equipment. Step 1206 may include retrieving from the data sources 112 style guides used by technical writers when creating such technical documentation. The style guides may include formatting guidelines (e.g., font guidelines, document formatting guidelines, numbering guidelines, paragraph formatting guidelines, text alignment guidelines, line spacing guidelines, etc.), standard terminology used by a given entity to refer to their products or services, writing guidelines, or other information or documentation used by technical writers to ensure that technical documentation has a consistent style. The style guides may be associated with a given equipment manufacturer, equipment supplier, service provider, or other entity to ensure that written communications and documentation produced by that entity have a consistent style. In some embodiments, step 1206 includes retrieving from the data sources 112 a set of standard terminology for use in describing equipment service issues, faults, solutions, recommended actions, or other language or terms included in service reports.

Report standardization in step 1206 may include modifying the structured service report or unstructured service report to rewrite or replace one or more sentences, phrases, or terms with language that complies with the style guides or is otherwise consistent with the technical documentation retrieved from the data sources 112. Report standardization in step 1206 may include modifying the formatting of the structured service report or unstructured service report to comply with the style guides or otherwise use the same or similar style as the technical documentation retrieved from the data sources 112. Advantageously, report standardization in step 1206 ensures that the structured service report has a consistent or standard style across various service technicians who may use different terminology in their unstructured service reports and ensures that the terminology aligns with other documentation available to the customer such as product manuals, installation instructions, reference materials, etc.

The process 1200 is shown to include receiving feedback indicating a quality of the structured service report (step 1208), updating the AI model using the feedback (step 1212), and receiving additional data from additional data sources separate from the unstructured service report (step 1210). Steps 1208, 1212, and 1210 of the process 1200 may be the same as or similar to the steps 910, 912, and 914 of the process 900, the steps 1006, 1010, and 1008 of the process 1000, and/or the steps 1008, 1012, and 1010 of the process 1100, as described with reference to FIGS. 9-11.

Referring now to FIG. 13, a process 1300 for training an AI model to generate structured reports is shown, according to an exemplary embodiment. The process 1300 can be used to generate and train the AI model used in steps 1204 and 1206 of the process 1200. The process 1300 is shown to include receiving training data including unstructured service reports corresponding to service requests for building equipment (step 1302). The service requests may be handled by technicians for servicing the building equipment. The unstructured service reports may include unstructured data not conforming to a predetermined format or conforming to a plurality of different predetermined formats. In some embodiments, the unstructured service reports are the same as or similar to the unstructured service reports received in step 902 of the process 900, step 1002 of the process 1000, step 1102 of the process 1100, and/or step 1202 of the process 1200.

In some embodiments, the process 1300 includes augmenting the training data with additional data from additional data sources and/or structured service reports (step 1308). The additional data and additional data sources in step 1308 may be the same as or similar to the additional data and data sources used in step 912 of the process 900, step 1008 of the process 1000, step 1110 of the process 1100, and/or step 1210 of the process 1200. The structured service reports used in step 1308 may include reports that conform to the predetermined format (e.g., a customer-specific format or template, an equipment-specific format or template) and may include one or more predefined form sections or fields.

The process 1300 is shown to include training an AI model to create a structured service report in a predetermined format using the training data (step 1304). The structured service report can be generated in the predetermined format for delivery to a customer associated with the building equipment. In some embodiments, the structured service report can be generated by the AI model based on a second unstructured service report not conforming to the predetermined format or conforming to the plurality of different predetermined formats. The structured service report may include additional content generated by the AI model and not provided within the second unstructured service report. In some embodiments, the AI model trained in step 1304 can be configured to populate one or more predefined form sections or fields with structured data elements generated from unstructured data of the second unstructured service report.

In some embodiments, step 1304 includes identifying a customer, a building, or a type of the building equipment associated with each of the unstructured service reports. Step 1304 may include selecting a predefined template for the structured service report from a set of multiple predefined templates based on the identified customer, building, or type of the building equipment. Step 1304 may include training the AI model to generate the structured service report to conform to the predefined template.

The process 1300 is shown to include receiving feedback indicating a quality of the structured service report (step 1306) and updating the AI model using the feedback (step 1310). Steps 1306 and 1310 of the process 1300 may be the same as or similar to the steps 910 and 914 of the process 900, the steps 1006 and 1010 of the process 1000, the steps 1008 and 1012 of the process 1100, and/or the steps 1208 and 1212 of the process 1200, as described with reference to FIGS. 9-12.

AI-Based Coupling of Unstructured Service Data to Other Input/Output Data Sources and Analytics Referring now to FIGS. 14-15, processes 1400-1500 for performing AI-based coupling of unstructured service data to other input and output data sources and analytics are shown, according to exemplary embodiments. The processes 1400-1500 can be performed using various devices and systems described herein, including but not limited to the systems 100, 200 or one or more components thereof. Various aspects of the processes 1400-1500 can be implemented using one or more devices or systems that are communicatively coupled with one another, including in client-server, cloud-based, or other networked architectures. In some embodiments, the processes 1400-1500 make use of (e.g., train, use, configure, update, etc.) one or more generative AI models to implement and/or execute certain features or steps of the processes. In other embodiments, one or more of the features or steps of the processes 1400-1500 may be implemented and/or executed using non-generative AI models or other algorithms, alone or in combination with generative AI models. Accordingly, any references to an AI model in the description of the processes 1400-1500 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 1400-1500 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Referring specifically to FIG. 14, a process 1400 for training an AI model using data gathered from various data sources is shown, according to an exemplary embodiment. The process 1400 is shown to include receiving unstructured service data corresponding to service requests for building equipment (step 1402). The unstructured service data may include any type of information or data associated with servicing building equipment. In various embodiments, the unstructured service data may include service reports generated by technicians in response to service requests for building equipment, the service requests themselves (e.g., from customers or other users associated with the building equipment), input from users provided via one or more user interfaces (e.g., wizards, conversational interfaces, chat interfaces, etc.), work orders, parts orders, or any other information associated with servicing building equipment, including any of the types of service-related information described herein.

The unstructured service data may include unstructured data not conforming to a predetermined format or conforming to a plurality of different predetermined formats. In some embodiments, the unstructured data conform to the plurality of different predetermined formats including at least two of a text format, a speech format, an audio format, an image format, a video format, or a data file format. In some embodiments, the predetermined format is a structured data format including one or more predetermined fields or locations and one or more predetermined labels or identifiers characterizing the one or more predetermined fields or locations, whereas the unstructured data may include free-form data not conforming to the structured data format. In some embodiments, the unstructured data include multi-modal data provided by a plurality of different sensory devices comprising at least two of an audio capture device, a video capture device, an image capture device, a text capture device, or a handwriting capture device.

The process 1400 is shown to include detecting an identifier of the building equipment, a building space, or a customer using the unstructured service data (step 1404). Step 1404 may include parsing or analyzing the unstructured service data using one or more models (e.g., the models 104, 116, 268, or any other model described herein) or other systems or devices to extract any identifiers of building equipment (e.g., particular systems or devices of building equipment, equipment IDs, equipment models, equipment type, equipment manufacturer, etc.), identifiers of one or more buildings (e.g., street address, building name, etc.), building spaces (e.g., floors, rooms, zones, parking lots, rooftops, outdoor areas, etc.), customers (e.g., customer ID, customer name, company name, building occupants, etc.), or any other information that can be used to identify a particular entity in the building system (e.g., building equipment, space, person, data entities, timeseries entities, etc.). In some embodiments, the information obtained in step 1404 identifies a particular entity or node in a graph data structure, a digital twin, an ontological model, a relational model, or other model that includes or defines entities of the building system and relationships between such entities.

In some embodiments, detecting the identifier of the building equipment, the space, or the customer in step 1404 includes processing the unstructured service data using the AI model to identify a particular system or device of the building equipment, a particular space of the building, or a particular customer associated with the unstructured service data. In some embodiments, detecting the identifier of the building equipment, the space, or the customer in step 1404 includes extracting the identifier of the building equipment, the space, or the customer from the unstructured service data using a second model, system, or device separate from the AI model.

The process 1400 is shown to include retrieving additional data associated with the building equipment, the building space, or the customer from additional data sources (step 1406). The additional data sources can include any of the data sources 112 and/or any other data source described herein. The additional data may include additional unstructured data not conforming to a predetermined format or conforming to a plurality of different predetermined formats and/or structured data including one or more predetermined fields or locations and one or more predetermined labels or identifiers characterizing the one or more predetermined fields or locations.

The additional data retrieved in step 1406 may include engineering data indicating characteristics of the building equipment. In some embodiments, the engineering data include one or more user manuals, operating guides, engineering drawings, process flow diagrams, or equipment specifications describing the building equipment or operation thereof. The additional data retrieved in step 1406 may include operational data generated during operation of the building equipment or based on data generated during operation of the building equipment. In some embodiments, the operational data include one or more of timeseries data (e.g., raw data timeseries, derived data timeseries, fault detection timeseries, analytic result timeseries, prediction timeseries, diagnostic timeseries, or model output timeseries), sensor data (e.g., measurements from one or more sensors configured to measure one or more variable states or conditions affected by the operation of the building equipment or characterizing the operation of the building equipment), logged data, user reports, technician reports, service tickets, work orders, billing records, time sheets, or event data associated with the building equipment.

The additional data retrieved in step 1406 may include warranty data indicating a warranty and/or warranty status associated with the building equipment. In some embodiments, the warranty data include one or more warranty documents or agreements indicating conditions under which one or more entities associated with the building equipment are to repair, replace, or perform a warranted action for the building equipment. The additional data retrieved in step 1406 may include parts data indicating parts usage associated with the building equipment. In some embodiments, the parts data indicate one or more of parts of the building equipment; tools required to install, repair, or replace the parts; suppliers of the parts; or service providers capable of installing, repairing, or replacing the parts. The additional data retrieved in step 1406 may include outcome data indicating outcomes of the one or more service requests.

The additional data retrieved in step 1406 may include model output data generated by the model 116, an AI model, or one or more other models separate from the AI model. The one or more other models may include, for example, a thermodynamic model configured to predict one or more thermodynamic properties or states of a building space or fluid flow as a result of operation of the building equipment, an energy model configured to predict consumption or generation of one or more energy resources as a result of the operation of the building equipment, a sustainability model configured to predict one or more sustainability metrics as a result of the operation of the building equipment, an occupant comfort model configured to predict occupant comfort as a result of the operation of the building equipment, an infection risk model configured to predict infection risk in one or more building spaces as a result of the operation of the building equipment; and/or an air quality model configured to predict air quality in one or more building spaces as a result of the operation of the building equipment.

In some embodiments, retrieving the additional data in step 1406 may include traversing an ontological model of a building system including the building equipment to identify one or more other systems or devices of building equipment, spaces of the building system, or other entities of the building system related to the building equipment. Step 1406 may include retrieving additional data associated with the identified one or more other systems or devices of building equipment, spaces of the building system, or other entities of the building system. In some embodiments, the ontological model of the building system includes a digital twin of a building system. The digital twin may include a plurality of nodes representing the building equipment, the other systems or devices of building equipment, the spaces of the building system, or the other entities of the building system. The digital twin may further include a plurality of edges connecting the plurality of nodes and defining relationships between the building equipment, the other systems or devices of building equipment, the spaces of the building system, or the other entities of the building system represented by the nodes.

In some embodiments, retrieving the additional data in step 1406 includes identifying one or more similar items of building equipment (e.g., same or similar model, equipment type, location, function, etc.), buildings (e.g., other buildings owned by the same customer, other buildings in the same campus, other buildings in the same or similar geographic area or location, other buildings having the same weather climate, other buildings of the same purpose or type), customers (e.g., other building owners, similar customers, customers having the same or similar business as the identified customer, etc.), or other entities related to the building equipment (e.g., similar entities defined by a graph database or digital twin, entities having one or more shared attributes with the identified entity, etc.). Step 1406 may include retrieving additional data associated with the identified one or more similar items of building equipment, buildings, customers. The additional data associated with the similar equipment, buildings, or customers may include any of the types of additional data described herein, but pertaining to the similar equipment, building spaces, or customers identified in step 1406 instead of the particular building equipment, spaces, or customers identified in step 1404.

In some embodiments, the additional data retrieved in step 1406 include internet data obtained from one or more internet data sources (e.g., a website, a blog post, a social media source, a calendar, etc.). For example, step 1406 may include identifying websites, social media accounts, or other internet-based sources of information associated with the building, company, customer, building equipment, or other entity identified in step 1402. Step 1406 may include identifying calendars associated with the building equipment (e.g., equipment operating schedules, setpoint schedules, maintenance schedules, etc.), the building or building space (e.g., calendars of events scheduled in the building or the building space including start times, end times, number or identities of attendees, type of event, etc.), individual or group calendars for persons or groups of persons (e.g., building occupants, users of the system, building employees, service personnel, etc.) and pulling event data from the calendars.

In some embodiments, the additional data retrieved in step 1406 include application data obtained from one or more applications installed on one or more user devices. For example, occupants in the building may be provided with a mobile application which can be installed on a smartphone, laptop, tablet, or other mobile device carried by or associated with the occupants. The application data retrieved in step 1406 may include any type of data provided by the users via the mobile application. In some embodiments, the application data include user comfort feedback for one or more building spaces affected by operation of the building equipment. The user comfort feedback may indicate whether the users are comfortable at particular times in particular building spaces, and can be used in the process 1400 to train the AI model.

In some embodiments, retrieving the additional data in step 1406 includes cross-referencing metadata associated with the unstructured service data and the additional data to determine whether the unstructured service data and the additional data are related. Step 1406 may include retrieving the additional data in response to determining that the unstructured service data and the additional data are related. In various embodiments, the metadata may include timestamps indicating times associated with the unstructured service data and the additional data, location attributes indicating spatial locations in a building or campus associated with the unstructured service data and the additional data, or any other metadata that can be associated with the data (e.g., ID of user or device providing the data, data type, data format, etc.). Determining that the unstructured service data and the additional data are related may include comparing the timestamps, the location attributes, or other metadata elements. In some implementations, determining that the unstructured service data and the additional data are related includes determining a relationship metric between the unstructured service data and the additional data (e.g., according to any of various natural language processing, rules-based, heuristic, or machine learning algorithms), comparing the relationship metric to one or more thresholds, assigning an association between the unstructured service data and the additional data responsive to the relationship metric score meeting or exceeding the one or more thresholds, and/or transmitting, to a device associated with a user, a request to validate the relationship between unstructured service data and the additional data (e.g., if the relationship metric meets a first, lower threshold but not a second, higher threshold, where the second, higher threshold can be used to automatically assign the association between the unstructured service data and the additional data without input from a user).

The process 1400 is shown to include training an AI model using the unstructured service data received in step 1402 and the additional data retrieved in step 1406 (step 1408). Step 1408 can be performed by the model updater 108, the feedback trainer 128, or any of the other systems, devices, or components described throughout the present disclosure. Step 1408 may include training the AI model to identify one or more correlations or patterns between the unstructured service data and the additional data. For example, the correlations or patterns may indicate that certain types of building equipment are likely to experience certain types of faults after operating for a specific amount of time after being installed or serviced, or following certain data patterns indicated by the operational data. The correlations or patterns may indicate which types of service activities were successful in resolving the problems indicated by the service data, which types of parts were needed to resolve the problems, which service providers were used to perform the service, etc. The correlations or patterns may indicate predicted effects or consequences of operating the equipment, performing service on the equipment, not performing service on the equipment, or any other actions that can be taken with respect to any of the variables predicted by the other models (e.g., thermodynamic properties, energy use, occupant comfort, etc.). The correlations or patterns may indicate predicted effects of various actions that can be taken on both the building equipment being serviced and any other equipment, spaces, or entities related to the building equipment.

Referring now to FIG. 15, a process 1500 for using an AI model to generate a structured data output using data gathered from various data sources is shown, according to an exemplary embodiment. The process 1500 is shown to include receiving unstructured service data corresponding to service requests for building equipment (step 1502), detecting an identifier of the building equipment, a building space, or a customer using the unstructured service data (step 1504), and retrieving additional data associated with the building equipment, the building space, or the customer from additional data sources (step 1506). Steps 1502-1506 may be the same as or similar to steps 1402-1406 of the process 1400.

The process 1500 is also shown to include generating a structured data output using an AI model based on the unstructured service data and the additional data (step 1506). Step 1506 may include using the AI model trained in the process 1400. Step 1506 may include providing the unstructured service data and the additional data from steps 1502 and 1506 as inputs to the AI model and generating the structured data output as an output of the AI model. In some embodiments, step 1506 includes generating one or more structured data elements using the unstructured service data in combination with the additional data (e.g., the engineering data, the operational data, the sensor data, the timeseries data, the warranty data, the parts data, the outcome data, the model output data, the internet data, the application data, etc.). In various embodiments, the structured data output may include a structured service report as described with reference to FIGS. 12-13, a set of instructions for service technicians to perform service on the building equipment, a recommended action to be taken by a user or customer, a work order or service request, a structured report of the problem associated with the building equipment and likely root causes or solutions, or any other type of information described throughout the present disclosure.

AI-Based Automated Maintenance Service Scheduling and Modification

Figures 16, 17:
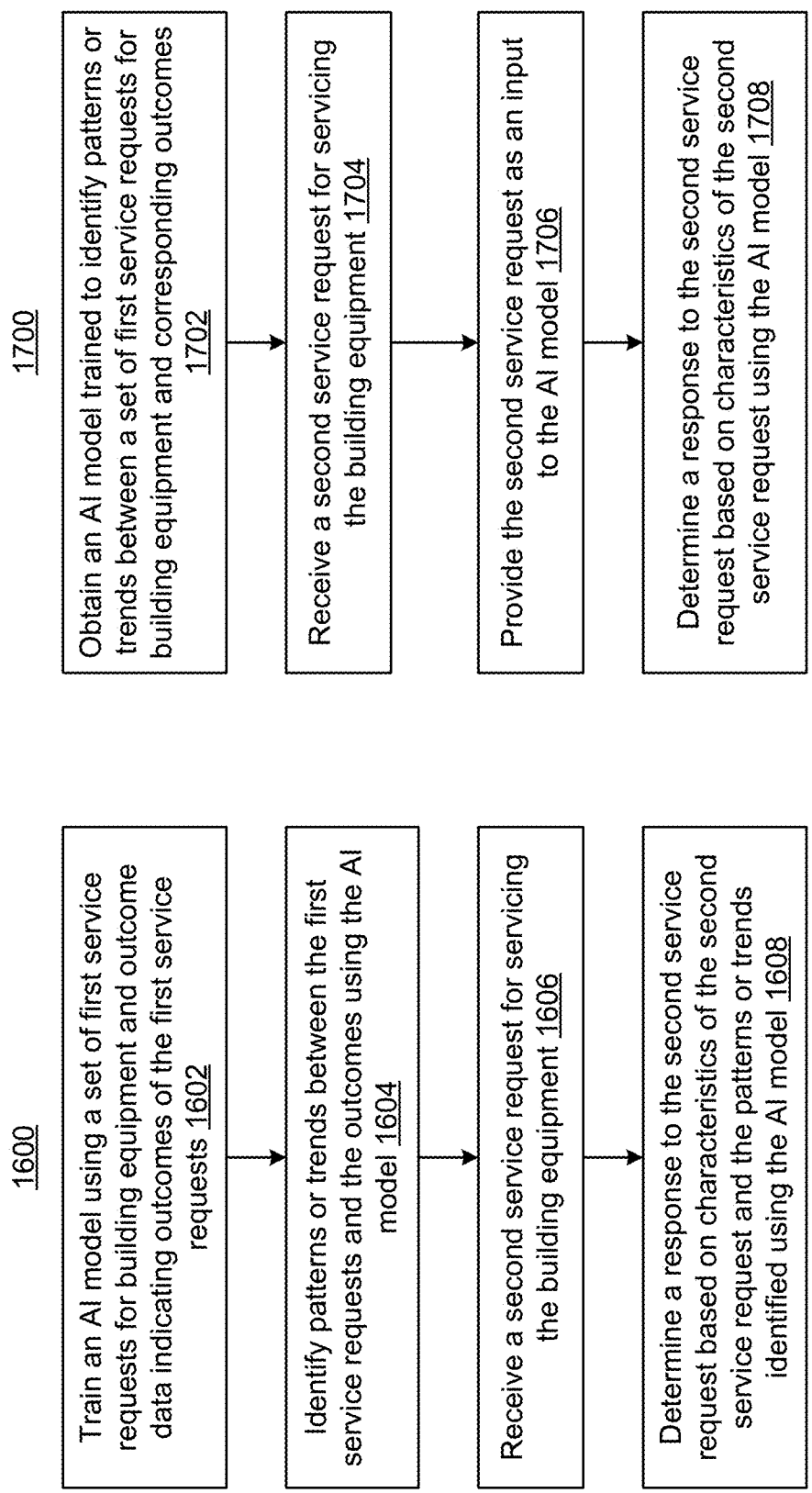
FIG. 16 is a flow diagram of a process for training and using an AI model to automate maintenance service scheduling and modification, according to some embodiments.
FIG. 17 is a flow diagram of a process for using a trained AI model to determine responses to service requests, according to some embodiments.

Referring now to FIGS. 16-17, processes 1600-1700 for performing AI-based automated maintenance service scheduling and modification are shown, according to exemplary embodiments. The processes 1600-1700 can be performed using various devices and systems described herein, including but not limited to the systems 100, 200 or one or more components thereof. Various aspects of the processes 1600-1700 can be implemented using one or more devices or systems that are communicatively coupled with one another, including in client-server, cloud-based, or other networked architectures. In some embodiments, the processes 1600-1700 make use of (e.g., train, use, configure, update, etc.) one or more generative AI models to implement and/or execute certain features or steps of the processes. In other embodiments, one or more of the features or steps of the processes 1600-1700 may be implemented and/or executed using non-generative AI models or other algorithms, alone or in combination with generative AI models. Accordingly, any references to an AI model in the description of the processes 1600-1700 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 1600-1700 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Referring particularly to FIG. 16, a process 1600 for training and using an AI model to automate maintenance service scheduling and modification is shown, according to an exemplary embodiment. The process 1600 is shown to include training an AI model using a set of first service requests for building equipment and outcome data indicating outcomes of the first service requests (step 1602). The service requests can be provided by customers, maintenance personnel, building occupants, or other users associated with the building equipment. The service requests can include input from users provided via one or more user interfaces (e.g., wizards, conversational interfaces, chat interfaces, over the phone, etc.), work orders, parts orders, or any other information associated with servicing building equipment, including any of the types of service-related information described herein. In some embodiments, the service requests are generated automatically by the system 100 or the system 200 in response to detecting a fault associated with the building equipment or in response to predicting that the building equipment will experience a fault in the future if service is not performed.

In some embodiments, the process 1600 includes receiving a set of first unstructured service reports corresponding to the first service requests. The first unstructured service reports may include unstructured data not conforming to a predetermined format or conforming to a plurality of different predetermined formats. Training the AI model in step 1602 may include using the first unstructured service reports in combination with the set of first service requests as training data for the AI model. In some embodiments, the process 1600 includes generating structured service reports corresponding to the first service requests using the AI model. The structured service reports may include structured data having a predetermined format. Training the AI model in step 1602 may include using the structured service reports and/or the first unstructured service reports in combination with the set of first service requests as training data for the AI model.

In some embodiments, training the AI model in step 1602 includes fine-tuning the AI model using customer-specific or entity-specific terminology (e.g., product names or code names, internal terminology, entity-specific software, entity-specific names for building spaces or equipment, acronyms, etc.) and domain knowledge to ensure that the AI model is capable of relating such inputs to the corresponding semantic concepts, devices of equipment, building spaces, or other entities represented by such inputs. In some embodiments, fine-tuning the AI model includes creating training data of potential questions and answers. The training data set can be constructed from a larger data set and condensed into simple questions and answers.

The process 1600 is shown to include identifying patterns or trends between the first service requests and the outcomes of the first service requests using the AI model (step 1604). The patterns or trends may be based on various characteristics of the first service requests such as a type or model of the building equipment, a geographic location of the building equipment or a building associated with the building equipment, a customer associated with the building equipment, a service history of the building equipment, a problem or fault associated with the building equipment, warranty data associated with the building equipment, any of the additional data which can be retrieved using the processes 1400-1500, or any other type of attribute, characteristic, or property of the service requests.

The outcome data may indicate various responses to the first service requests (e.g., whether service was performed, what type of service was performed, etc.) and/or other outcomes of the first service requests. For example, the outcome data may indicate technicians or service providers assigned to the first service requests, locations of the technicians or service providers, types of service activities performed in response to the first service requests, amounts of time required to perform service events for the building equipment responsive the first service requests, service vehicles used to service the building equipment responsive to the first service requests, replacement parts of the building equipment used to service the building equipment responsive to the first service requests, tools used to service the building equipment responsive to the first service requests, whether the service activities performed in response to the first service requests were successful in resolving the problems or faults indicated by first service requests, or any other outcome of the first service requests.

The process 1600 is shown to include receiving a second service request for servicing the building equipment (step 1606). The second service request may be for one or more of the particular devices of equipment corresponding to the first service requests or different building equipment. The second service request may include any or all of the same characteristics or attributes that were included in the first service requests, as described with reference to step 1602. In some embodiments, the second service request and/or the first service requests can be provided via any type of interface or modality including, for example, a phone call, a voice interface, a text interface, a webpage, and/or an application running on a computing device.

The process 1600 is shown to include determining a response to the second service request based on characteristics of the second service request and the patterns or trends identified using the AI model (step 1608). In some embodiments, step 1608 may include assigning a technician to handle the second service request using the AI model. Step 1608 may include selecting a service activity or type of service activity to be performed to address the problem indicated by the second service request. Step 1608 may include assigning a technician to handle the second service request using the AI model based on capabilities of a set of technicians with respect to the types of service activities that could be performed to address the problem. Step 1608 may include scheduling a service activity to handle the second service request using the AI model based on a predicted amount of time required to perform the service activity to handle the second service request. Step 1608 may include scheduling a service vehicle to handle the second service request, provisioning one or more replacement parts to handle the second service request, and/or provisioning one or more tools to handle the second service request using the AI model. Step 1608 may include predicting a root cause of a problem indicated by the second service request and determining a service activity predicted to resolve the root cause of the problem indicated by the second service request.

Referring now to FIG. 17, a process 1700 for using a trained AI model to determine responses to service requests is shown, according to an exemplary embodiment. The process 1700 is shown to include obtaining an AI model trained to identify patterns or trends between a set of first service requests for building equipment and corresponding outcomes (step 1702). The trained AI model obtained in step 1702 may be the same as or similar to the AI model trained by performing the process 1600. The set of first service requests may include any or all of the same types of characteristics described with reference to step 1604, whereas the outcomes may include any or all of the same types of outcome data described with reference to step 1604.

The process 1700 is shown to include receiving a second service request for servicing the building equipment (step 1704). The second service request may be the same as or similar to the second service request received in step 1606 and may be for one or more of the particular devices of equipment corresponding to the first service requests or different building equipment. The second service request may include any or all of the same characteristics or attributes that were included in the first service requests used to train the AI model. In some embodiments, the second service request and/or the first service requests can be provided via any type of interface or modality including, for example, a phone call, a voice interface, a text interface, a webpage, and/or an application running on a computing device.

The process 1700 is shown to include providing the second service request as an input to the AI model (step 1706). In some embodiments, step 1706 includes gathering additional data to supplement the second service request (e.g., by performing step 1406 of the process 1400 or step 1506 of the process 1500) and providing the additional data as additional inputs to the AI model along with the second service request.

The process 1700 is shown to include determining a response to the second service request based on characteristics of the second service request using the AI model (step 1708). In some embodiments the AI model is trained to identify patterns or trends between characteristics of the first service requests and outcome data indicating outcomes of the first service requests, and the response to the second service request is determined based on the patterns or trends identified using the AI model. Step 1708 may be the same as or similar to step 1608 of the process 1600 and may include determining any of the types of responses described with reference to step 1608.

AI-Based Root Cause Prediction

Referring now to FIGS. 18-19, processes 1800-1900 for performing AI-based root cause prediction are shown, according to exemplary embodiments. The processes 1800-1900 can be performed using various devices and systems described herein, including but not limited to the systems 100, 200 or one or more components thereof. Various aspects of the processes 1800-1900 can be implemented using one or more devices or systems that are communicatively coupled with one another, including in client-server, cloud-based, or other networked architectures. In some embodiments, the processes 1800-1900 make use of (e.g., train, use, configure, update, etc.) one or more generative AI models to implement and/or execute certain features or steps of the processes. In other embodiments, one or more of the features or steps of the processes 1800-1900 may be implemented and/or executed using non-generative AI models or other algorithms, alone or in combination with generative AI models. Accordingly, any references to an AI model in the description of the processes 1800-1900 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 1800-1900 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Referring particularly to FIG. 18, a process 1800 for training and using an AI model to perform root cause prediction is shown, according to an exemplary embodiment. The process 1800 is shown to include training an AI model to predict root causes of problems corresponding to a set of first service requests for building equipment (step 1802). The problems corresponding to the set of first service requests can include problems with building equipment (e.g., detected or predicted faults, inefficient operation, performance issues, etc.), building spaces (e.g., temperature or humidity out of range, lighting equipment not functioning properly, etc.), or other entities in a building system. The problems can be identified or indicated in a variety of ways including via service requests from users (e.g., a phone call, a voice interface, a text interface, a webpage, and/or an application running on a computing device), service reports from technicians (e.g., structured or unstructured service reports as previously described), automated or semi-automated fault detection processes (e.g., rule-based fault detection, peer analysis, etc.), predictive maintenance processes (e.g., model predictive maintenance (MPM), reliability or degradation modeling, etc. The problems may include problems that currently exist (e.g., currently detected faults that have not yet been addressed), problems that existed in the past but have since been resolved, problems that do not yet exist but are predicted to exist in the future (e.g., predicted faults, predicted equipment failures, etc.).

In some embodiments, step 1802 includes receiving a set first unstructured service reports corresponding to the set first service requests. The first unstructured service reports may include unstructured data not conforming to a predetermined format or conforming to a plurality of different predetermined formats. Step 1802 may include training the AI model using the first unstructured service reports. In some embodiments, step 1802 includes generating a set of structured service reports corresponding to the first service requests using the AI model. The structured service reports may include structured data having a predetermined format. Step 1802 may include training the AI model using the structured service reports.

In some embodiments, step 1802 includes receiving outcome data indicating outcomes of the first service requests. Step 1802 may include training the AI model to identify one or more patterns or trends between the problems corresponding to the first service requests and the outcome data indicating the outcomes of the first service requests. The outcome data may indicate the root causes of the problems associated with the first service requests, the actions performed to address the root causes or respond to the service requests, or any other type of outcome data described throughout the present disclosure. The root causes can be identified based on service reports, information provided by a user or technician, or can be inferred based on whether a given action or outcome was successful in resolving the problem. For example, if a service action involved replacing a compressor in a chiller and the problem associated with the chiller was resolved, the system 100 or 200 can infer that the compressor was the cause of the problem. In some embodiments, step 1802 includes receiving outcome data indicating whether predicted root causes of the problems were determined to be actual root causes of the problems after performing service on the building equipment in response to the first service requests, and retraining the AI model using the outcome data.

The process 1800 is shown to include identifying patterns or trends between the first service requests and the root causes using the AI model (step 1804). In some embodiments, step 1804 is part of step 1802 and may be accomplished as part of the training process for the AI model. The patterns or trends identified in step 1804 may include any type of correlation, connection, cause, effect, relationship, or any other type of pattern or trend between the information in the first service requests and the root causes. In some embodiments, the patterns or trends may include patterns or trends among the service requests, the root causes, and/or additional data retrieved based on the service requests. The additional data may include any of the additional data from the data sources 112 or any other type of additional data described herein (e.g., the engineering data, the operational data, the sensor data, the timeseries data, the warranty data, the parts data, the outcome data, the model output data, the internet data, the application data, etc.). In some embodiments, step 1806 includes gathering additional data to supplement the first service requests (e.g., by performing step 1406 of the process 1400 or step 1506 of the process 1500) and using the additional data in combination with the service requests and/or the root causes to identify the patterns or trends. In some embodiments, step 1806 includes identifying any of the patterns or trends using any of the techniques described with reference to step 1604 of the process 1600.

The process 1800 is shown to include receiving a second service request for servicing the building equipment (step 1806). The second service request may be for one or more of the particular devices of equipment corresponding to the first service requests or different building equipment. The second service request may include any or all of the same characteristics or attributes that were included in the first service requests, as described with reference to step 1802. In some embodiments, the second service request and/or the first service requests can be provided via any type of interface or modality including, for example, a phone call, a voice interface, a text interface, a webpage, and/or an application running on a computing device.

The process 1800 is shown to include predicting a root cause of a problem corresponding to the second service request based on the patterns or trends identified using the AI model (step 1808). Step 1808 may include predicting one or more root causes of the problem. In some embodiments, step 1808 includes using the additional data (e.g., engineering data, operational data, sensor data, timeseries data, warranty data, parts data, outcome data, model output data, internet data, application data, etc.) in combination with the second service request to predict the root cause of the problem corresponding to the second service request.

In some embodiments, step 1808 includes obtaining one or more diagnostic models configured to predict one or more potential root causes of the problem based on a set of structured data inputs. Step 1808 may include using the AI model to transform unstructured data corresponding to the second service request into the set of structured data inputs and providing the structured data inputs as inputs to the one or more diagnostic models. In some embodiments, step 1808 includes automatically determining one or more responses to the second service request using the AI model, based on the root cause of the problem predicted by the AI model. The responses can be presented to a user for further action and/or automatically initiated or executed by the system 100 or 200 as described herein (e.g., by performing the processes 2200 and 2300 described with reference to FIGS. 22-23).

In some embodiments, the process 1800 includes generating and presenting a user interface that shows the predicted root causes of the problem and/or the potential solutions to resolve the root cause of the problem. The interface may include functional or causal relationships between equipment, spaces, or other entities of the building system. In some embodiments, the user interface allows a user to select (e.g., click) a potential root cause and causes additional information about the selected root cause to be displayed in response to the user selection of the root cause. The additional information may include, for example, equipment/space/entity relationships associated with the root cause, an explanation of how that root cause could be contributing to the problem, potential impacts of addressing the root cause or allowing the root cause to remain unresolved (e.g., changes in energy consumption, cost, equipment downtime, potential failures, occupant comfort, etc.).

Referring now to FIG. 19, a process 1900 for using a trained AI model to predict root causes of problems is shown, according to an exemplary embodiment. The process 1900 is shown to include obtaining an AI model trained to predict root causes of problems corresponding to a set of first service requests for building equipment (step 1902). The AI model can be trained to predict the root causes using a set of training data that includes the set of first service requests, corresponding outcome data, and/or data from any of the data sources 112 or additional data sources as previously described. For example, the set of first service requests may indicate various problems with building equipment (e.g., detected or predicted faults, inefficient operation, performance issues, etc.), building spaces (e.g., temperature or humidity out of range, lighting equipment not functioning properly, etc.), or other entities in a building system. The problems can be identified or indicated in a variety of ways including via service requests from users (e.g., a phone call, a voice interface, a text interface, a webpage, and/or an application running on a computing device), service reports from technicians (e.g., structured or unstructured service reports as previously described), automated or semi-automated fault detection processes (e.g., rule-based fault detection, peer analysis, etc.), predictive maintenance processes (e.g., model predictive maintenance (MPM), reliability or degradation modeling, etc.

In some embodiments, the AI model obtained in step 1902 is trained to correlate or relate the problems associated with the set of first service requests with corresponding outcome data indicating outcomes of the first service requests. For example, the AI model can be trained to identify one or more patterns or trends between the problems corresponding to the first service requests and the outcome data indicating the outcomes of the first service requests. The outcome data may indicate the root causes of the problems associated with the first service requests, the actions performed to address the root causes or respond to the service requests, or any other type of outcome data described throughout the present disclosure. The root causes can be identified based on service reports, information provided by a user or technician, or can be inferred based on whether a given action or outcome was successful in resolving the problem. For example, if a service action involved replacing a compressor in a chiller and the problem associated with the chiller was resolved, the system 100 or 200 can infer that the compressor was the cause of the problem. In some embodiments, the outcome data indicate whether predicted root causes of the problems were determined to be actual root causes of the problems after performing service on the building equipment in response to the first service requests. The AI model can be trained or refined/updated using such outcome data. In some embodiments, the trained AI model obtained in step 1902 may be the same as or similar to the AI model trained by performing the process 1800.

The process 1900 is shown to include receiving a second service request for servicing the building equipment (step 1904). The second service request may be the same as or similar to the second service request received in step 1806 and may be for one or more of the particular devices of equipment corresponding to the first service requests or different building equipment. The second service request may include any or all of the same characteristics or attributes that were included in the first service requests used to train the AI model. In some embodiments, the second service request and/or the first service requests can be provided via any type of interface or modality including, for example, a phone call, a voice interface, a text interface, a webpage, and/or an application running on a computing device.

The process 1900 is shown to include providing the second service request as an input to the AI model (step 1906). In some embodiments, step 1906 includes gathering additional data to supplement the second service request (e.g., by performing step 1406 of the process 1400 or step 1506 of the process 1500) and providing the additional data as additional inputs to the AI model along with the second service request.

The process 1900 is shown to include predicting a root cause of a problem corresponding to the second service request based on the patterns or trends identified using the AI model (step 1908). In some embodiments the AI model is trained to identify patterns or trends between characteristics of the first service requests and outcome data indicating outcomes of the first service requests, and the response to the second service request is determined based on the patterns or trends identified using the AI model. Step 1908 may be the same as or similar to step 1808 of the process 1800 and may include predicting any of the types of root causes described with reference to step 1808, or elsewhere in the present disclosure.

In some embodiments, the process 1900 includes generating and presenting a user interface that shows the predicted root causes of the problem and/or the potential solutions to resolve the root cause of the problem. The interface may include functional or causal relationships between equipment, spaces, or other entities of the building system. In some embodiments, the user interface allows a user to select (e.g., click) a potential root cause and causes additional information about the selected root cause to be displayed in response to the user selection of the root cause. The additional information may include, for example, equipment/space/entity relationships associated with the root cause, an explanation of how that root cause could be contributing to the problem, potential impacts of addressing the root cause or allowing the root cause to remain unresolved (e.g., changes in energy consumption, cost, equipment downtime, potential failures, occupant comfort, etc.).

AI-Based Interactive Service Tool

Figure 21:
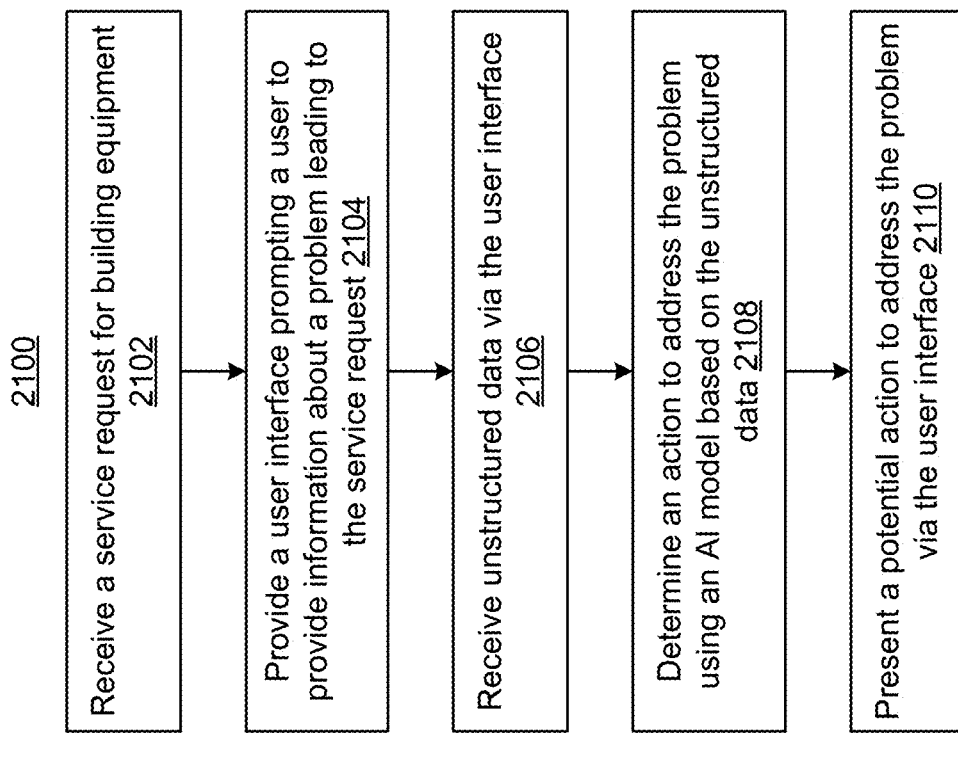
FIG. 21 is a flow diagram of a process for using an AI model to provide an interactive service tool, according to some embodiments.
Figure 20:
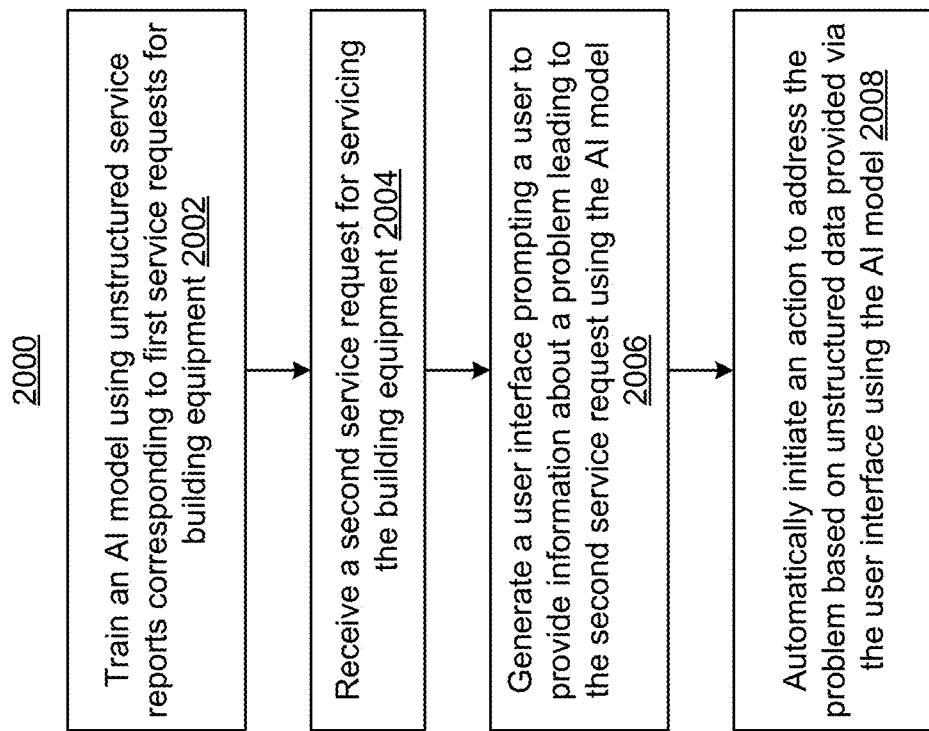
FIG. 20 is a flow diagram of a process for training and using an AI model to provide an interactive service tool, according to some embodiments.

Referring now to FIGS. 20-21, processes 2000-2100 for generating and using an AI-based interactive service tool are shown, according to exemplary embodiments. The processes 2000-2100 can be performed using various devices and systems described herein, including but not limited to the systems 100, 200 or one or more components thereof. Various aspects of the processes 2000-2100 can be implemented using one or more devices or systems that are communicatively coupled with one another, including in client-server, cloud-based, or other networked architectures. In some embodiments, the processes 2000-2100 make use of (e.g., train, use, configure, update, etc.) one or more generative AI models to implement and/or execute certain features or steps of the processes. In other embodiments, one or more of the features or steps of the processes 2000-2100 may be implemented and/or executed using non-generative AI models or other algorithms, alone or in combination with generative AI models. Accordingly, any references to an AI model in the description of the processes 2000-2100 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 2000-2100 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Referring particularly to FIG. 20, a process 2000 for training and using an AI model to provide an interactive service tool is shown, according to an exemplary embodiment. The process 2000 is shown to include training an AI model using unstructured service reports corresponding to first service requests for building equipment (step 2002). The service requests may be handled by technicians for servicing building equipment. The first unstructured service reports may include unstructured data not conforming to a predetermined format or conforming to a plurality of different predetermined formats. In some embodiments, the predetermined format is a structured data format including one or more predetermined fields or locations and one or more predetermined labels or identifiers characterizing the one or more predetermined fields or locations. Step 2002 may include using the AI model to convert the unstructured data into the structured data format by associating unstructured data elements of the unstructured data with the one or more predetermined fields or more predetermined fields or locations. Step 2002 may include training the AI model to identify patterns, correlations, trends, between any of the inputs to the model (e.g., service data, service requests, service reports, additional data from the additional data sources) and any outputs of the model (e.g., predicted root causes, potential resolutions, recommended actions, structured reports, etc.) including any of the model inputs/outputs described throughout the present disclosure.

The process 2000 is shown to include receiving a second service request for servicing the building equipment. The second service request may be for one or more of the particular devices of equipment corresponding to the first service requests or different building equipment. The second service request may include any or all of the same characteristics or attributes that were included in the first service requests. In some embodiments, the second service request and/or the first service requests can be provided via any type of interface or modality including, for example, a phone call, a voice interface, a text interface, a webpage, and/or an application running on a computing device. In some embodiments, the process 2000 includes bookmarking or storing a set of previous service requests, which can be aggregated or organized by user (e.g., by service technician, by building owner, etc.), by type of equipment, or according to any other organization or classification. The bookmarks may allow the user to store and retrieve past service requests and their corresponding outcomes to provide the user with additional information relevant to the current service request (e.g., other service requests pertaining to similar equipment, similar buildings, similar problems or symptoms, etc.) to assist in diagnosing and resolving the current problem.

The process 2000 is shown to include generating a user interface prompting the user to provide information about a problem leading to the second service request using the AI model (step 2004). In some embodiments, the user interface prompts the user to provide the information as unstructured data in a plurality of different formats including at least two of a text format, a speech format, an audio format, an image format, a video format, or a data file format. In some embodiments, the AI model is configured to receive the unstructured data in the plurality of different formats. The AI model may be configured to convert the unstructured data into a structured data format. In some embodiments, the structured data format includes one or more predetermined fields or locations and one or more predetermined labels or identifiers characterizing the one or more predetermined fields or locations. The AI model may be configured to convert the unstructured data into the structured data format by associating unstructured data elements of the unstructured data with the one or more predetermined fields or locations.

In some embodiments, the user interface prompts the user to provide the unstructured data as freeform data not conforming to a structured data format, and the AI model is configured to receive the freeform data as an input. In some embodiments, the user interface includes an unstructured text box prompting the user to describe the problem using unstructured text, and the AI model is configured to receive the unstructured text as an input. In some embodiments, the user interface prompts the user to upload one or more photos, video, or audio associated with the problem or the building equipment, and the AI model is configured to receive the one or more photos, video, or audio associated with the problem or the building equipment as one or more inputs. In some embodiments, the user interface includes a chat interface configured to facilitate conversational interaction with the user. The AI model may be configured to generate a dynamic response to the second service request based on the unstructured data and present the dynamic response to the user via the user interface.

The process 2000 is shown to include automatically initiating an action to address the problem based on unstructured data provided via the user interface using the AI model (step 2008). Step 2008 may include using the AI model to determine one or more potential root causes of the problem based on the unstructured data provided via the user interface (e.g., by performing the processes 1800 or 1900 described with reference to FIGS. 18-19). Step 2008 may include using the AI model to determine one or more potential actions or responses to address the problem based on the one or more potential root causes of the problem (e.g., by performing the processes 1600 or 1700 described with reference to FIGS. 16-17). The one or more potential actions may be determined (e.g., selected, predicted, etc.) as actions that address or resolve the one or more potential root causes. In some embodiments, step 2008 includes determining one or more potential actions to address the problem based on the unstructured data received via the user interface and presenting the one or more potential actions to address the problem via the user interface.

In some embodiments, step 2008 includes determining, using the AI model, one or more potential root causes of the problem based on the unstructured data provided via the user interface. Step 2008 may include identifying, using the AI model, additional information not yet provided by the user that, if provided, would allow the AI model to exclude or confirm one or more of the potential root causes as actual root causes of the problem. For example, the additional information may include user input or other data (e.g., photographs or videos of the equipment or space, a textual description or response from the user, any of the additional data described herein) confirming the existence or non-existence of additional symptoms or other factors that would allow the AI model to confirm a potential root cause as the actual root cause of the problem or determine that a potential root cause is not the actual root cause of the problem. Step 2008 may include comparing, by the AI model, distinguishing features or attributes of the various potential root causes and prompting the user to provide additional information confirming the existence or non-existence of the distinguishing features to allow the AI model to narrow down the set of potential root causes. Step 2008 may include generating, using the AI model, a request for the additional information and presenting the request for the additional information via the user interface.

In some embodiments, step 2008 includes obtaining one or more diagnostic models configured to predict one or more potential root causes of the problem based on a set of structured data inputs. Step 2008 may include using the AI model to transform the unstructured data received via the user interface into the set of structured data inputs and providing the set of structured data inputs as inputs to the one or more diagnostic models. In some embodiments, step 2008 includes receiving a set of structured data outputs from one or more diagnostic models configured to predict one or more potential root causes of the problem based on a set of structured data inputs. Step 2008 may include using the AI model to transform the structured data outputs from the one or more diagnostic models into a natural language response to the second service request and present the natural language response via the user interface. In some embodiments, step 2008 includes obtaining feedback from the user or from the system indicating whether the action was successful in resolving the problem and/or whether the information provided via the interface was helpful in diagnosing the problem or providing service. The feedback can be used in combination with the other types of training data used in step 2002 to configure the AI model (e.g., update, retrain, refine, etc.) in subsequent iterations of the process 2000 and or the process 2100, which may use the trained AI model generated by performing the process 2000.

Referring now to FIG. 21, a process 2100 for using an AI model to provide an interactive service tool is shown, according to an exemplary embodiment. The process 2100 is shown to include receiving a service request for building equipment (step 2102). The second service request may include any or all of the characteristics or attributes of the service requests described throughout the present disclosure. In some embodiments, the service request can be provided via any type of interface or modality including, for example, a phone call, a voice interface, a text interface, a webpage, and/or an application running on a computing device. In some embodiments, the service request is provided via an interactive user interface (e.g., a chat interface, a conversational interaction interface, a dynamic wizard, etc.) that allows a user to interact with an AI model. An example of such an interface shown in FIG. 26 and described with reference to step 2006 of the process 2000.

The process 2100 is shown to include providing a user interface prompting a user to provide information about a problem leading to the service request (step 2104) and receiving unstructured data via the user interface (step 2106). The user interface provided in step 2104 may be the same as or similar to the user interface described with reference to step 2006 of the process 2000. The user interface may include any or all of the features of the user interface shown in FIG. 26. The unstructured data received via the user interface may include any of the types of data described with reference to step 2006 of the process 2000 (e.g., text data, speech data, audio data, image data, video data, freeform data, etc.).

The process 2100 is shown to include determining an action to address the problem using the AI model based on the unstructured data (step 2108). Step 2108 may include using the AI model to determine one or more potential root causes of the problem based on the unstructured data provided via the user interface (e.g., by performing the processes 1800 or 1900 described with reference to FIGS. 18-19). Step 2108 may include using the AI model to determine one or more potential actions or responses to address the problem based on the one or more potential root causes of the problem (e.g., by performing the processes 1600 or 1700 described with reference to FIGS. 16-17). The one or more potential actions may be determined (e.g., selected, predicted, etc.) as actions that address or resolve the one or more potential root causes.

In some embodiments, step 2108 includes determining, using the AI model, one or more potential root causes of the problem based on the unstructured data provided via the user interface. Step 2108 may include identifying, using the AI model, additional information not yet provided by the user that, if provided, would allow the AI model to exclude or confirm one or more of the potential root causes as actual root causes of the problem. For example, the additional information may include user input or other data (e.g., photographs or videos of the equipment or space, a textual description or response from the user, any of the additional data described herein) confirming the existence or non-existence of additional symptoms or other factors that would allow the AI model to confirm a potential root cause as the actual root cause of the problem or determine that a potential root cause is not the actual root cause of the problem. Step 2108 may include comparing, by the AI model, distinguishing features or attributes of the various potential root causes and prompting the user to provide additional information confirming the existence or non-existence of the distinguishing features to allow the AI model to narrow down the set of potential root causes. Step 2108 may include generating, using the AI model, a request for the additional information and presenting the request for the additional information via the user interface.

The process 2100 is shown to include presenting a potential action to address the problem via the user interface (step 2110). The potential action to address the problem can be determined using step 2108 and may be based on the additional data provided by the user in response to the prompts or other information presented via the user interface. In some embodiments, step 2110 includes obtaining one or more diagnostic models configured to predict one or more potential root causes of the problem based on a set of structured data inputs. Step 2110 may include using the AI model to transform the unstructured data received via the user interface into the set of structured data inputs and providing the set of structured data inputs as inputs to the one or more diagnostic models. In some embodiments, step 2110 includes receiving a set of structured data outputs from one or more diagnostic models configured to predict one or more potential root causes of the problem based on a set of structured data inputs. Step 2110 may include using the AI model to transform the structured data outputs from the one or more diagnostic models into a natural language response to the second service request and present the natural language response via the user interface.

AI-Based Automated Intervention

Referring now to FIGS. 22-23, processes 2200-2300 for performing AI-based automated interventions are shown, according to exemplary embodiments. The processes 2200-2300 can be performed using various devices and systems described herein, including but not limited to the systems 100, 200 or one or more components thereof. Various aspects of the processes 2200-2300 can be implemented using one or more devices or systems that are communicatively coupled with one another, including in client-server, cloud-based, or other networked architectures. In some embodiments, the processes 2200-2300 make use of (e.g., train, use, configure, update, etc.) one or more generative AI models to implement and/or execute certain features or steps of the processes. In other embodiments, one or more of the features or steps of the processes 2200-2300 may be implemented and/or executed using non-generative AI models or other algorithms, alone or in combination with generative AI models. Accordingly, any references to an AI model in the description of the processes 2200-2300 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 2200-2300 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI). Various operations described herein as being performed automatically can include operations that can be triggered responsive to one or more conditions being determined (e.g., by the AI models or other computational or programmatic devices) to be satisfied (e.g., without physical or manual user inputs and/or responsive to receiving such inputs as part of a programmatic sequence of operations), in the process 2200-2300 and/or any other processes or systems described throughout the present disclosure.

Referring particularly to FIG. 22, a process 2200 for training and using an AI model to automatically initiate actions or interventions to address problems with building equipment is shown, according to an exemplary embodiment. The process 2200 is shown to include training an AI model using training data including a set of first service requests indicating first problems associated with building equipment and first actions performed in response to the first service requests (step 2202). In some embodiments, step 2202 include receiving outcome data indicating outcomes of the first actions performed in response to the first service requests. The outcomes may indicate whether the first actions were successful in resolving the first problems. Step 2202 may include training the AI model to identify one or more patterns or trends between the first problems corresponding to the first service requests and the outcome data indicating the outcomes of the first actions.

In some embodiments, training the AI model in step 2202 includes receiving a set of first unstructured service reports corresponding to the first service requests. The first unstructured service reports may include unstructured data not conforming to a predetermined format or conforming to a plurality of different predetermined formats. Step 2202 may include training the AI model using the plurality of first unstructured service reports. In some embodiments, training the AI model in step 2202 includes generating a set of structured service reports corresponding to the first service requests using the AI model. The structured service reports may include structured data having a predetermined format. Step 2202 may include training the AI model using the structured service reports.

Step 2202 may include training the AI model using any of a variety of training data. For example, the training data may indicate technicians assigned to the first service requests, types of service activities required to handle the first service requests, amounts of time required to perform one or more service events for the building equipment responsive the first service requests, service vehicles used to service the building equipment responsive to the first service requests, replacement parts of the building equipment used to service the building equipment responsive to the first service requests, tools used to service the building equipment responsive to the first service requests, whether service activities performed in response to the first service requests were successful in resolving problems or faults indicated by the first service requests, and/or any combination of additional data or outcome data described herein.

The process 2200 is shown to include receiving a second service request indicating a second problem associated with building equipment (step 2204). The second service request may be for one or more of the particular devices of equipment corresponding to the first service requests or different building equipment. The second service request may include any or all of the same characteristics or attributes that were included in the first service requests. In some embodiments, the second service request and/or the first service requests can be provided via any type of interface or modality including, for example, a phone call, a voice interface, a text interface, a webpage, and/or an application running on a computing device.

The process 2200 is shown to include determining a second action to perform based on characteristics of the second service request using the AI model (step 2206). The characteristics of the second service request can include, for example, a type or model of the building equipment, a geographic location of the building equipment or a building associated with the building equipment, a customer associated with the building equipment, a service history of the building equipment, a problem or fault associated with the building equipment, warranty data associated with the building equipment, any of the additional data which can be retrieved using the processes 1400-1500, or any other type of attribute, characteristic, or property of the service requests.

Step 2206 may include predicting a root cause of the second problem corresponding to the second service request using the AI model. The root cause can be predicted based on the characteristics of the second service request and one or more patterns or trends identified from the plurality of first service requests using the AI model, as described with reference to FIGS. 18-19. Step 2206 may include automatically determining the second action to perform by determining an action predicted to resolve the root cause of the second problem using the AI model.

The process 2200 is shown to include automatically initiating the second action to address the second problem (step 2208). Step 2206 may include automatically initiating any of a variety of actions in response to the second service request. The actions may include any of the predicted resolutions to address the problem associated with the second service request or the root cause thereof. For example, the action initiated in step 2208 may include automatically creating a service ticket or work order, including parameters of the service ticket or work order, to address the second problem associated with the building equipment.

The action initiated in step 2208 may include automatically generating one or more control signals and transmitting the one or more control signals to the building equipment to adjust an operation of the building equipment to address the second problem associated with the building equipment. The action initiated in step 2208 may include automatically generating one or more control signals and transmitting the one or more control signals to other building equipment, the control signals causing the other building equipment to compensate for the second problem associated with the building equipment. The action initiated in step 2208 may include automatically initiating a diagnostic test of the building equipment or other building equipment to test a root cause of the second problem predicted by the AI model.

In various embodiments, the automated action initiated in step 2208 may include any or all of assigning a technician to handle the second service request using the AI model, assigning a technician to handle the second service request using the AI model based on capabilities of one or more technicians with respect to various types of service activities, scheduling a service activity to handle the second service request using the AI model based on a predicted amount of time required to perform the service activity to handle the second service request, scheduling a service vehicle to handle the second service request using the AI model, provisioning one or more replacement parts to handle the second service request using the AI model, and/or provisioning one or more tools to handle the second service request using the AI model.

In some embodiments, step 2208 includes generating a user interface including an indication of the second actions performed to address the second problem associated with the building equipment. The user interface may include an indication of the automated action or actions performed, tests run to test the predicted root cause of the problem, or other information informing the user of the particular actions taken to address the problem. The user interface may indicate a benefit gained by automatically initiating the action (e.g., saved X units of energy, saved Y dollars in energy cost, reduced carbon emissions by Z units, extended equipment life by X months, etc.) or a problem or fault avoided by automatically initiating the action (e.g., reduced compressor degradation by X %, increased device reliability by Y %, etc.).

Referring now to FIG. 23, a process 2300 for using an AI model to automatically initiate actions to address problems associated with building equipment is shown, according to an exemplary embodiment. The process 2300 is shown to include obtaining an AI model trained using a set of first service requests indicating first problems associated with building equipment and first actions performed in response to the first service requests (step 2302). The AI model obtained in step 2302 may be the same as or similar to the AI model trained by performing the process 2200.

The process 2300 is shown to include receiving a second service request indicating a second problem associated with building equipment (step 2304), determining a second action to perform based on characteristics of the second service request using the AI model (step 2306), and automatically initiating the second action to address the second problem (step 2308). Steps 2304, 2306, and 2308 of the process 2300 may be the same as or similar to steps 2204, 2206, and 2208 of the process 2200, as described with reference to FIG. 22.

AI-Based Predictive Maintenance

Figures 24, 25:
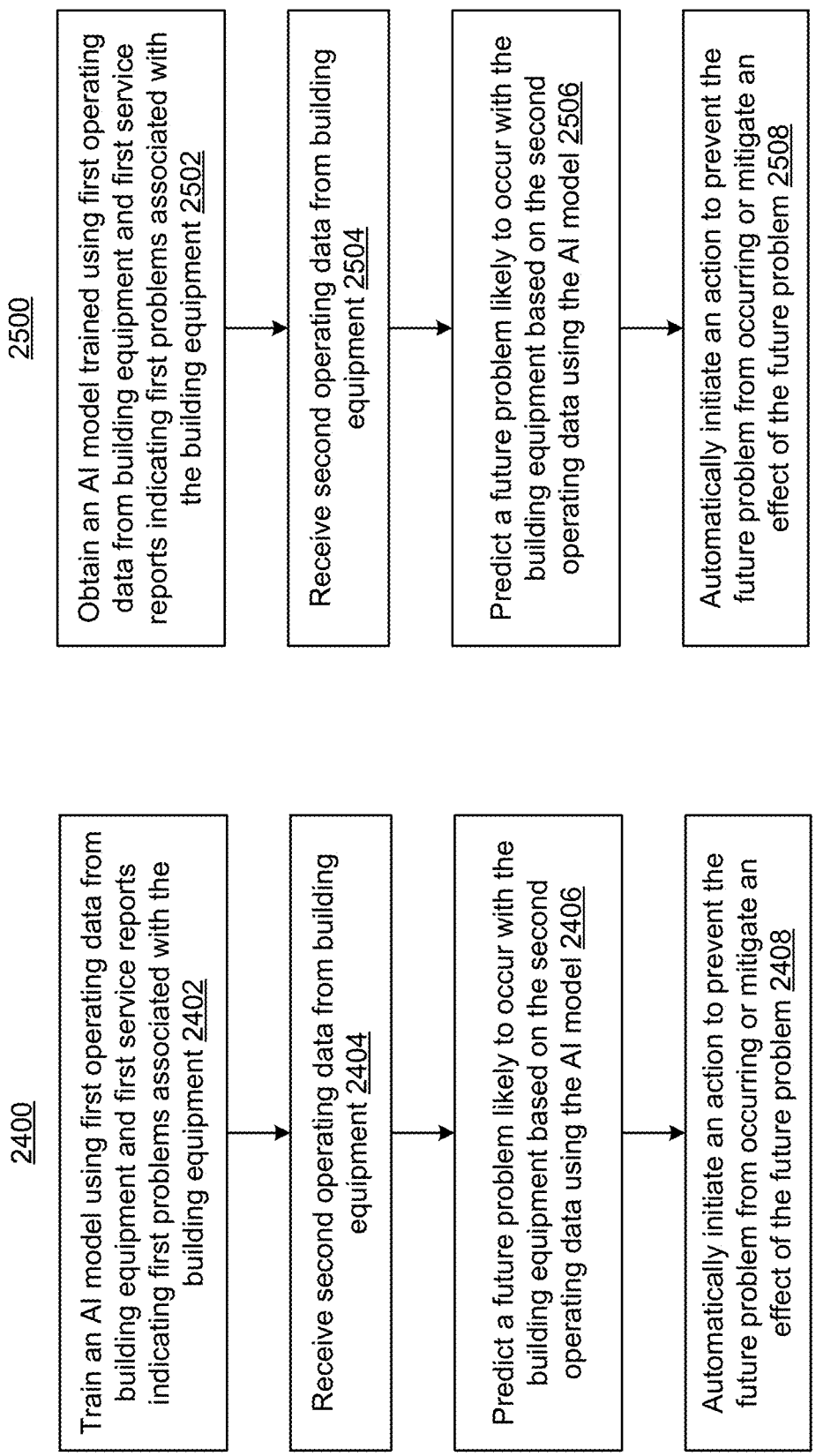
FIG. 24 is a flow diagram of a process for training and using an AI model to automatically initiate actions to prevent future problems from occurring or mitigate an effect of future problems, according to some embodiments.
FIG. 25 is a flow diagram of a process for using a trained AI model to predict future problems and automatically initiate actions to prevent the future problems from occurring or mitigate an effect of the future problems, according to some embodiments.

Referring now to FIGS. 24-25, processes 2400-2500 for performing AI-based predictive maintenance are shown, according to exemplary embodiments. The processes 2400-2500 can be performed using various devices and systems described herein, including but not limited to the systems 100, 200 or one or more components thereof. Various aspects of the processes 2400-2500 can be implemented using one or more devices or systems that are communicatively coupled with one another, including in client-server, cloud-based, or other networked architectures. In some embodiments, the processes 2400-2500 make use of (e.g., train, use, configure, update, etc.) one or more generative AI models to implement and/or execute certain features or steps of the processes. In other embodiments, one or more of the features or steps of the processes 2400-2500 may be implemented and/or executed using non-generative AI models or other algorithms, alone or in combination with generative AI models. Accordingly, any references to an AI model in the description of the processes 2400-2500 should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models trained/used in the processes 2400-2500 can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Referring particularly to FIG. 24, a process 2400 for training and using an AI model to automatically initiate actions to prevent future problems from occurring or mitigate an effect of the future problem is shown, according to an exemplary embodiment. The process 2400 is shown to include training an AI model using first operating data from building equipment and first service reports indicating first problems associated with the building equipment (step 2402). The operating data may include operational data generated during operation of the building equipment or based on data generated during operation of the building equipment. The operational data may include, for example, timeseries data, sensor data, logged data, user reports, technician reports, service tickets, work orders, billing records, time sheets, and/or event data associated with the building equipment. The sensor data may include measurements from one or more sensors configured to measure one or more variable states or conditions affected by the operation of the building equipment or characterizing the operation of the building equipment. The timeseries data may include one or more raw data timeseries, derived data timeseries, fault detection timeseries, analytic result timeseries, prediction timeseries, diagnostic timeseries, or model output timeseries.

The first service reports may include any of the structured or unstructured service reports generated by technicians, by users, by the AI model, or by any other system or device. The first service reports may include unstructured data not conforming to a predetermined format or conforming to a plurality of different predetermined formats. In some embodiments, the first service reports include service requests or other types of service-related data. The service requests can be provided by customers, maintenance personnel, building occupants, or other users associated with the building equipment. The service requests can include input from users provided via one or more user interfaces (e.g., wizards, conversational interfaces, chat interfaces, over the phone, etc.), work orders, parts orders, or any other information associated with servicing building equipment, including any of the types of service-related information described herein. In some embodiments, the service requests are generated automatically by the system 100 or the system 200 in response to detecting a fault associated with the building equipment or in response to predicting that the building equipment will experience a fault in the future if service is not performed. In some embodiments, training the AI model in step 2402 includes training the AI model to identify one or more patterns or trends between the first operating data from the building equipment and the first problems associated with the building equipment.

The process 2400 is shown to include receiving second operating data from the building equipment (step 2404). The second operating data may include any of the types of operating data described with reference to step 2402. The second operating data may be associated with the same building equipment (or a subset thereof) from which the operating data is received in step 2404 or different building equipment.

The process 2400 is shown to include predicting a future problem likely to occur with the building equipment based on the second operating data using the AI model (step 2406). The future problem may include, for example, problems that do not yet exist but are predicted to exist in the future (e.g., predicted faults, predicted equipment failures, predicted equipment degradation, predicted increases to energy consumption or carbon emissions, predicted increases to operating cost, predicted future risk of equipment failures or reliability, etc.) based on the operating data. In various embodiments, the future problem may include at least one of a fault associated with operation of the building equipment, a failure of the building equipment or one or more parts thereof, increased degradation of the building equipment, increased energy consumption of the building equipment, increased carbon emissions associated with operation of the building equipment, or decreased efficiency of the building equipment.

Predicting the future problem in step 2406 may include using the patterns or trends identified by the AI model to predict the future problems based on the second operating data from the building equipment. Step 2406 may include predicting that a fault will occur in the building equipment at a future time or predicting that the building equipment or a part of the building equipment will fail at future time. Step 2406 may include predicting that the building equipment will operate at decreased efficiency at a future time due to equipment degradation predicted to occur prior to the future time. In some embodiments, step 2406 includes predicting that a current control strategy for the building equipment will cause the future problem to occur.

Step 2406 may include predicting that a first set of currently installed building equipment will operate at decreased efficiency relative to a second set of the building equipment which includes at least one device of building equipment not currently installed. In some embodiments, step 2406 includes predicting a root cause of the future problem using the AI model based on the second operating data from the building equipment. In some embodiments, step 2406 includes predicting a plurality of potential root causes of the future problem based on the second operating data from the building equipment.

The process 2400 is shown to include automatically initiating an action to prevent the future problem from occurring or mitigate an effect of the future problem (step 2408). Automatically initiating the action in step 2408 may include initiating an action predicted to prevent the root cause of the future problem from occurring using the AI model. Step 2408 may include scheduling maintenance to be performed on the building equipment to prevent a predicted fault from occurring or to prevent the building equipment or a part of the building equipment from failing. Step 2408 may include scheduling maintenance to be performed on the building equipment at or before the future time to mitigate an effect of equipment degradation or reset the building equipment to a lower degradation state at the future time. In some embodiments, step 2408 includes automatically adjusting a control strategy for the building equipment to prevent the future problem from occurring. Step 2408 may include recommending that at least one device of building equipment not currently installed be installed to cause the building equipment to operate at increased efficiency.

In some embodiments, the process 2400 includes generating a user interface including a comparison between a first performance metric of the building equipment predicted to occur at a future time if the future problem occurs and a second performance metric of the building equipment predicted to occur at the future time if the action is performed to prevent the future problem from occurring or mitigate the effect of the future problem. In some embodiments, the process 1400 includes generating a user interface that includes a report of the future problem prevented or mitigated by automatically initiating the action.

Referring now to FIG. 25, a process 2500 for using a trained AI model to predict future problems and automatically initiate actions to prevent the future problems from occurring or mitigate an effect of the future problems is shown, according to an exemplary embodiment. The process 2500 is shown to include obtaining an AI model trained using first operating data from building equipment and first service reports indicating first problems associated with the building equipment (step 2502). The AI model obtained in step 2502 may be the same as or similar to the AI model trained by performing the process 2400.

The process 2500 is shown to include receiving second operating data from building equipment (step 2504), predicting a future problem likely to occur with the building equipment based on the second operating data using the AI model (step 2506), and automatically initiating an action to prevent the future problem from occurring or mitigate an effect of the future problem (step 2508). Steps 2504, 2506, and 2508 of the process 2500 may be the same as or similar to steps 2404, 2406, and 2408 of the process 2400, as described with reference to FIG. 24.

While the processes 900-2500 are described primarily as using AI models to perform the various steps thereof, it is contemplated that other types of models can be used in place of or in addition to the AI models. The processes 900-2500 are not limited to AI models, but rather may use various other types of artificial intelligence or machine learning models, neural networks, analytical models, predictive models, regression models, parametric models, models which are not artificial intelligence or machine learning models, or any other type of model.

User Interface

Figure 26:
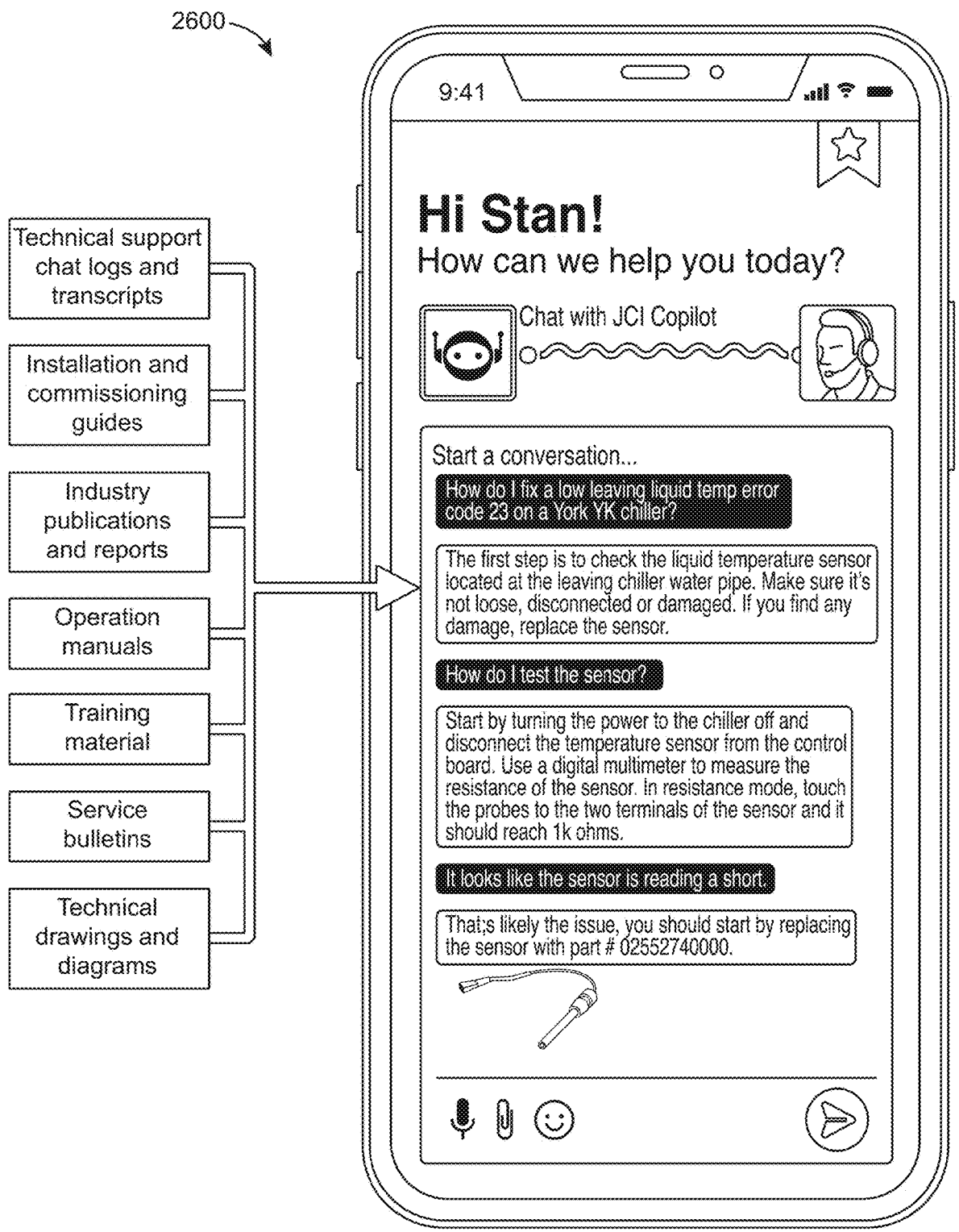
FIG. 26 is a drawing of a user interface which can be generated by the systems and methods of FIGS. 1-25, according to some embodiments.

Referring now to FIG. 26, an example of a user interface 2600 which can be generated and presented by the systems and methods of the present disclosure is shown, according to an exemplary embodiment. The user interface 2600 is an example of the interactive conversational interface which can be provided in step 2106 of the process 2100. The user interface 2600 can also be used by service technicians, customers, or other users to interact with an AI model, request assistance or support, submit service requests, obtain recommended solutions, or otherwise interact with the systems and methods described herein. The user interface 2600 can be presented via a mobile device (e.g., a smartphone, laptop, tablet, etc.) or any other type of electronic device. In some embodiments, the AI model includes one or more generative AI models. In other embodiments, AI model may include one or more non-generative AI models or other algorithms, which can be used alone or in combination with generative AI models. Accordingly, any references to an AI model should be understood as encompassing generative AI models and/or other types of AI models (e.g., natural language processing models, rules-based models, heuristic models, various machine learning models or algorithms, etc.) regardless of whether the model is a generative AI model. Additionally, in some embodiments, the one or more AI models can be replaced or supplemented with other types of models configured to implement and/or execute the features or steps described herein (e.g., analytical models, predictive models, regression models, parametric models, etc.), regardless of whether such models are AI models, generative AI models, or other types of models (e.g., non-generative AI or non-AI).

Advantageously, systems and methods described herein can use the user interface 2600 to address various challenges with existing support and service systems. For example, in conventional systems, a customer or user (e.g., a building occupant, a service technician) may attempt to resolve a problem by calling a support center via telephone to report a problem or request help from a remote field support technician (e.g., "Help my chiller is down . . . "). The user (e.g., "Stan") may experience long wait times (e.g., ~20 minutes) due to a high volume of customer request and limited support resources. Traditional support has limited hours (e.g., M-F 7 am-6 pm) and the support technicians may have varying experience levels and language barriers. Conventional systems also provide multiple entry points to submit problems and request service and do not provide a streamlined experience. Alternatively, the user may be required to evaluate a large set of documents to obtain information required to resolve the problem. Existing systems lack curated content/information and provide answers scattered over multiple sites or documents).

Challenges exist for both the field personnel (e.g., on-site service technicians) and the remote support technicians (e.g., call center that receives requests from on-site service technicians). For example, the field personnel may believe that calls to the service center take too long to address problems, or may spend too much time at the customer site addressing issues. Field personnel may also not have the ability or time to keep up with and changes in technical standards and integrating legacy and new equipment. At the remove call center, customers requesting support may expect a quick response to address their questions or problems. It can be difficult to support customers and quickly onboard new team members due to complexity of HVAC, employee turnover may be high, making it difficult to adequately support customers, and language barriers may exist due to a large global customer base.

The systems and methods of the present disclosure address these challenges by providing fast assistance to solve problems with all data centralized, access to the latest training and standards, device information, and quick solutions to commonly addressed problems. The result is increased customer satisfaction due to faster response times, renewal of service contracts and subscriptions, new equipment sales and referrals, the ability to quickly adapt to changing market conditions, and the ability to quickly get new hires trained.

As shown in FIG. 26, the user interface 2600 allows a user to interact with an AI model which is trained using a variety of data sources (e.g., technical support chat logs and transcripts, operation manuals, training materials, service bulletins, technical drawings and diagrams, installation and commissioning guides, industry publications and reports, and/or any other data source described herein). The AI model can be trained with a large dataset of technical documentation and conversations, tested and validated for performance, and integrated into the user interface 2600.

The user can submit problems or ask questions via the user interface 2600. For example, as shown in FIG. 26, the user may ask a question such as "How do I fix a low leaving liquid temp error code 23 on this York YK chiller?" The AI model may respond with "The first step is to check the liquid temperature sensor located at the leaving chilled water pipe. Make sure it is not loose, disconnected or damaged. If you find any damage, replace the sensor." The user can follow-up with additional information or questions such as "How do I test the sensor to make sure it's working?" The AI model may respond with additional information such as "Start by turn off power to the chiller system and disconnect the temperature sensor from the control board. Use a digital multimeter to measure the resistance of the sensor. In resistance mode, and touch the probes to the two terminals of the sensor. You should read 1k ohms." The user can provide additional information such as "It looks like the sensor is reading a short" and the AI model can diagnose the issue and respond with "That's likely the issue, you should replace the sensor with part number 02552740000." The interaction between the user and the AI model may be in the form of a natural language conversation or other interaction in one or more modalities (e.g., text, images, audio, video, etc.) as described in detail throughout the present disclosure.

Example Report

Referring now to FIGS. 27-38, an example of a report 2700 which can be generated by the systems and methods of the present disclosure is shown, according to an exemplary embodiment. In some embodiments, the report 2700 is generated based on unstructured service data (e.g., text data, audio data, speech data, image data, video data, etc.) received from a service technician located on-site with the building equipment. The unstructured service data can be ingested by performing processes 900-1100 as described with reference to FIGS. 9-11 and converted to a predetermined format. The unstructured service data can be correlated or coupled with additional data received from additional data sources (e.g., engineering data, technical documentation, operational data, warranty data, service data, parts data, and/or any other data sources described herein), by performing processes 1400-1500 as described with reference to FIGS. 14-15. The unstructured service data and additional data can be used to predict root causes of any detected faults by performing processes 1800-1900 as described with reference to FIGS. 18-19. The predicted root causes can then be used to automatically schedule maintenance service by performing processes 1600-1700 as described with reference to FIGS. 16-17 and/or execute automated interventions to address the root causes be performing processes 2200-2300 as described with reference to FIGS. 22-23.

Any or all of the data ingested, generated, or otherwise used by the systems and methods described herein can be used to generate the report 2700. In some embodiments, the report 2700 is an example of a structured service report which can be generated by performing processes 1200-1300 as described with reference to FIGS. 12-13. The report 2700 can be provided to a customer or other user in a variety of formats (e.g., via a webpage, as an electronic document, etc.) and/or via the interactive service tool by performing processes 2000-2100 as described with reference to FIGS. 20-21. Some of the content in the report 2700 may include or may be based on the unstructured service data and/or the additional data obtained from the additional data sources, whereas other content in the report 2700 can be automatically generated by the AI model (e.g., a generative AI model or other AI model) as described throughout the present disclosure. In some embodiments, the report 2700 can be generated without requiring any unstructured service data from a service technician, but rather can be based solely on data received from the building equipment and/or the data sources 112.

Referring specifically to FIG. 27, the report 2700 is shown to include an executive summary. The executive summary may include a summary of the key findings in the report 2700 (detailed in other sections of the report 2700) along with information describing the scope of the report 2700. For example, the executive summary may include information indicating the name of the building or buildings covered by the report 2700, the time period covered by the report 2700, the customer to whom the report 2700 is directed, the equipment covered by the report 2700, or other particulars specific to the scope or content of the data used to generate the report 2700. In some embodiments, the executive summary includes a table, graph, or other content item summarizing the key findings in the report 2700 and/or data associated with the equipment covered by the report 2700. For example, the executive summary in the example report 2700 is shown to include a table with information pertaining to five chillers, denoted CH #1, CH #2, CH #3, CH #4, and CH #5. The executive summary is shown to further include textual data, which can be automatically generated (e.g., using a generative AI model) or may be assembled based on a rules-based template. For embodiments in which the textual data is generated using a generative AI model, a prompt can be provided to the generative AI model to generate a textual summary of the information in the remainder of the report 2700. The textual summary generated by the generative AI model can then be included as the text in the executive summary section of the report 2700.

Referring now to FIG. 28, the report 2700 is shown to include a chiller performance index (CPI) section. The CPI represents the overall health and wellness of connected chillers and is a measure of overall performance to the chiller's designed specifications. In some embodiments, the AI model uses the techniques described in U.S. Pat. No. 11,092,954 granted Aug. 17, 2021, the entire disclosure of which is incorporated by reference herein, to calculate the values of the CPI for the connected chillers. Although the CPI is shown only for chillers in FIG. 28, it is contemplated that similar techniques can be used to calculate similar performance indices for other types of equipment, as described in U.S. Pat. No. 11,092,954. In some embodiments, the CPI section includes trend information for each chiller including values of the CPI calculated for various time periods (e.g., yearly, monthly, weekly, daily, hourly, etc.). The trend of the CPI can be presented in various formats such as a table of the CPI values as shown in FIG. 28, a line graph or bar graph, or other tabular or graphical formats. In some embodiments, the CPI section includes textual data describing or summarizing the CPI values. For example, FIG. 28 shows the report 2700 with textual data indicating that Chiller #2 is at an alert level and the CPI for Chiller #1 dropped from the previous reporting period. The textual data shown in the CPI section of the report 2700 can be automatically generated (e.g., using a generative AI model) or may be assembled based on a rules-based template in various embodiments.

Referring now to FIG. 29, the report 2700 is shown to include a chiller alarms and notifications section. The chiller alarms and notifications section may include fault information, alarm information, alert information, or other types of notifications generated for the building equipment covered by the report 2700. Although the alarms and notifications are shown only for chillers in FIG. 29, it is contemplated that similar techniques can be used to provide similar alarms and notifications for other types of equipment. In some embodiments, the information shown in the alarms and notification section can be generated using any of a variety of fault detection techniques, fault diagnostic techniques, rules-based techniques, and/or other techniques for detecting performance issues associated with the building equipment. The information shown in the alarms and notification section can be presented in the form of a table as shown in FIG. 29 (e.g., indicating a number of each type of fault or alarm that occurred during the corresponding reporting period) or in any other format. In some embodiments, the alarms and notification section of report 2700 includes textual data describing or summarizing the various alarms and notifications. The textual data presented in the alarms and notification section of the report 2700 can be automatically generated (e.g., using a generative AI model) or may be assembled based on a rules-based template in various embodiments.

Referring now to FIG. 30, the report 2700 is shown to include a maintenance report section. The maintenance report section may summarize the results of the AI-based root cause prediction processes 1800-1900 described with reference to FIGS. 18-19, the AI-based maintenance service scheduling and modification processes 1600-1700 described with reference to FIGS. 16-17, and/or any AI-based automated interventions performed by executing processes 2200-2300 described with reference to FIGS. 22-23. For embodiments in which the input to these processes includes input provided by a field technician on site with the building equipment, the report 2700 may include the results of the field service inspection (e.g., under the heading "Maintenance Report: Field Service Inspection"). For embodiments in which the input to these processes does not include input from an on-site field technician but rather is based solely on other types of data (e.g., from the data sources 112), the report 2700 may include the results of the virtual inspection (e.g., under the heading "Maintenance Report: Virtual Inspection"). In some embodiments, the maintenance report section of the report 2700 includes a textual summary of the root causes of any detected faults, recommended maintenance actions, any automatic interventions implemented. The textual data presented in the maintenance report section of the report 2700 can be automatically generated (e.g., using a generative AI model) or may be assembled based on a rules-based template in various embodiments.

Figure 31:
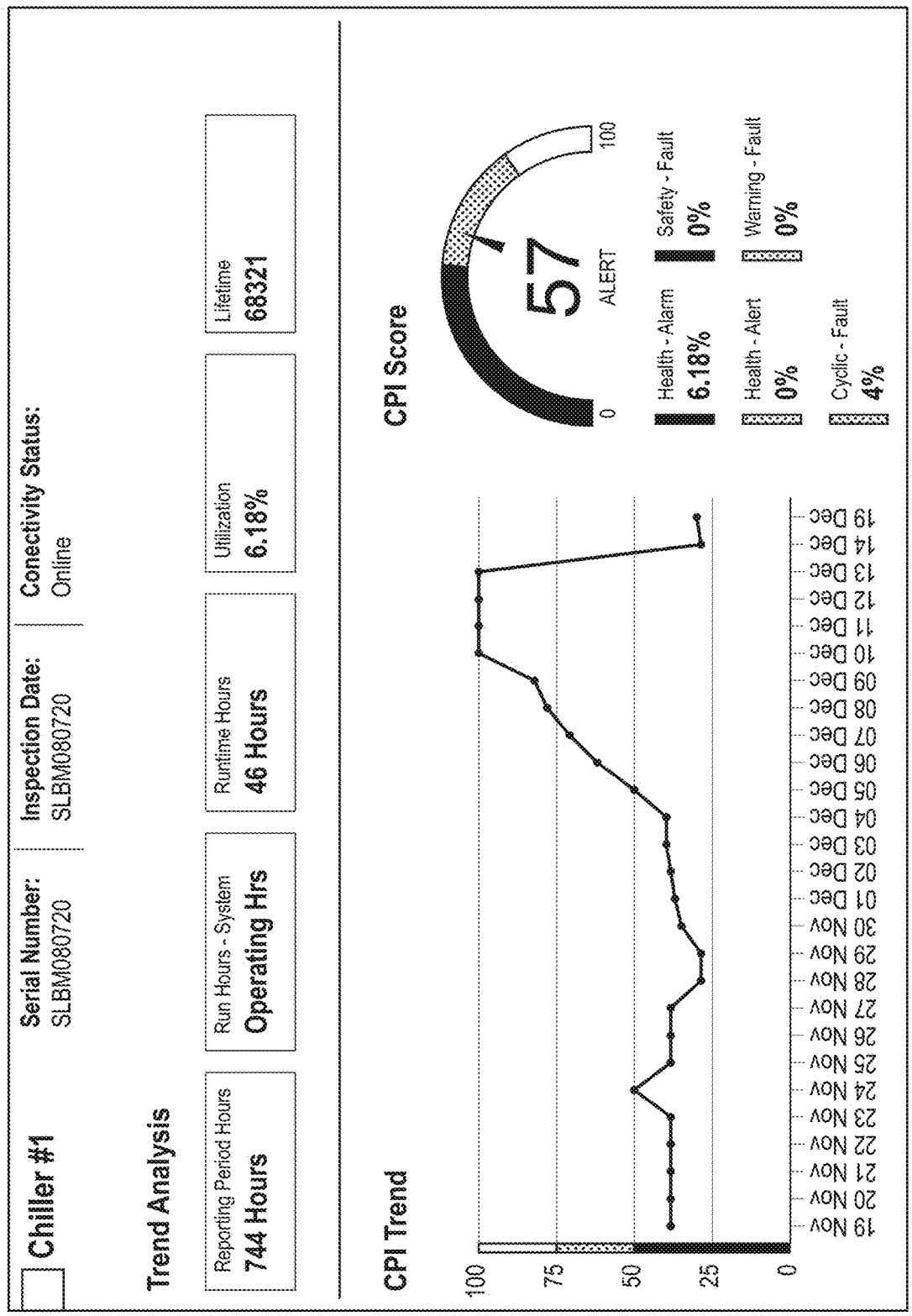
FIG. 31 is a drawing of a trend analysis section of the report of FIG. 27 which can be generated by the systems and methods of FIGS. 1-25, according to some embodiments.
Figure 34:
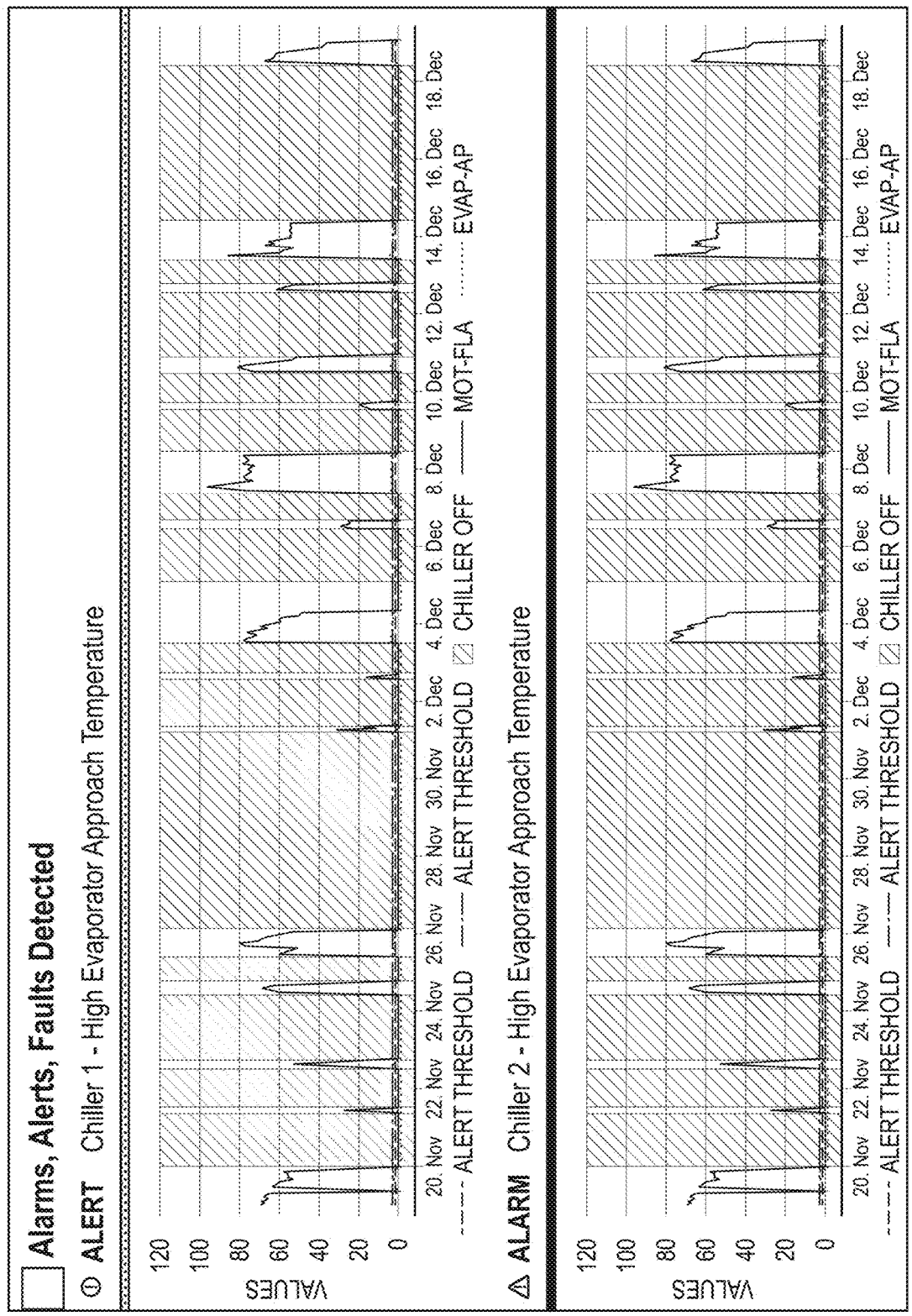
Figure 35:
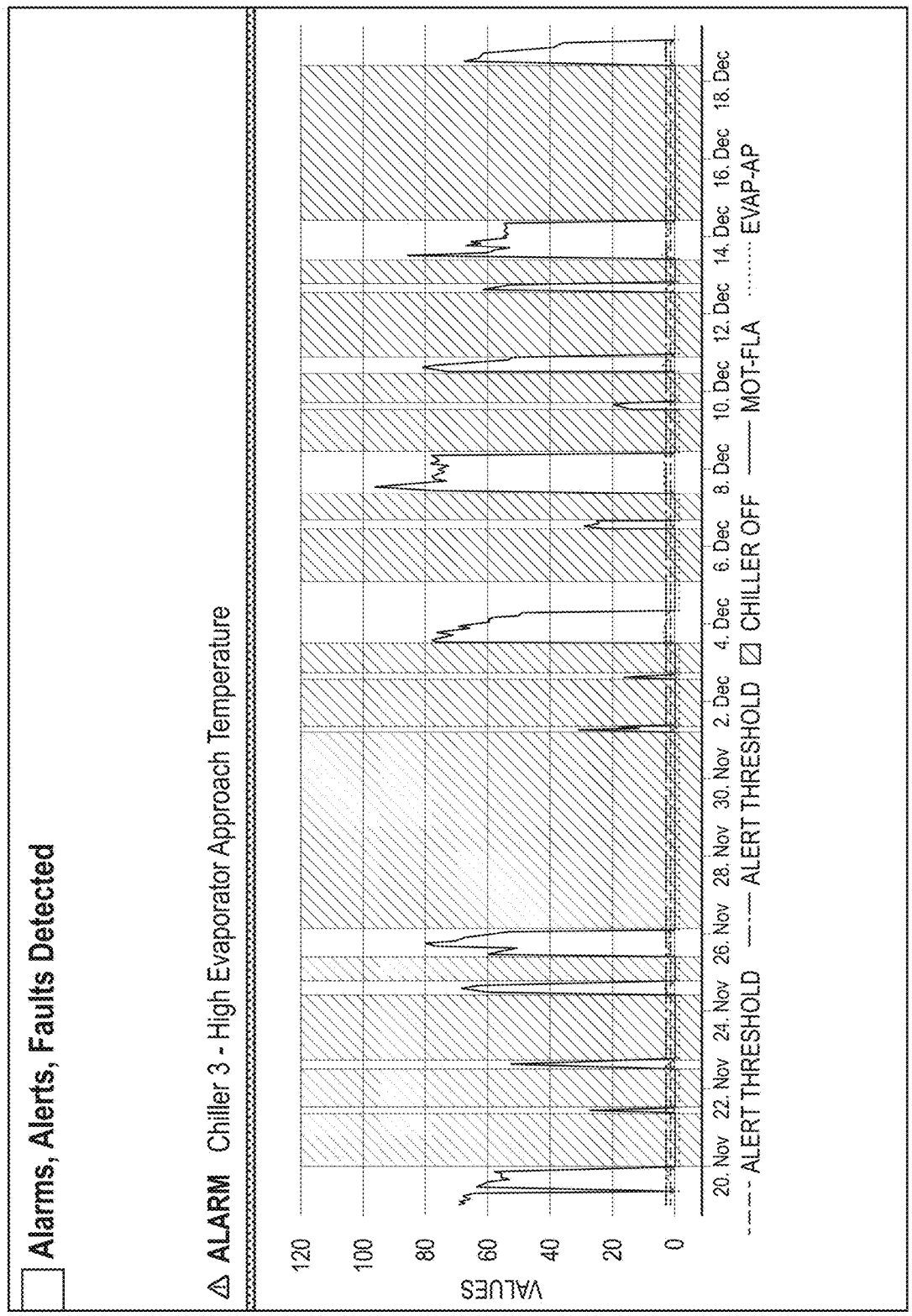
Figure 36:
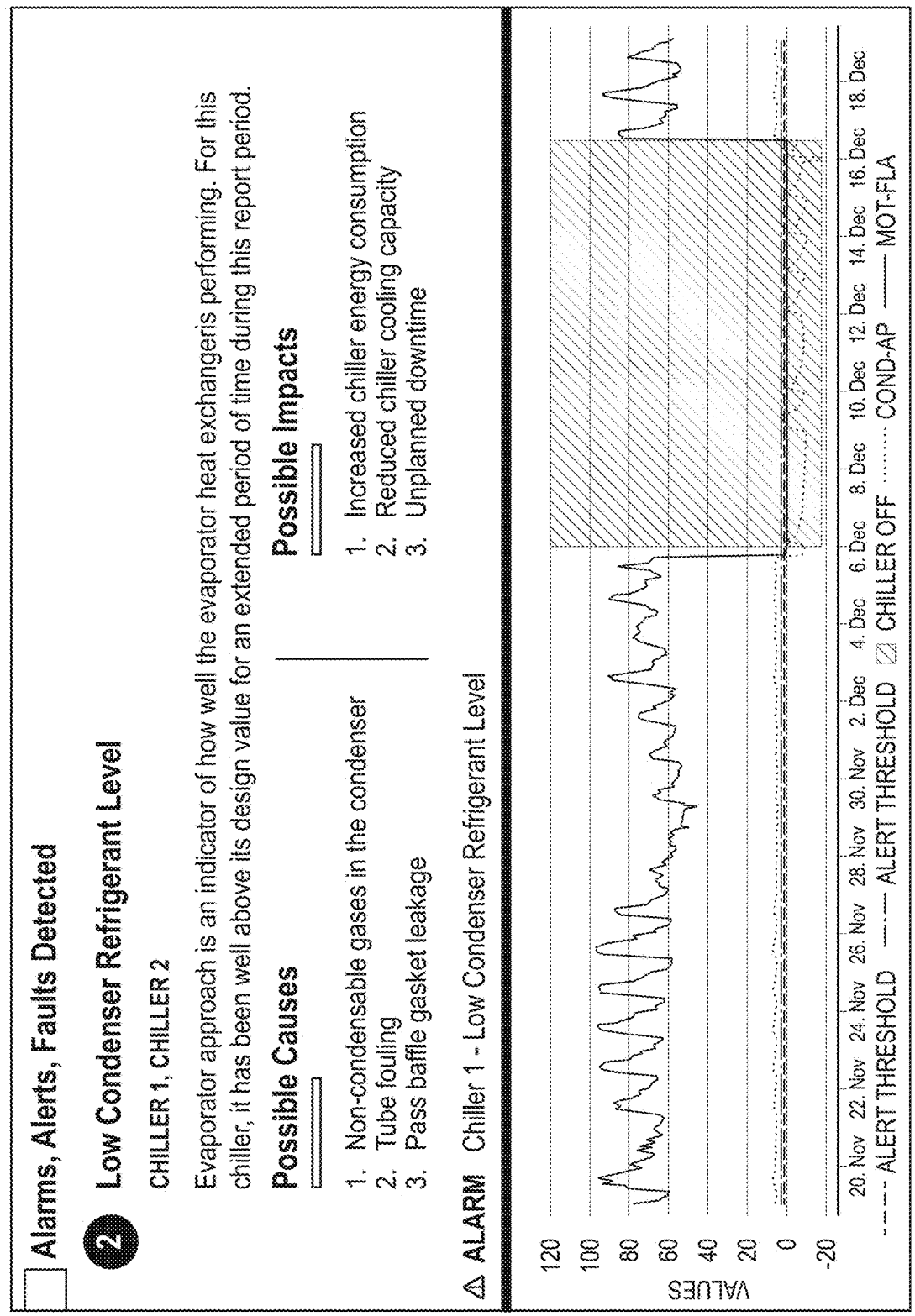

Referring now to FIG. 31, the report 2700 is shown to include a trend analysis section. The trend analysis section may include trend information associated with the building equipment covered by the report (e.g., a time series of data values associated with the equipment). The trend information can include time series data for any points associated with the building equipment (e.g., measurements from sensors, setpoints or control signals from controllers, etc.), cumulative statistics associated with the reporting period (e.g., total number of hours in the reporting period, a number of runtime hours, etc.), and/or other values which can be generated or calculated based on the information received as an input (e.g., percentage utilization of the equipment, CPI scores, total number of faults or alarms in various categories, etc.). The trend information can be presented in the form of a line graph as shown in FIG. 31 or other graphical or tabular formats.

Referring now to FIG. 32, the report 2700 is shown to include a health chart conditions section and an event occurrence section. The health chart conditions section may include the results of various health checks that are performed by the AI models or other systems and methods described herein pertaining to the building equipment. For example, the report 2700 is shown to include a health condition titled "Low Condenser Refrigerant Level" which can be evaluated by comparing the measured or calculated amount of refrigerant at the condenser of the chiller with a threshold value. If the condenser refrigerant level is below the threshold, the report 2700 may indicate that the condenser refrigerant level is not acceptable, whereas if the condenser refrigerant level is at or above the threshold, the report 2700 may indicate that the condenser refrigerant level is acceptable as shown in FIG. 32. Each of the other health chart conditions shown in FIG. 32 can be evaluated using a similar technique (e.g., by comparing a measured or calculated value against a corresponding threshold, by evaluating one or more rules, etc.) to determine whether the health chart condition is acceptable or unacceptable. In some embodiments, the health chart conditions section of the report 2700 includes a textual summary of the various health chart conditions, shown as "comments" in FIG. 32. The textual summary of the health chart conditions may include an explanation of any conditions that were determined to be acceptable or unacceptable, the significance of each condition, and/or an expected impact of any conditions that were not within acceptable bounds. The textual data presented in the health chart conditions section of the report 2700 can be automatically generated (e.g., using a generative AI model) or may be assembled based on a rules-based template in various embodiments.

The event occurrence section of the report 2700 may include information indicating the most frequent events that occurred pertaining to the building equipment during the reporting period along with an indication of the number of times each event occurred. In this context, an event can be defined as an occurrence of an alarm, alert, fault, notification, or other detectable event that occurs during operation of the building equipment. Some events may be detected by performing a fault detection or diagnostic process, whereas other events can be detected by comparing a measured or calculated value against a threshold. An event may be determined to occur when a monitored or calculated variable satisfies a given condition or rule applicable to the variable (e.g., variable exceeds threshold). For example, the "high evaporator approach temperature" event shown in FIG. 32 may occur whenever the measured or calculated evaporator approach temperature of a monitored chiller exceeds a given threshold. The AI model or other components of the systems described herein can count the total number of times each event occurred within the reporting period and prepare a graph, table, or other element indicating the most frequent types of events. In some embodiments, the event occurrence section of the report 2700 includes a textual summary of the events that occurred most frequently. The textual data presented in the event occurrence section of the report 2700 can be automatically generated (e.g., using a generative AI model) or may be assembled based on a rules-based template in various embodiments.

Referring now to FIGS. 33-36, the report 2700 is shown to include an alarms, alerts, and faults detected (AAFD) section. The AAFD section is shown to include subsections corresponding to the events listed in the event occurrence section (e.g., "High Evaporator Approach Temperature," "Low Condenser Refrigerant Level," etc.) along with detailed information pertaining to each type of event. The information shown in the AAFD section may identify the specific equipment for which each event was detected. For example, the High Evaporator Approach Temperature subsection in FIG. 33 is shown identifying each of Chiller 1, Chiller 2, and Chiller 3 as having the associated alarm, alert, or fault. In some embodiments, the AAFD section includes a textual explanation of each listed alarm, alert, or fault detected along with a textual summary of the corresponding time series data associated with the alarm, alert, or fault. For example, the textual information provided for the High Evaporator Approach Temperature alarm is shown as "For this chiller, it has been well above its design value for an extended period of time during this report period." This textual information can be automatically generated (e.g., using a generative AI model) or may be assembled based on a rules-based template in various embodiments. For example, the AI model may evaluate the amount of time the value of the "evaporator approach temperature" variable exceeded a given threshold during the report period and characterize that amount of time as an "extended period of time" if the amount of time exceeds a threshold. The AI model can analyze the raw time series values of the evaporator approach temperature variable (i.e., the values depicted in the graph shown in FIGS. 34-35) and automatically generate an appropriate textual summary or explanation of this information. Similar analytics and automatic text generation can be performed for other alarms, alerts, and faults, such as the low condenser refrigerant level alarm shown in FIG. 36.

In some embodiments, the AAFD section of the report 2700 includes a list of possible causes and/or possible impacts of the detected alarm, alert, or fault. For example, FIG. 33 is shown to include a list of possible causes of the High Evaporator Approach Temperature alarm including insufficient charge, tube fouling, low chilled water flow, oil in the refrigerant charge, wrong type of refrigerant, pass baffle gasket leakage, and condenser level control malfunction. The possible causes shown in FIG. 33 can be generated by performing the AI-based root cause prediction processes 1800-1900 described with reference to FIGS. 18-19. The most likely root causes can be included in the list of possible causes in the AAFD section report (e.g., in descending order of likelihood). Similarly, FIG. 33 is shown to include a list of possible impacts of the High Evaporator Approach Temperature alarm including increased chiller energy consumption, reduced chiller cooling capacity, inability to meet chilled water set point, and unplanned down time. The possible impacts shown in FIG. 33 can be generated automatically (e.g., by the generative AI model) based on the additional data sources 112 received as inputs. For example, the list of possible impacts can be generated automatically based on outcome data indicating the events that occurred when the same or similar alarm, alert, or fault was detected in the past; based on product manuals or other technical documentation for the building equipment; based on service data or warranty data indicating the downtime resulting from similar issues in the past; or any other information provided by the additional data sources 112.

Figure 37:
FIGS. 37-38 are drawings of a customer facing dashboard section of the report of FIG. 27 which can be generated by the systems and methods of FIGS. 1-25, according to some embodiments.
Figure 38:
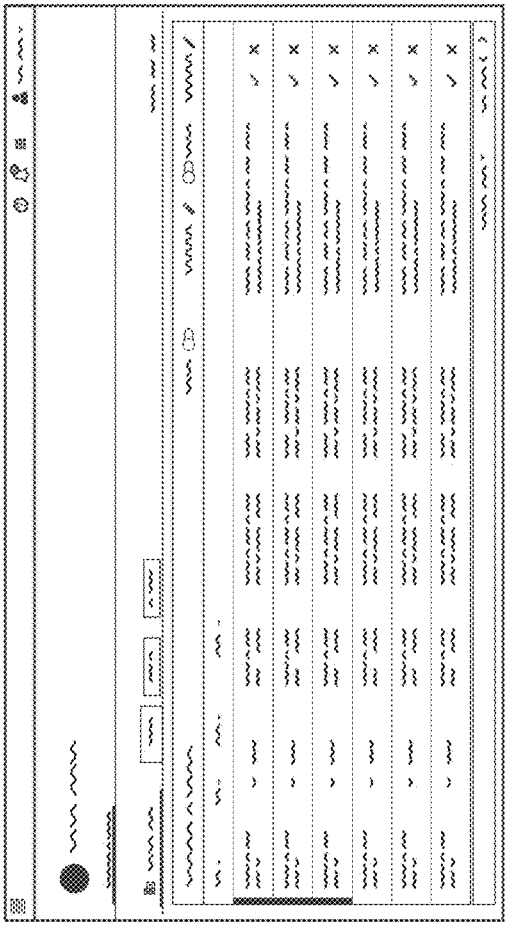

Referring now to FIGS. 37-38, the report 2700 is shown to include a customer facing dashboard section. The customer facing dashboard section may include information describing the various automated analyses performed by the systems and methods described herein in order to generate the information presented in other sections of the report 2700. The customer facing dashboard section may include textual data describing such analyses. The textual data presented in the customer facing dashboard section of the report 2700 can be automatically generated (e.g., using a generative AI model) or may be assembled based on a rules-based template in various embodiments.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method comprising:
    receiving, by one or more processors, an unstructured service report corresponding to a service request handled by one or more technicians for servicing building equipment, the unstructured service report comprising unstructured data not conforming to a predetermined format or conforming to a plurality of different predetermined formats;
    extracting, by the one or more processors, a set of standards from one or more technical documents associated with the building equipment; and
    automatically generating, by the one or more processors using a generative AI model, a structured service report in the predetermined format for delivery to a customer associated with the building equipment, wherein generating the structured service report in the predetermined format comprises standardizing the structured service report to comply with the set of standards extracted from the one or more technical documents associated with the building equipment.

2. The method of claim 1, wherein:
    the technical documents comprise at least one of product manuals, user manuals, installation manuals, instruction manuals, or operating procedure guides for the building equipment;
    the set of standards comprises standard terminology used in the technical documents; and generating the structured service report in the predetermined format comprises modifying one or more textual elements in the unstructured service report to comply with the standard terminology.

3. The method of claim 1, wherein:

the technical documents comprise at least one of product manuals, user manuals, installation manuals, instruction manuals, or operating procedure guides for the building equipment;

the set of standards comprises standard styles used in the technical documents; and generating the structured service report in the predetermined format comprises modifying one or more stylistic elements in the unstructured service report to comply with the standard styles.

4. The method of claim 1, wherein:

the technical documents comprise a standard terminology guide associated with at least one of product manuals, user manuals, installation manuals, instruction manuals, or operating procedure guides for the building equipment;

the set of standards comprises standard terminology provided in the standard terminology guide; and generating the structured service report in the predetermined format comprises modifying one or more textual elements in the unstructured service report to comply with the standard terminology.

5. The method of claim 1, wherein:

the technical documents comprise a style guide associated with at least one of product manuals, user manuals, installation manuals, instruction manuals, or operating procedure guides for the building equipment;

the set of standards comprises a standard style provided in the standard style guide; and generating the structured service report in the predetermined format comprises modifying one or more stylistic elements in the unstructured service report to comply with the standard style.

6. The method of claim 1, wherein generating the structured service report comprises:

generating, using a first generative AI model, a first version of the structured service report that complies with a predetermined template; and generating, using a second generative AI model, a second version of the structured service report by modifying the first version of the structured service report to comply with the set of standards.

7. The method of claim 1, wherein:

the predetermined format is a structured data format comprising one or more predetermined fields or locations and one or more predetermined labels or identifiers characterizing the one or more predetermined fields or locations; and the unstructured data comprise freeform data not conforming to the structured data format.

8. The method of claim 1, further comprising training, by the one or more processors, the generative AI model using training data comprising a plurality of unstructured service reports corresponding to a plurality of service requests handled by technicians for servicing building equipment, the training data not conforming to the predetermined format or conforming to the plurality of different predetermined formats.

9. The method of claim 1, wherein automatically generating the structured service report comprises:

identifying a customer, a building, or a type of the building equipment associated with the service request;

selecting a predefined template for the structured service report from a set of multiple predefined templates based on the identified customer, building, or type of the building equipment; and generating the structured service report to conform to the predefined template.

10. The method of claim 1, further comprising receiving, by the one or more processors, additional data from one or more additional data sources separate from the unstructured service report;

wherein automatically generating the structured service report comprises using the additional data to generate additional content not provided within the unstructured service report and included in the structured service report.

11. The method of claim 10, wherein:

the additional data comprise operational data generated during operation of the building equipment; and generating the additional content comprises using the operational data to construct one or more charts, graphs, or graphical data elements in the structured service report.

12. The method of claim 1, wherein automatically generating the structured service report comprises using the generative AI model to identify new correlations and/or patterns between two or more unstructured data elements of the unstructured service report.

13. A method comprising:

receiving, by one or more processors, training data comprising a plurality of first unstructured service reports corresponding to a plurality of first service requests handled by technicians for servicing building equipment, the plurality of first unstructured service reports comprising unstructured data not conforming to a predetermined format or conforming to a plurality of different predetermined formats, the training data further comprising one or more technical documents associated with the building equipment;

training, by the one or more processors using the training data, a generative AI model to automatically generate a structured service report in the predetermined format for delivery to a customer associated with the building equipment, wherein the structured service report is generated by the generative AI model based on a second unstructured service report not conforming to the predetermined format or conforming to the plurality of different predetermined formats and generating the structured service report in the predetermined format comprises standardizing the structured service report to comply with a set of standards extracted from the one or more technical documents associated with the building equipment.

14. The method of claim 13, wherein:

the technical documents comprise at least one of product manuals, user manuals, installation manuals, instruction manuals, or operating procedure guides for the building equipment;

the set of standards comprises standard terminology used in the technical documents; and generating the structured service report in the predetermined format comprises modifying one or more textual elements in the unstructured service report to comply with the standard terminology.

15. The method of claim 13, wherein:
the technical documents comprise at least one of product manuals, user manuals, installation manuals, instruction manuals, or operating procedure guides for the building equipment;
the set of standards comprises standard styles used in the technical documents; and
generating the structured service report in the predetermined format comprises modifying one or more stylistic elements in the unstructured service report to comply with the standard styles.

16. The method of claim 13, wherein:
the technical documents comprise a standard terminology guide associated with at least one of product manuals, user manuals, installation manuals, instruction manuals, or operating procedure guides for the building equipment;
the set of standards comprises standard terminology provided in the standard terminology guide; and
generating the structured service report in the predetermined format comprises modifying one or more textual elements in the unstructured service report to comply with the standard terminology.

17. The method of claim 13, wherein:
the technical documents comprise a style guide associated with at least one of product manuals, user manuals, installation manuals, instruction manuals, or operating procedure guides for the building equipment;
the set of standards comprises a standard style provided in the standard style guide; and
generating the structured service report in the predetermined format comprises modifying one or more stylistic elements in the unstructured service report to comply with the standard style.

18. The method of claim 13, wherein generating the structured service report comprises:
generating, using a first generative AI model, a first version of the structured service report that complies with a predetermined template; and
generating, using a second generative AI model, a second version of the structured service report by modifying the first version of the structured service report to comply with the set of standards.

19. A method comprising:
receiving, by one or more processors, an unstructured service report corresponding to a service request handled by one or more technicians for servicing building equipment, the unstructured service report comprising unstructured data not conforming to a predetermined format or conforming to a plurality of different predetermined formats;
extracting, by the one or more processors, a set of standards from one or more technical documents associated with the building equipment; and
automatically generating, by the one or more processors using a machine learning model, a structured service report in the predetermined format for delivery to a customer associated with the building equipment, wherein generating the structured service report in the predetermined format comprises standardizing the structured service report to comply with the set of standards extracted from the one or more technical documents associated with the building equipment.

20. The method of claim 19, wherein:
the technical documents comprise at least one of product manuals, user manuals, installation manuals, instruction manuals, or operating procedure guides for the building equipment;
the set of standards comprises standard terminology or standard styles used in the technical documents; and
generating the structured service report in the predetermined format comprises modifying one or more textual elements or stylistic elements in the unstructured service report to comply with the standard terminology or the standard styles.

* * * * *